US012767510B2

(12) United States Patent
Elliott et al.

(10) Patent No.: US 12,767,510 B2
(45) Date of Patent: Oct. 20, 2026

(54) AUTOMATIC ADAPTER SPOTTING FOR AUTOMOTIVE LIFT

(71) Applicant: Vehicle Service Group, LLC, Madison, IN (US)

(72) Inventors: Robert Elliott, Madison, IN (US); Chetan Gundurao, Bangalore (IN); Libu George, Bangalore (IN); Mahendran Krishnan, Bangalore (IN); Mahendra Pradhan, Bangalore (IN); Phaneesh Guruswamy, Bangalore (IN); Sameer Saxena, Bangalore (IN); Prasad Rao Boddu, Bangalore (IN)

(73) Assignee: Vehicle Service Group, LLC, Madison, IN (US)

(*) Notice: Subject to any disclaimer, the term of this patent is extended or adjusted under 35 U.S.C. 154(b) by 1455 days.

(21) Appl. No.: 17/337,339

(22) Filed: Jun. 2, 2021

(65) Prior Publication Data

US 2021/0292142 A1 Sep. 23, 2021

Related U.S. Application Data

(63) Continuation of application No. 16/988,046, filed on Aug. 7, 2020, now Pat. No. 11,104,561, which is a (Continued)

(51) Int. Cl.

| | |
|---|---|
| ***B66F 13/00*** | (2006.01) |
| ***B66F 3/46*** | (2006.01) |
| ***B66F 7/28*** | (2006.01) |

(52) U.S. Cl.

CPC ................ *B66F 13/00* (2013.01); *B66F 3/46* (2013.01); *B66F 7/28* (2013.01); *B66F 2700/123* (2013.01)

(58) Field of Classification Search

CPC .... B66F 13/00; B66F 3/46; B66F 7/28; B66F 2700/123

See application file for complete search history.

(56) References Cited

U.S. PATENT DOCUMENTS

| | | |
|---|---|---|
| 2,979,581 A | 4/1961 | Ballou |
| 4,531,614 A | 7/1985 | Naegeli |

(Continued)

FOREIGN PATENT DOCUMENTS

| | | |
|---|---|---|
| CN | 101234738 A | 8/2008 |
| CN | 101811650 A | 8/2010 |

(Continued)

OTHER PUBLICATIONS

Chinese Office Action dated Dec. 14, 2021, for Application No. 202110680817.8, 7 pages.

(Continued)

*Primary Examiner* — Jeffrey Donels

(74) *Attorney, Agent, or Firm* — FBT Gibbons LLP

(57) ABSTRACT

An apparatus for operating a vehicle lift comprises at least one lifting assembly, a control unit, and a control pendant. The control pendant is configured to remotely control the motion of the vehicle lift through the control unit and to permit the lifting of a vehicle by the push of a single button on the control pendant and/or positioning of lift features in preparation for lifting a particular vehicle by the push of a single button. A menu screen and a plurality of menu buttons may be used together by a user to select one vehicle profile from a plurality of vehicle profiles. The selected vehicle profile may correspond to the vehicle being lifted and provides specific data with respect to how the at least one lifting assembly and/or the lift features should be moved for the particular vehicle being lifted.

20 Claims, 41 Drawing Sheets

Related U.S. Application Data continuation of application No. 15/912,524, filed on Mar. 5, 2018, now Pat. No. 11,008,203, which is a continuation-in-part of application No. 14/202,328, filed on Mar. 10, 2014, now Pat. No. 9,908,764, said application No. 16/988,046 is a continuation of application No. PCT/US2019/020655, filed on Mar. 5, 2019, which is a continuation of application No. 15/912,524, filed on Mar. 5, 2018, now Pat. No. 11,008,203.

(60) Provisional application No. 61/783,408, filed on Mar. 14, 2013.

(56) References Cited

U.S. PATENT DOCUMENTS

| | | | | |
|---|---|---|---|---|
| 4,789,135 | A | 12/1988 | Watanabe | |
| 5,671,567 | A | 9/1997 | Silberman et al. | |
| 6,498,959 | B1 | 12/2002 | January et al. | |
| 6,963,037 | B1 | 11/2005 | Bennett et al. | |
| 6,983,196 | B2 | 1/2006 | Green et al. | |
| 6,994,223 | B1 | 2/2006 | Edgar, II et al. | |
| 7,146,701 | B2 | 12/2006 | Mahoney et al. | |
| 7,191,038 | B2 | 3/2007 | Green et al. | |
| 7,251,552 | B2 | 7/2007 | Schmeisser et al. | |
| 7,272,476 | B2 | 9/2007 | Ortiz et al. | |
| 8,083,034 | B2 | 12/2011 | Bordwell et al. | |
| 8,301,334 | B2 | 10/2012 | Knapp et al. | |
| 8,381,409 | B2 | 2/2013 | Knoke et al. | |
| 9,352,944 | B2 | 5/2016 | Fagan et al. | |
| 9,376,296 | B2 | 6/2016 | Nussbaum | |
| 9,908,764 | B2 | 3/2018 | Elliot | |
| 10,081,524 | B2 * | 9/2018 | Rucker | G06K 7/10009 |
| 10,538,418 | B2 | 1/2020 | Perlstein | |
| 10,891,597 | B2 | 1/2021 | Lewis et al. | |
| 11,008,203 | B2 | 5/2021 | Elliott et al. | |
| 11,027,952 | B2 | 6/2021 | Luinge | |
| 2002/0175319 | A1 | 11/2002 | Green et al. | |
| 2004/0149520 | A1 | 8/2004 | Taylor et al. | |
| 2005/0045429 | A1 | 3/2005 | Baker | |
| 2005/0182522 | A1 | 8/2005 | Chase | |
| 2006/0123672 | A1 * | 6/2006 | Ichimura | E02F 9/22 37/348 |
| 2007/0096068 | A1 * | 5/2007 | Finkbeiner | B66F 3/46 137/99 |
| 2007/0130522 | A1 | 6/2007 | Mansell et al. | |
| 2009/0236183 | A1 | 9/2009 | Bordwell et al. | |
| 2010/0096819 | A1 | 4/2010 | Flynn et al. | |
| 2013/0233651 | A1 * | 9/2013 | Kritzer | B66F 3/46 187/208 |
| 2013/0240300 | A1 * | 9/2013 | Fagan | B66F 3/46 187/203 |
| 2014/0076665 | A1 | 3/2014 | Nussbaum | |
| 2015/0232309 | A1 | 8/2015 | Jaipaul et al. | |
| 2015/0307334 | A1 | 10/2015 | Van Houten et al. | |
| 2016/0275729 | A1 | 9/2016 | Jaipaul et al. | |
| 2017/0174484 | A1 * | 6/2017 | Van Houten | B66F 7/20 |
| 2018/0194604 | A1 | 7/2018 | Elliot et al. | |
| 2019/0144249 | A1 | 5/2019 | Bartos | |
| 2020/0087126 | A1 | 3/2020 | Perlstein | |
| 2020/0361756 | A1 | 11/2020 | Elliott et al. | |
| 2021/0003453 | A1 | 1/2021 | Ruther et al. | |
| 2021/0003454 | A1 | 1/2021 | Ruther et al. | |
| 2021/0003481 | A1 | 1/2021 | Strege | |
| 2021/0004970 | A1 | 1/2021 | Ruther et al. | |
| 2021/0019025 | A1 | 1/2021 | Covington et al. | |

FOREIGN PATENT DOCUMENTS

| | | | | | |
|---|---|---|---|---|---|
| CN | 101863438 | A | | 10/2010 | |
| CN | 101982395 | A | | 3/2011 | |
| CN | 101993017 | A | | 3/2011 | |
| CN | 106744501 | A | | 5/2017 | |
| CN | 107055370 | A | * | 8/2017 | B66F 3/44 |
| DE | 202013102803 | U1 | * | 9/2014 | B66F 7/025 |
| DE | 102014113203 | A1 | * | 3/2016 | B66F 7/20 |
| DE | 102020212976 | A1 | | 4/2022 | |
| EP | 1655593 | A2 | | 5/2006 | |
| EP | 2316778 | A1 | * | 5/2011 | B66F 7/02 |
| EP | 3770104 | A1 | | 1/2021 | |
| EP | 3770105 | A1 | | 1/2021 | |
| GB | 1045154 | A | | 12/1966 | |
| JP | H05-213588 | A | | 8/1993 | |
| JP | 2000-264593 | A | | 9/2000 | |
| JP | 2018-090374 | A | | 6/2018 | |
| KR | 100775939 | B1 | | 11/2007 | |
| KR | 20080096156 | A | | 10/2008 | |
| NL | 2013152 | B1 | | 9/2016 | |
| WO | WO 2004/026754 | A2 | | 4/2004 | |
| WO | WO-2009117343 | A1 | * | 9/2009 | B66F 7/20 |

OTHER PUBLICATIONS

U.S. Appl. No. 17/573,894, entitled "Automatic Adapter Spotting for Automotive Lift," filed Jan. 12, 2022.

Chinese Office Action dated May 17, 2022, for Application No. 202110677094.6, 1 page.

Chinese Office Action and Search Report dated Jan. 18, 2021, for Application No. 201980017036.1, 3 pages.

European Search Report dated May 16, 2014 for Application No. EP 14000887.1, 11 pages.

European Communication dated Jan. 31, 2017 for Application No. EP 15001253.2, 8 pages.

International Search Report and Written Opinion dated Jun. 14, 2019 for International Application No. PCT/US2019/020655, 17 pages.

* cited by examiner

AUTOMATIC ADAPTER SPOTTING FOR AUTOMOTIVE LIFT

RELATED APPLICATIONS

This application is a continuation of and claims priority to U.S. Nonprovisional patent application Ser. No. 16/988,046, filed Aug. 7, 2020, entitled "Automatic Adapter Spotting for Automotive Lift," which is a continuation of and claims priority to U.S. Nonprovisional patent application Ser. No. 15/912,524, filed Mar. 5, 2018, entitled "Automatic Adapter Spotting for Automotive Lift," which is a continuation in part of U.S. Non-Provisional patent application Ser. No. 14/202,328, entitled "Handheld Control Unit for Automotive Lift," filed Mar. 10, 2014, which itself claims priority to U.S. Provisional Patent Application 61/783,408, entitled "Handheld Control Unit for Automotive Lift," filed Mar. 14, 2013; and this application is a continuation of and claims priority to international application PCT/US19/20655, filed Mar. 5, 2019, entitled "Automatic Adapter Spotting for Automotive Lift," which claimed priority to U.S. Nonprovisional patent application Ser. No. 15/912,524, cited above.

BACKGROUND

A vehicle lift is a device operable to lift a vehicle such as a car, truck, bus, etc. Some vehicle lifts operate by positioning superstructures under a vehicle. Thereafter, the superstructures may be raised or lowered to bring the vehicle to a desired height. Afterward, the vehicle may then be lowered once the user has completed his or her task requiring the vehicle lift. In some cases, the controls for the vehicle lift may be affixed to a portion of the vehicle lift, such as a lift column. In some other cases, the controls for the vehicle lift may be located in some other structure that is secured to the floor, such as a control cabinet. By locating the controls in such a fixed location, it may be difficult for the operator to easily view certain portions of the lift and/or vehicle while operating the controls. For instance, it may be difficult for the operator to determine proper positioning of superstructures under the vehicle while simultaneously controlling the vehicle lift.

Further examples of such vehicle lift devices and related concepts are disclosed in U.S. Pat. No. 6,983,196, entitled "Electronically Controlled Vehicle Lift and Vehicle Service System," issued Jan. 3, 2006, the disclosure of which is incorporated by reference herein; U.S. Pat. No. 7,191,038, entitled "Electronically Controlled Vehicle Lift and Vehicle Service System," issued Mar. 13, 2007, the disclosure of which is incorporated by reference herein; U.S. Pat. No. 8,083,034, entitled "Lift Control Interface," issued Dec. 27, 2011, the disclosure of which is incorporated by reference herein; and U.S. Pub. No. 2004/0149520, entitled "Inground Lift," published Aug. 5, 2004, the disclosure of which is incorporated by reference herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
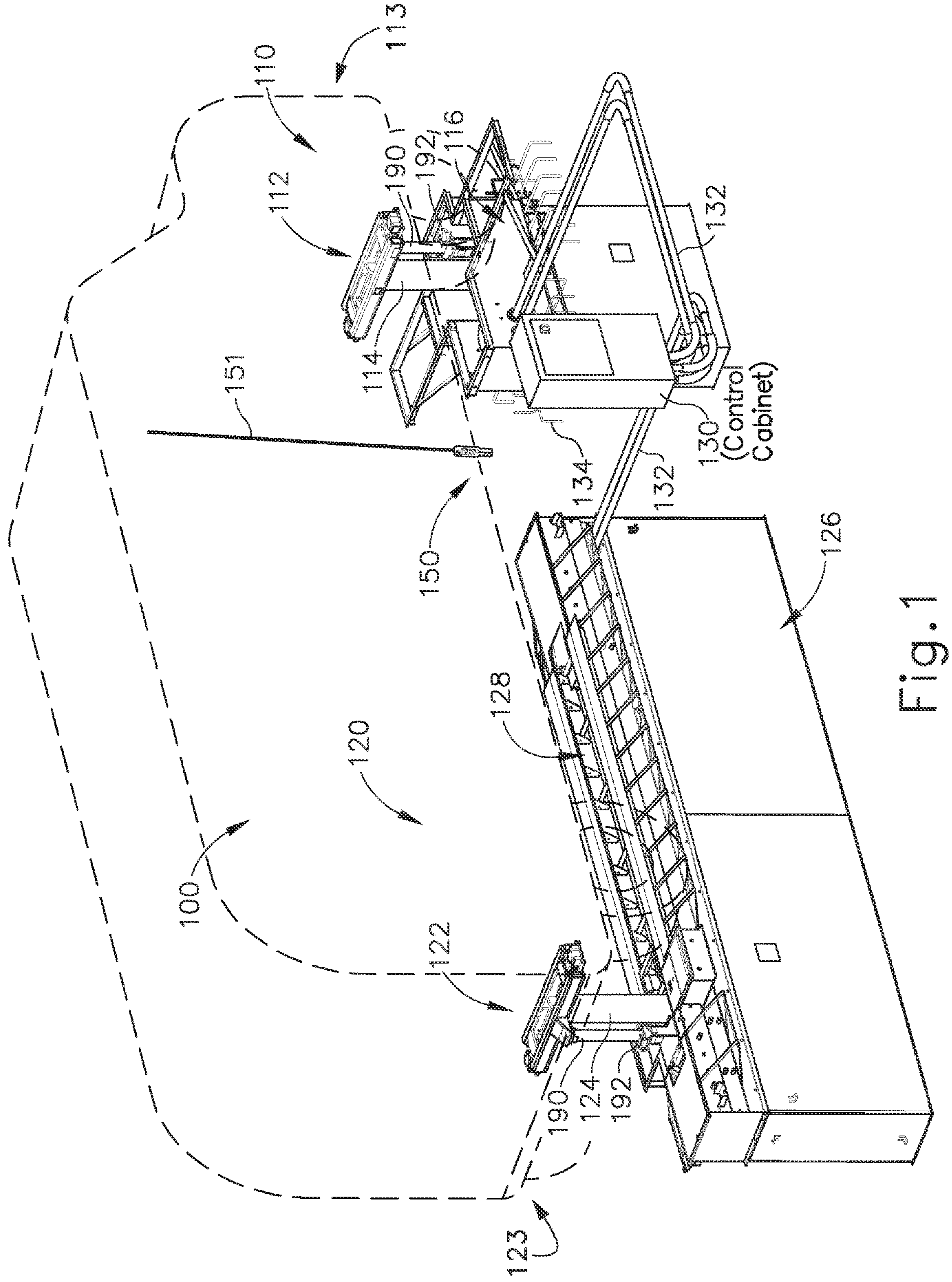
FIG. 1 depicts a perspective view of a vehicle lift system with an exemplary pendant control.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Two-Post In-Ground Lift

FIG. 1 shows an exemplary vehicle lift system (100) comprising a first lift assembly (110), a second lift assembly (120), and a control cabinet (130). Vehicle lift system (100) is operable to control lift assemblies (110, 120) to lift a vehicle in response to control signals sent by control cabinet (130). Although control cabinet (130) is depicted as a cabinet, it should be understood that control cabinet (130) may take any suitable form and/or may be integrated into other parts of the vehicle lift system (100). First lift assembly (110) comprises a superstructure (112) mounted to a post (114) that reciprocates vertically relative to an inground portion (116). Similarly, second lift assembly (120) comprises a superstructure (122) mounted to a post (124) that reciprocates vertically relative to an inground portion (126). Superstructures (112, 122) are configured to engage a vehicle and thereby raise and lower the vehicle relative to the ground as posts (114, 124) are raised and lowered relative to inground portions (116, 126). By way of example only, posts (114, 124) and superstructures (112, 122) may be raised and lowered relative to inground portions (120, 122) using hydraulics, screw mechanisms, scissor mechanisms, and/or any other suitable kind of lifting technology. Lift superstructures (110, 112) may engage vehicles in numerous ways, such as by contacting the chassis of a vehicle, the axles of a vehicle, the wheels of a vehicle, and/or any other suitable lift points on a vehicle. In the present example, inground portion (126) also includes a longitudinal path (128) and a drive feature (not shown) that is operable to translate post (124) and superstructure (122) at selected locations along longitudinal path (128). This enables vehicle lift system (100) to accommodate vehicles of various lengths, by selectively positioning superstructure (122) under the appropriate lift point for the particular vehicle to be lifted.

As noted above, control cabinet (130) is operable to control vehicle lift system (100). This may include selectively raising and lowering posts (114, 124) and superstructures (112, 122), translating post (124) and superstructure (122) along longitudinal path (128), halting movement of posts (114, 124) and superstructures (112, 122), etc. Control cabinet (130) may be equipped with one or more control boards, PCBs, a computer, microprocessor, and/or any other suitable components configured to transmit, store, carry out, etc. instructions to operate vehicle lift system (100). In the present example, control cabinet (130) is in communication with lift assemblies (110, 120) via conduits (132), which may include wires, hydraulic lines, etc. It will be appreciated that other suitable methods of communication may be used. For instance, control cabinet (130) and lift assemblies (110, 120) may be equipped with wireless receivers and transmitters operable to establish wireless communication between control cabinet (130) and lift assemblies (110, 120). Other suitable methods of communication may be used as would be apparent to one of ordinary skill in the art in view of the teachings herein. While vehicle lift system (100) of the present example comprises a two-post in-ground lift, it should be understood that the teachings herein may be readily applied to various other kinds of vehicle lifts, including but not limited to in-ground scissor lifts, above ground lifts, and many other kinds of lifts as will be apparent to those of ordinary skill in the art.

A pendant control (150) is connected to a pendant cable (151). Pendant cable (151) may be routed through a wall, ceiling, etc. to connect to control cabinet (130). Pendant cable (151) in some instances may comprise a serial cable, but it will be understood that pendant cable (151) may include any suitable form of wired communication as would be apparent to one of ordinary skill in the art in view of the teachings herein. While in the exemplary version pendant control (150) is in communication with control cabinet (130) through pendant cable (151), it will be understood that pendant cable (151) need not be used. For instance, pendant control (150) and control cabinet (130) may be equipped with transceivers configured to wirelessly communicate information to each other. Pendant control (150) is operable to provide instructions to control cabinet (130) regarding operation of lift assemblies (110, 120). In some versions, pendant control (150) communicates directly with lift assemblies (110, 120), such that control cabinet (130) may be omitted (at least in part).

II. Pendant Control

Figure 2:
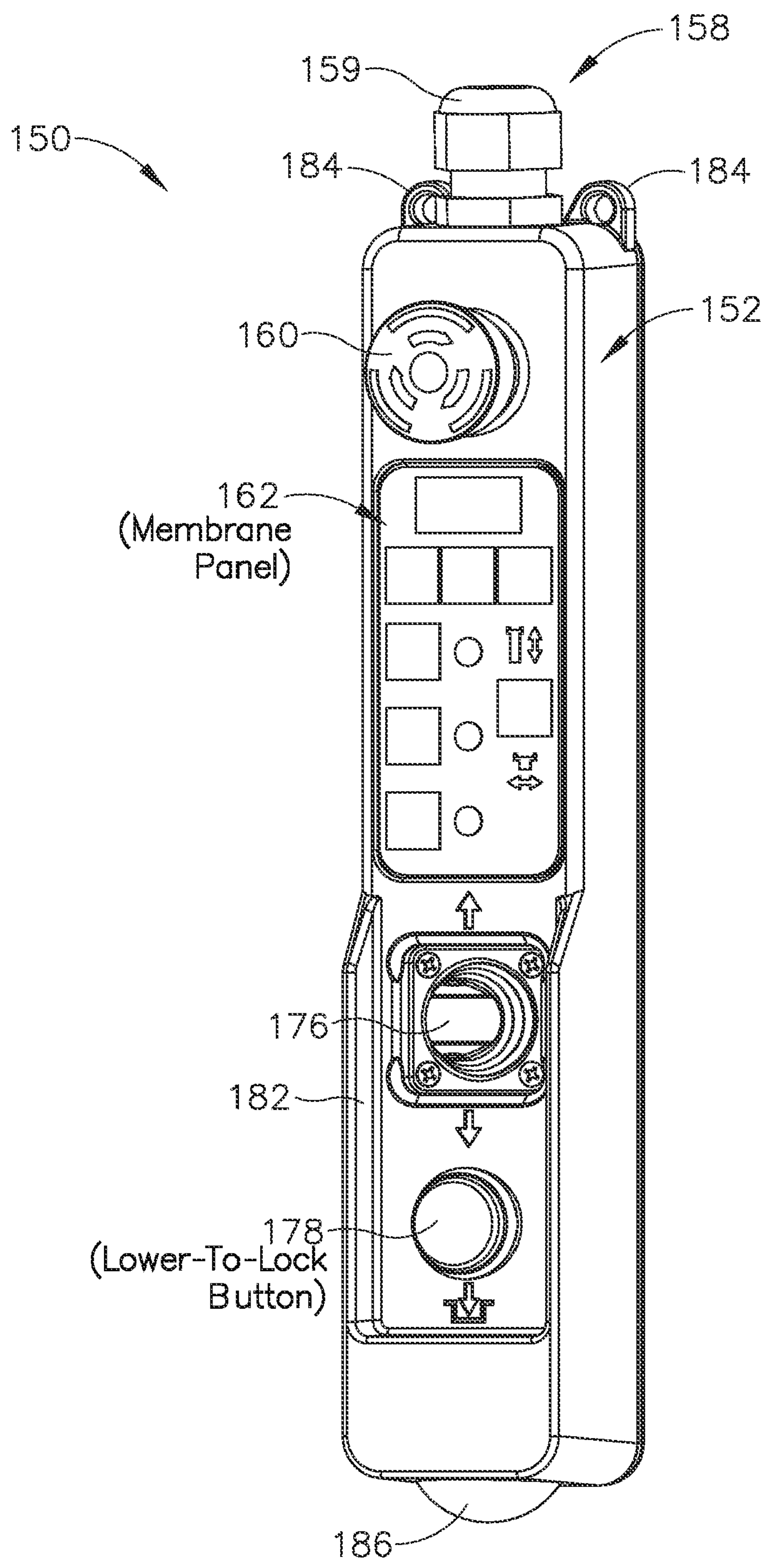
FIG. 2 depicts a front, perspective view of the pendant control of the system of FIG. 1.
Figure 3:
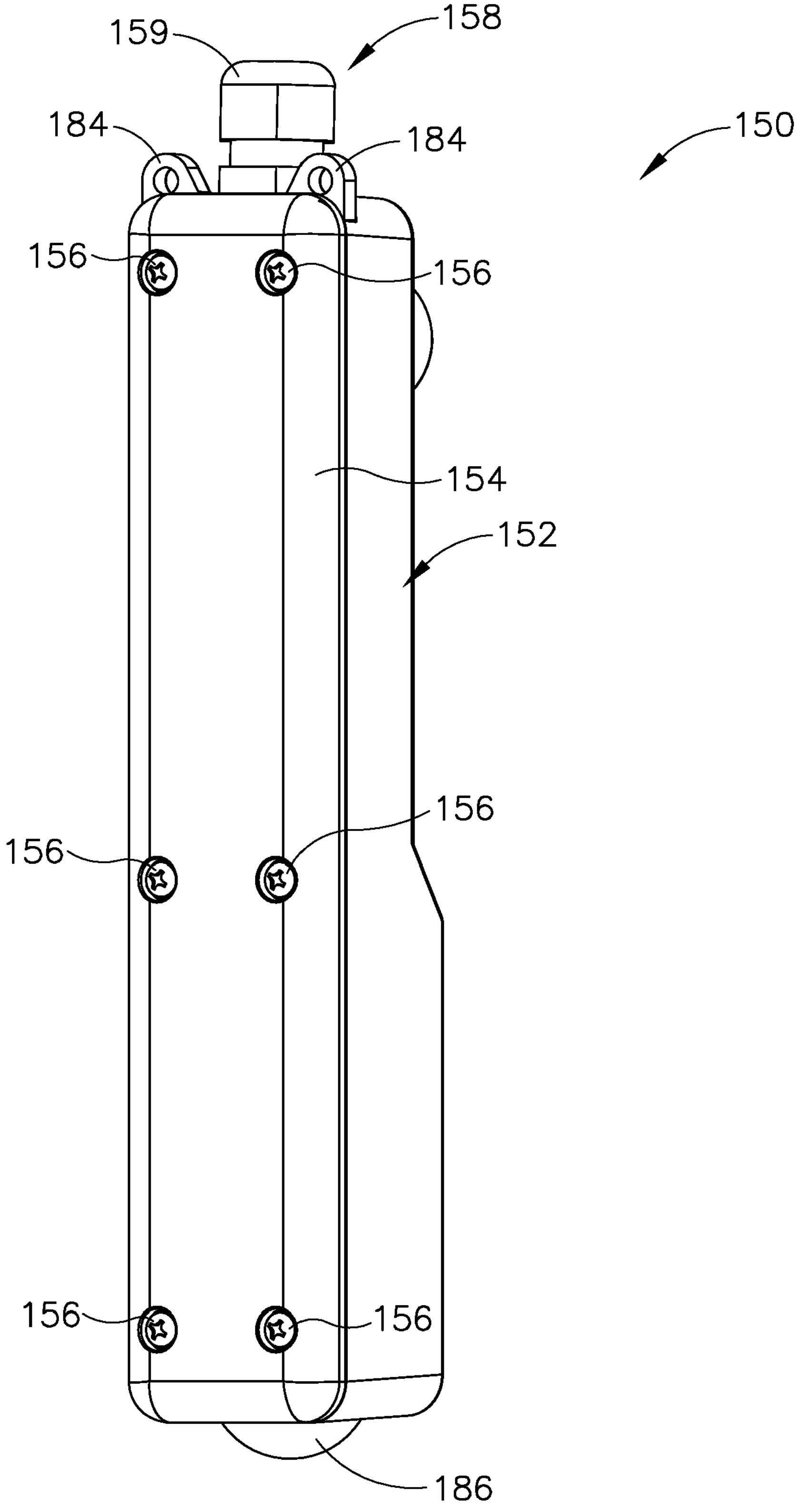
FIG. 3 depicts a rear, perspective view of the pendant control of FIG. 2.
Figure 4:
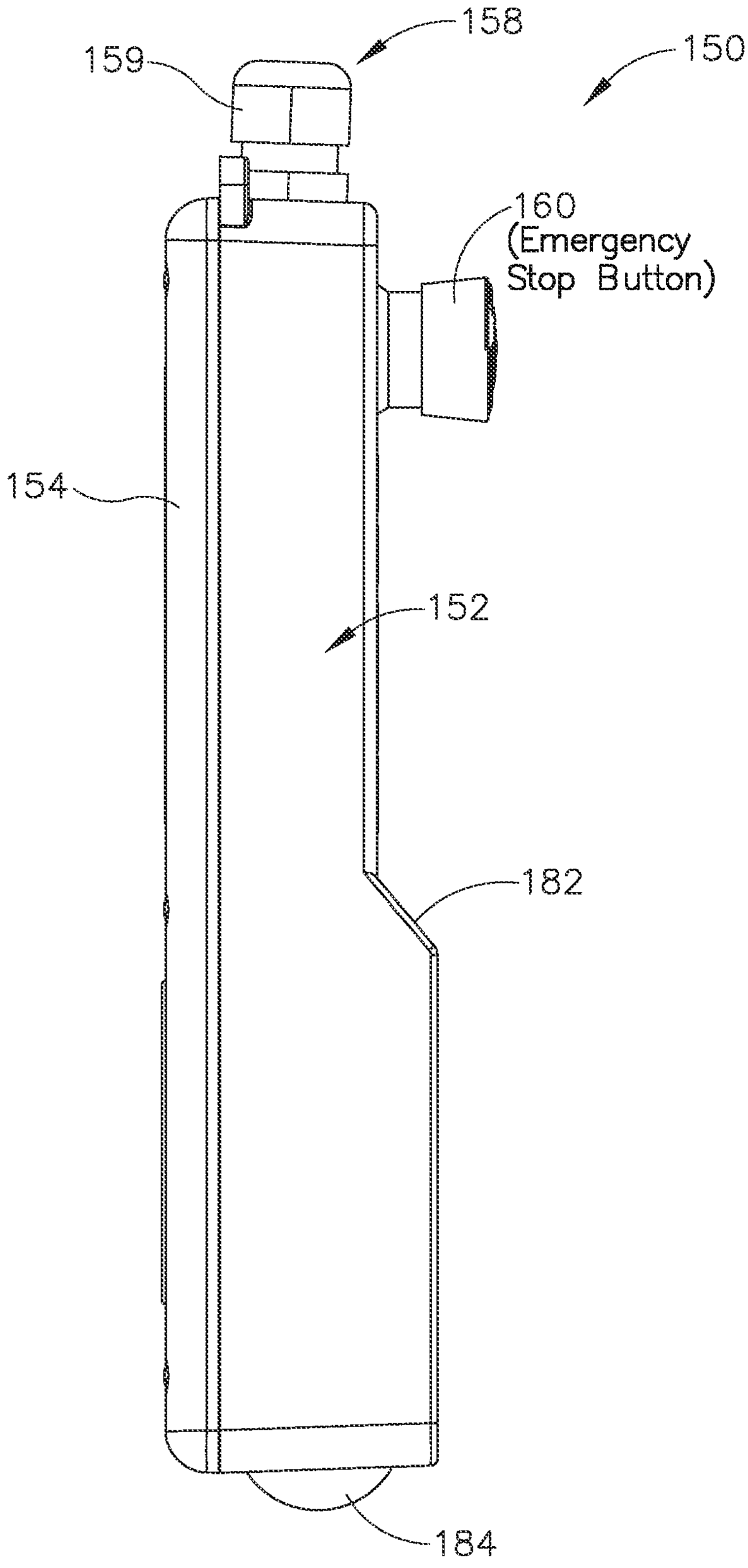
FIG. 4 depicts a side, elevation view of the pendant control of FIG. 2.
Figure 5:
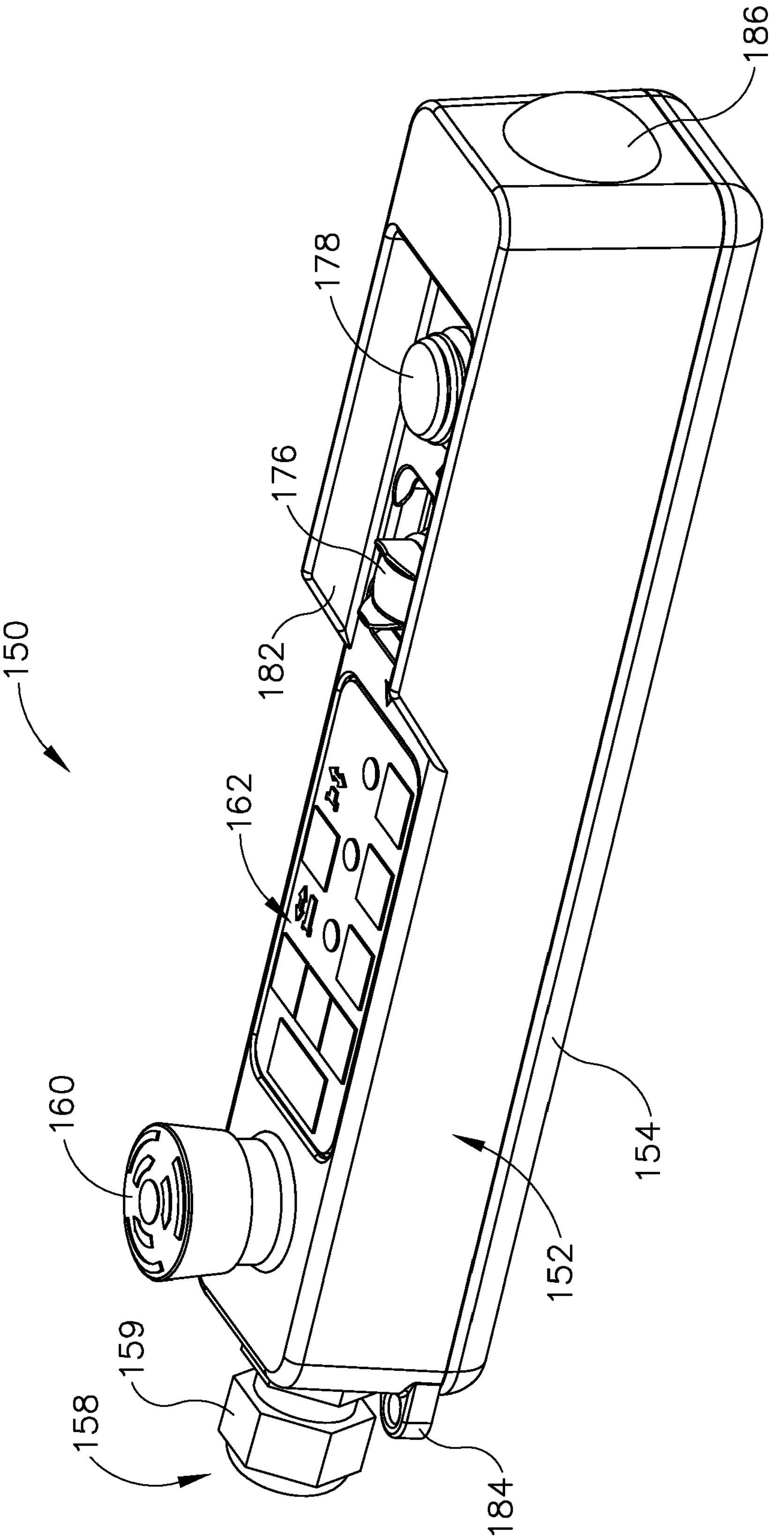
FIG. 5 depicts a side, perspective view of the pendant control of FIG. 2.

FIGS. 2-5 show an exemplary pendant control (150) operable for use with vehicle lift system (100). Pendant control (150) comprises a housing (152), a cord grip (158), an emergency stop button (160), a membrane panel (162), a lift rocker joystick (176), and a lower to lock button (178). Housing (152) has an elongated rectangle shape, but it will be understood that housing (152) may have any other suitable shape as would be apparent to one of ordinary skill in the art in view of the teachings herein. Housing (152) may be constructed of a durable plastic, rubber, metal, and/or other suitable material(s). Housing (152) includes a back plate (154), as seen in FIG. 3. Back plate (154) may be removed to gain access to internal portions of housing (152). A plurality of screws (156) secure back plate (154) onto housing (152). It will be understood that any suitable fasteners may be used to connect back plate (154) and housing (152). Housing (152) further includes two attachment portions (184) operable to receive a lanyard, string, keyring, or other suitable support structure. Although attachment portions (184) are shown as protruding from housing (152), it should be understood that attachment portions (184) may be of any other suitable design such as being integrated into the structure of housing (152). Housing (152) may also contain any suitable number of attachment portions (184), a single attachment portion (184), or attachment portions (184) may be omitted entirely.

Cord grip (158) has a removable cap (159) operable to tighten cord grip (158). Cord grip (158) is configured to engage pendant cable (151) to establish communication between pendant control (150) and pendant cable (151). It will be understood that cord grip (158) may be in communication with pendant cable (151) through a screw coupling, snap coupling, or any other suitable coupling mechanism. As can best be seen in FIG. 5, housing (152) has a dome cap (186). Dome cap (186) is operable to plug the bottom of housing (152). In some instances, cord grip (158) may be removed and placed in this position. Thus, cord grip (158) and pendant cable (151) may be selectively placed on the top or bottom of housing (152).

Emergency stop button (160) is shaped as a large circular, protruding button. Emergency stop (160) is operable to immediately initiate a stop action to bring posts (114, 124) and superstructures (112, 122) to a controlled stop. It will be understood that other suitable button shapes may be used that allow a user to quickly halt movement within vehicle lift system (100). It will be understood that pressing emergency stop button (160) sends instructions to control cabinet (130), which then commands lift assemblies (110, 120) to halt movement of lift superstructures (110, 112).

Figure 6:
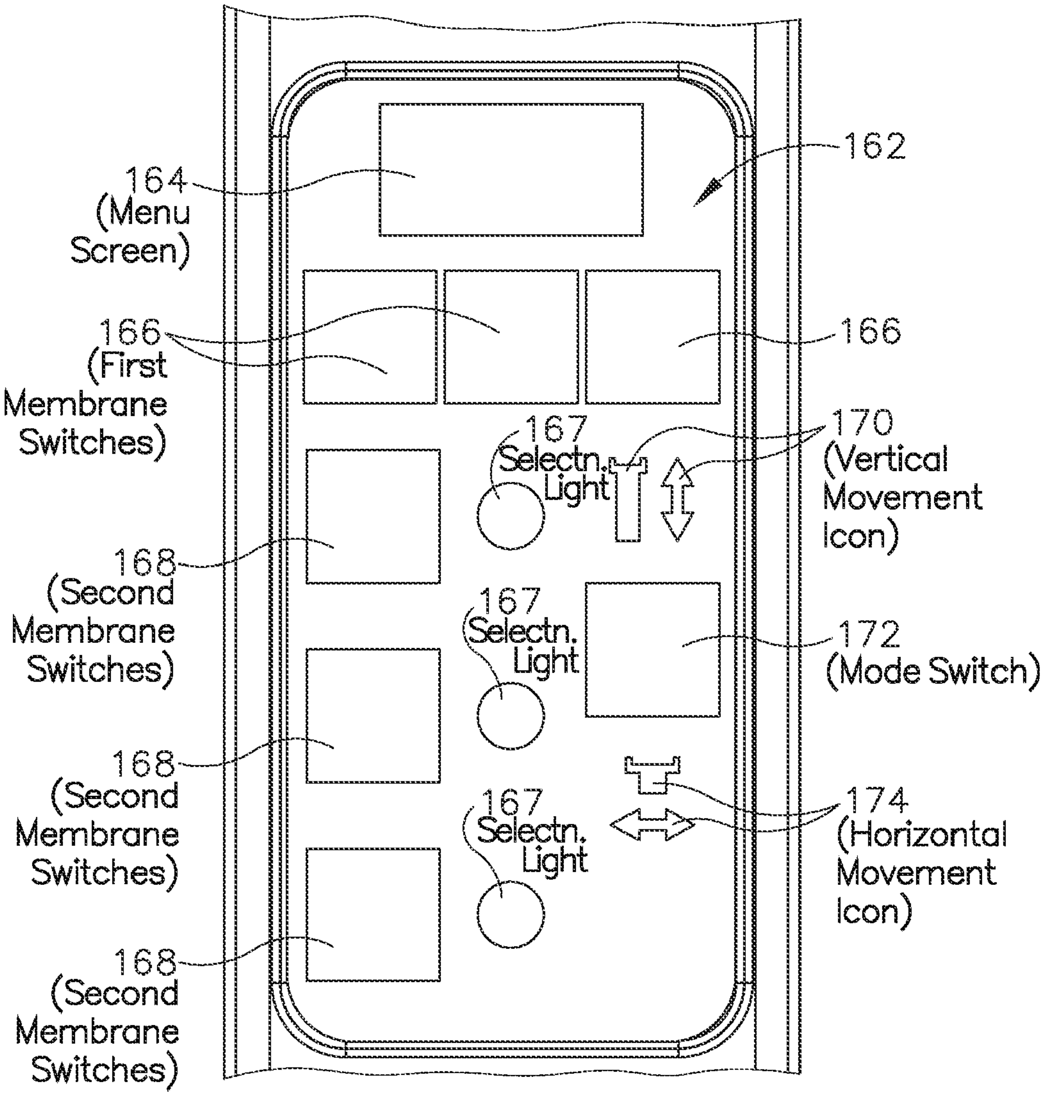
FIG. 6 depicts an enlarged, plan view of a control panel of the pendant control of FIG. 2.

FIG. 6 shows an enlarged view of membrane panel (162). Membrane panel (162) comprises a touchpad membrane, but it will be understood that other suitable constructions for membrane panel (162) may be used as would be apparent to one of ordinary skill in the art in view of the teachings herein. For instance, membrane panel (162) could comprise a face plate and corresponding buttons. Membrane panel (162) comprises a menu screen (164), first membrane switches (166), second membrane switches (168), mode switch (172), vertical movement icon (170), and horizontal movement icon (174). In some versions, all of these features are provided through a printed circuit board that is located behind membrane panel (162). Such a circuit board may also include hardware configured to provide communication with control cabinet (130).

Menu screen (164) may comprise an LCD, LED powered LCD, or any other suitable display. In the exemplary version, a three-character, seven-segment LED is used for menu screen (164). In some other versions, a single or dual screen display may be used instead. Menu screen (164) is operable to provide information to the user. Such information may include visual confirmation of button presses by the user or actions currently being carried out by vehicle lift system (100). Further information may include status information for vehicle lift system (100), error codes, diagnostic codes, heights of superstructures (112, 122), inch counts, and/or other messages regarding any of the components of vehicle lift system (100). Indeed, any suitable information may be provided by menu screen (164) as would be apparent to one of ordinary skill in the art in view of the teachings herein.

First membrane switches (166) comprise three switches (e.g., thin film switches covered by a membrane) that are horizontally aligned and operable to be pressed by the user. While the exemplary version shows three switches, any other suitable number of switches may be provided. Furthermore, any orientation of buttons for first membrane switches (166) may be used as well. First membrane switches (166) may include an “up,” “down,” and “enter” button as seen in FIG. 6. It will be appreciated that first membrane switches (166) may be used to navigate menus displayed on menu screen (164). For instance, “up” and “down” may be used to cycle through menu options. “Enter” may be used to select/confirm a menu option. It will be understood that any suitable controls may be used for first membrane switches (166) as would be apparent to one of ordinary skill in the art in view of the teachings herein.

First membrane switches (166) and menu screen (164) may be used together to cycle through and select vehicle profiles. Such vehicle profiles may be stored in pendant control (150), control cabinet (130), and/or any other suitable location(s). Lift system (100) may include stored vehicle profiles for a variety of specific vehicle types (e.g., down to the make/model/year, etc.) and/or for a variety of vehicle categories (e.g., bus, truck, etc.). Such vehicle profiles may include a variety of information that may be used to control or otherwise influence various aspects of lift system (100) operation. By way of example only, vehicle profiles may include information relating to a vehicle’s wheelbase dimensions, a vehicle’s height, a vehicle’s axle configuration, etc. Of course, the vehicle profile need not necessarily include actual values for a vehicle’s wheelbase dimensions, a vehicle’s height, a vehicle’s axle configuration, etc. A vehicle profile may instead include sets of instructions for lift system (100) that are based on a vehicle’s wheelbase dimensions, a vehicle’s height, a vehicle’s axle configuration, etc. Various other kinds of information that may be stored in a vehicle profile will be apparent to those of ordinary skill in the art in view of the teachings herein. Data from the vehicle profile may be displayed on menu screen (164); in addition to displaying information such as status information for vehicle lift system (100), error codes, diagnostic codes, heights of superstructures (112, 122), inch counts, and/or other messages as noted above.

By way of example only, information in a selected vehicle profile may be used by lift system (100) to provide height limit stops (e.g., to ensure clearance between the highest part of the vehicle and the ceiling of the garage/shop room where it is located), to influence where adapters should be positioned along superstructures (112, 122), to determine expected axle engagement heights, etc. Vehicle profiles may also provide instructions for positioning post (124) and superstructure (122) at the appropriate location along longitudinal path (128) for a particular vehicle (or for a vehicle matching a particular profile). In some instances, axle engagement adapters on each superstructure (112, 122) are automated, such that the axle engagement adapters automatically move into the appropriate axle engaging position based on the selected vehicle profile. Such movement may be provided hydraulically, pneumatically, mechanically, electromechanically, and/or in any other suitable fashion. The operator may thus move all of the axle engagement adapters superstructures (112, 122) into position with a single key press through membrane switches (166). Various other ways in which a vehicle profile may be used to influence operation of lift system (100) will be apparent to those of ordinary skill in the art in view of the teachings herein.

It should be understood from the foregoing that the combination of membrane switches (166) and screen (164) provide interactive lift status and control from pendant control (150). In an exemplary use, the user may use membrane switches (166) and menu screen (164) on pendant control (150) to select the appropriate vehicle profile that matches with the vehicle that the user wishes to lift. Pendant control (150) may transmit the user's selection to control cabinet (130), which may command lift assembly (120) to position post (124) and superstructure (122) at the appropriate location along longitudinal path (128) for the selected vehicle profile. Control cabinet (130) may also command axle engagement adapters on each superstructure (112, 122) to move to the appropriate positions. The user may then use pendant control (150) to raise the vehicle. Data from the selected vehicle profile may continue to influence the operation of lift system (100), such as by restricting the permitted lift height, etc. Other suitable uses for first membrane switches (166) will be apparent to those of ordinary skill in the art in view of the teachings herein. It should also be understood that vehicle profiles and associated lift points may be updated in pendant control (150) as desired, using a laptop computer or other device.

In the present example, second membrane switches (168) comprise a set of three buttons arranged vertically. However, it will be understood that any other suitable number and arrangement of buttons may be used. Second membrane switches (168) are operable to select a single particular lift assembly (110, 120) for controlling. For instance, if the user wishes to only operate one lift assembly (110, 120), the user may press just one switch (168). If the user wishes to operate two lift assemblies (110, 120), the user pay press a first switch (168) and a second switch (168). It will be understood that the number of second membrane switches (168) may correspond to the number of lift assemblies (110, 120) present. In some instances, however, the number of second membrane switches (168) may be greater or less than the number of lift assemblies (110, 120) present in vehicle lift system (100).

A plurality of lights (167) may run along second membrane switches (168). Each lights (167) may comprise an LED or any other suitable light source as will be apparent to one of ordinary skill in the art in view of the teachings herein. It will be understood that lights (167) may illuminate to indicate to the user which lift assemblies (110, 120) have been selected by switches (168) for operation. It will be appreciated that in some versions, lights (167) may be operable to illuminate in different colors or patterns to indicate to the user different statuses regarding superstructures associated with second membrane switches (168).

Mode switch (172) may be pressed by the user to toggle between different modes. In the present example, mode switch (172) toggles between a first mode and a second mode. In the first mode, pendant control (150) is operable to control vertical movement of posts (114, 124) and superstructures (112, 122) relative to inground portions (116, 126). In the second mode, pendant control (150) is operable to control horizontal movement of post (124) and superstructure (122) along longitudinal path (128). A vertical movement icon (170) is positioned above mode switch (172). Vertical height icon (170) comprises a graphical representation of a lift post and superstructure next to a vertically pointing double arrow. A horizontal movement icon (174) is positioned below mode switch (172). Horizontal movement icon (174) comprises a graphical representation of a lift post and superstructure next to a horizontally pointing double arrow. Icons (170, 174) comprise backlit cutouts formed in housing (152). The backlit feature of icons (170, 174) is achieved by LEDs or the like. Icons (170, 174) will illuminate based on the operator's mode selection through mode switch (172). In particular, when the operator selects the first mode, icon (170) illuminates. When the operator selects the second mode, icon (174) illuminates. As the operator repeatedly presses mode switch (172), the illumination of icons (170, 174) may toggle back and forth between icons (170, 174). It should be understood that icons (170, 174) may have any other suitable configurations.

Figure 7:
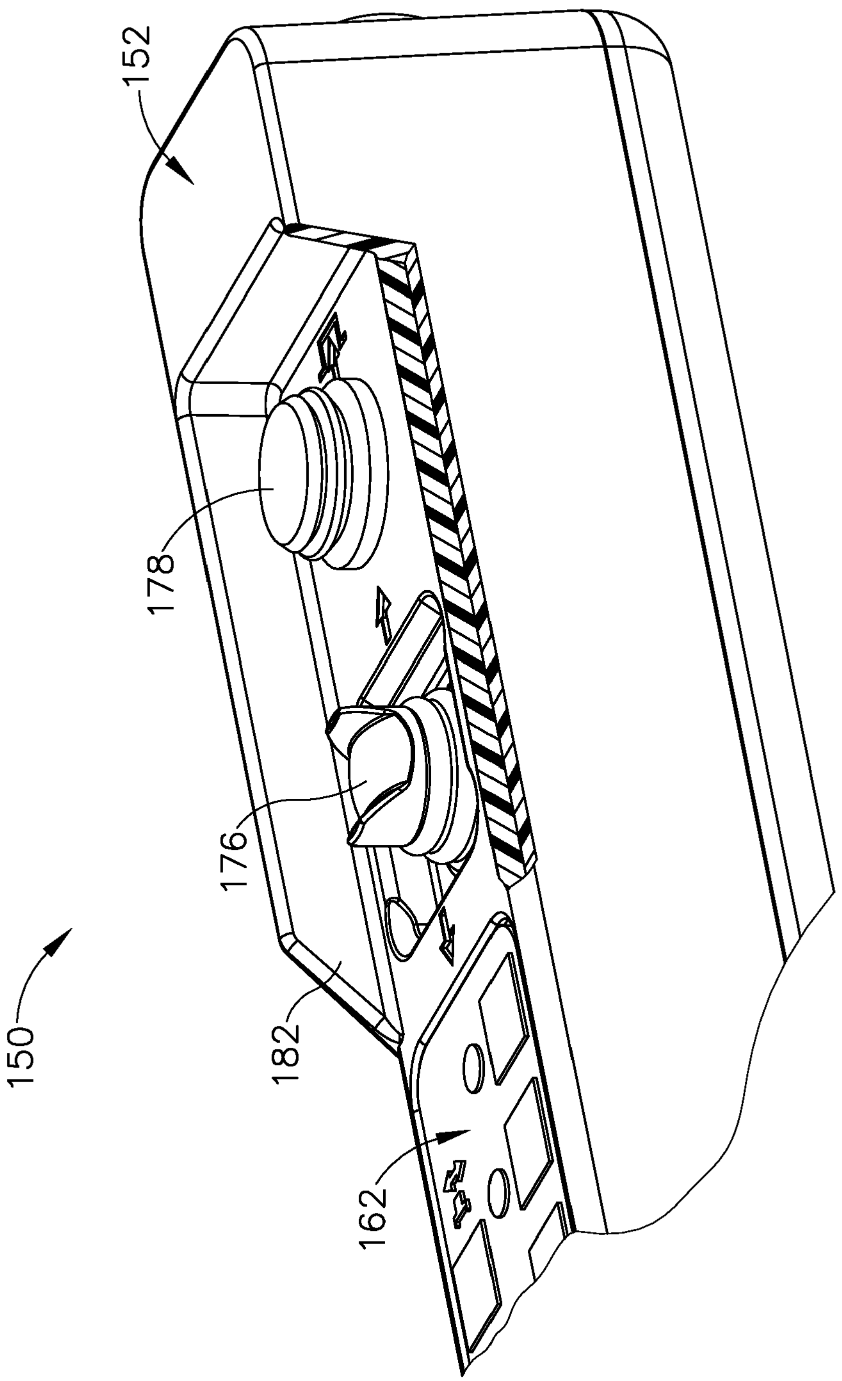
FIG. 7 depicts an enlarged, perspective cutaway view of a lift rocker joystick and a lower to lock button of the pendant control of FIG. 2.

FIG. 7 depicts a cutaway view which shows lift rocker joystick (176) and lower to lock button (178). Lift rocker joystick (176) comprises a rocker switch, but any suitable switch type may be used as would be apparent to one of ordinary skill in the art in view of the teachings herein. Lift rocker joystick (176) is operable to control the movement of lift superstructures (110, 112). For instance, when the first mode of operation is selected, pressing the upper portion of rocker joystick (176) forward (e.g., toward lower lock button (178)) raises posts (114, 124) and superstructures (112, 122) relative to the ground; while pressing the lower portion of rocker joystick (176) backward (e.g., toward membrane panel (162)) lowers posts (114, 124) and superstructures (112, 122) relative to the ground. When the second mode of operation is selected, pressing the upper portion of rocker joystick (176) forward causes post (124) and superstructure (122) to translate along longitudinal path (128) in a direction away from lift assembly (110); while pressing the lower portion of rocker joystick (176) backward causes post (124) and superstructure (122) to translate along longitudinal path (128) in a direction toward lift assembly (110).

Lower to lock button (178) comprises a single, circular, pressable button, but it will be understood that any suitable button may be used as would be apparent to one of ordinary skill in the art in view of the teachings herein. Lower to lock button (178) is operable to instruct lift assemblies (110, 120) to lower posts (114, 124) and superstructures (112, 122) to a point where a mechanical lock feature is engaged in each lift assembly (110, 120), which may prevent further downward movement of posts (114, 124) and superstructures (112, 122) until the mechanical lock feature is disengaged. For instance, each lift assembly (110, 120) may have a mechanical lock feature that comprises a lock bar (190) and an engaging component (192) that is configured to engage the lock bar. Such mechanical lock features may permit posts (114, 124) and superstructures (112, 122) to ascend freely; while selectively restricting descent of posts (114, 124) and superstructures (112, 122). In particular, the mechanical lock features may prevent posts (114, 124) and superstructures (112, 122) from descending unless a lock release is activated (e.g., an activated lock release may prevent the engaging component from engaging the lock bar). During normal descent of posts (114, 124) and superstructures (112, 122), the lock releases may be activated to permit posts (114, 124) and superstructures (112, 122) to descend without being impeded by the lock features. When posts (114, 124) and superstructures (112, 122) are not in a normal descent mode (e.g., during an ascent mode), the lock releases may be de-activated, such that the lock features may prevent a posts (114, 124) and superstructures (112, 122) pair from falling to the ground in the event of a sudden pressure loss in the hydraulic system associated with post (114, 124). Of course, any other suitable kind of lock features may be used.

Housing (152) also includes raised ribs (182) that extend outwardly past rocker joystick (176) and lower to lock button (178) such that ribs (182) prevent inadvertent pressing of rocker joystick (176) and lower to lock button (178). It will be understood to other features may be used to shield rocker joystick (176) and lower to lock button (178). For instance, a pivotable cover or any other suitable structure may be used.

Figure 8:
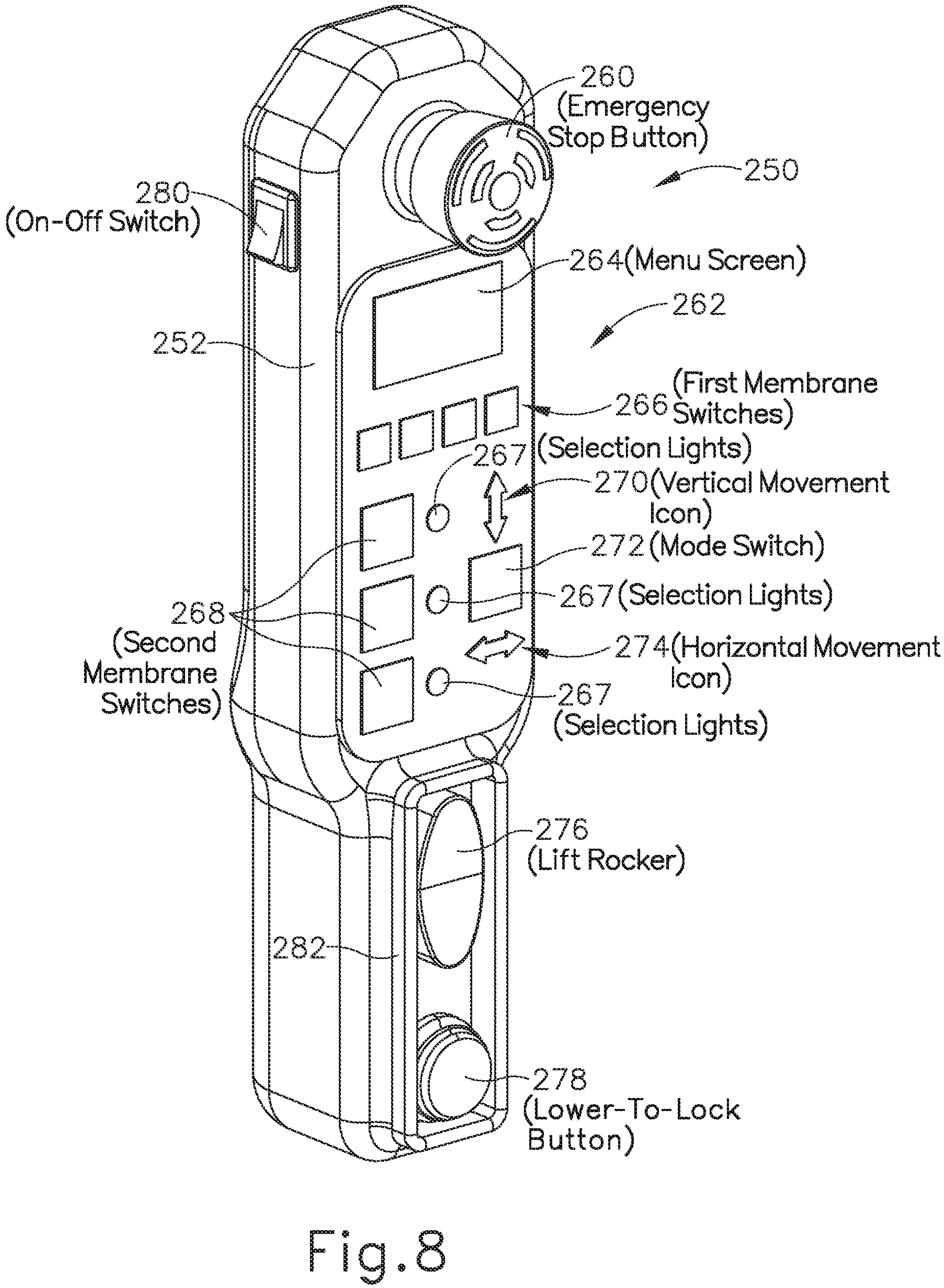
FIG. 8 depicts a front, perspective view of an exemplary alternative pendant control.
Figure 9:
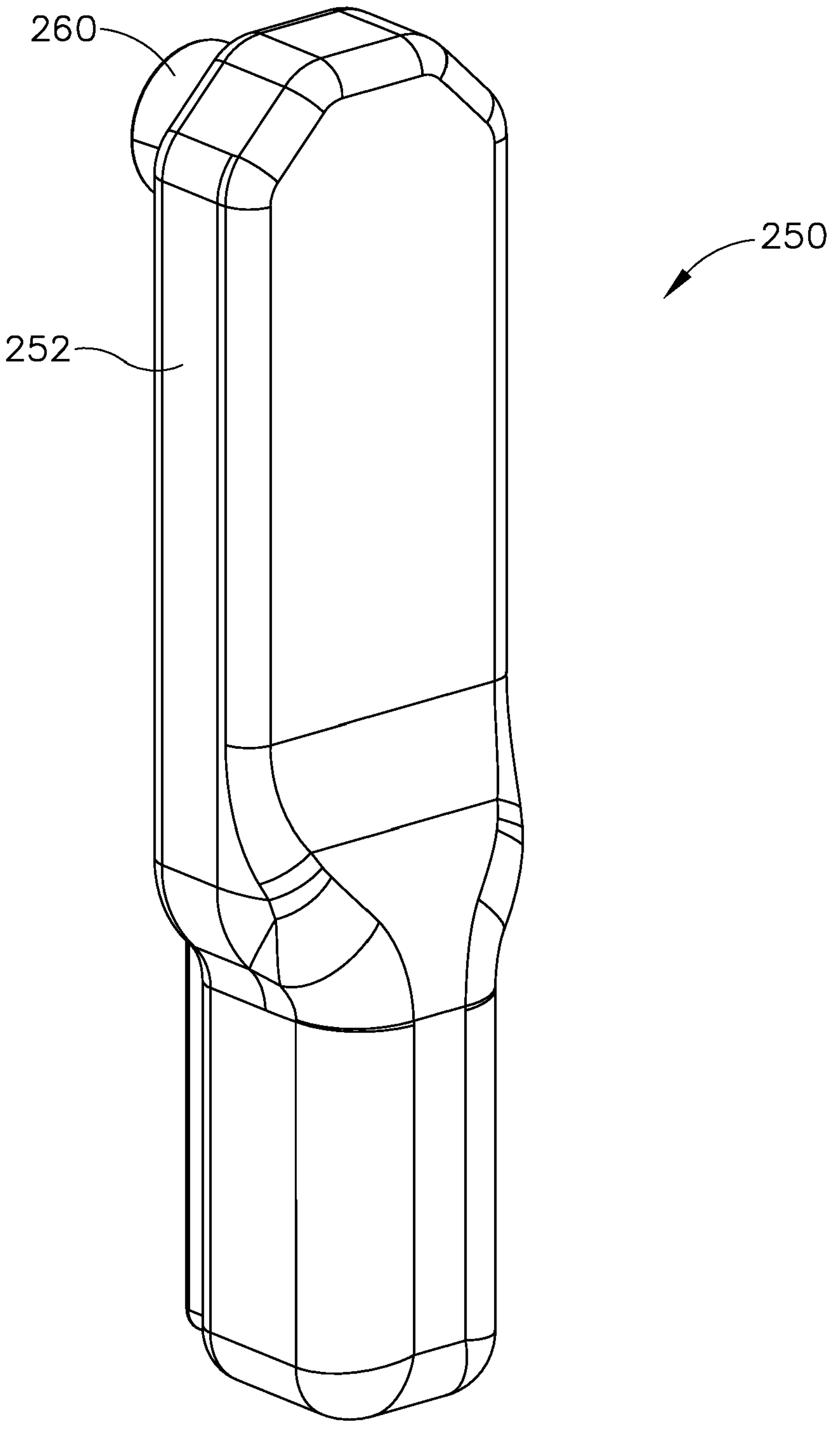
FIG. 9 depicts a rear, perspective view the pendant control of FIG. 8.
Figure 10:
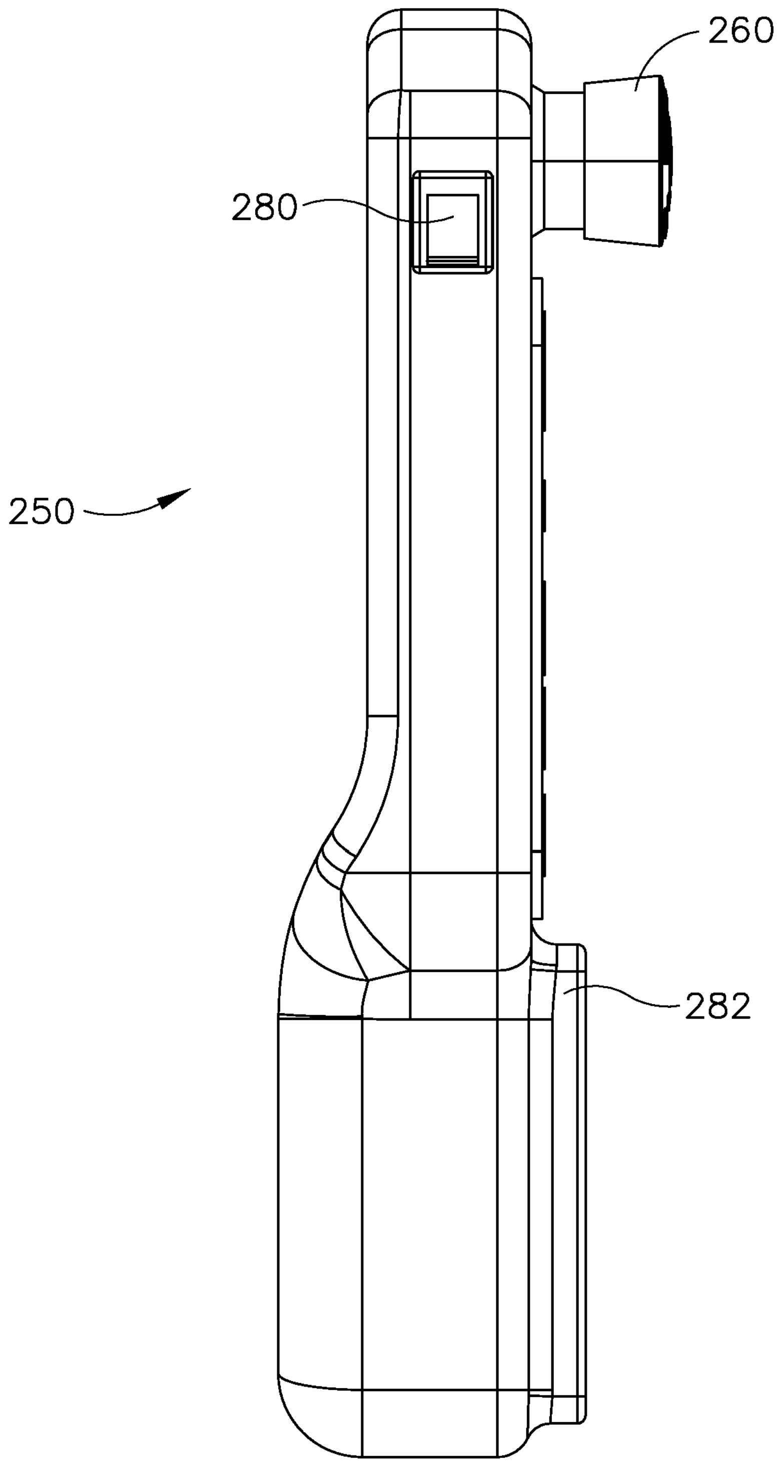
FIG. 10 depicts a side, elevational view of the pendant control of FIG. 8.

FIGS. 8-10 depict an exemplary alternative pendant control (250) comprising a housing (252), emergency stop button (260), membrane panel (262), menu screen (264), mode switch (272), upper LED cutouts (270), lower LED cutouts (274), first membrane switches (266), second membrane switches (268), plurality of lights (267), ribbed portion (282), lift rocker (276), lower to lock button (278), and on-off switch (280). It will be appreciated that emergency stop button (260), membrane panel (262), mode switch (272), upper LED cutouts (270), lower LED cutouts (274), first membrane switches (266), second membrane switches (268), plurality of lights (267), lift rocker (276), and lower to lock button (278) are substantially similar to emergency stop (160), membrane panel (162), mode switch (172), vertical movement icon (170), horizontal movement icon (174), first membrane switches (166), second membrane switches (168), plurality of lights (167), lift rocker joystick (176), lower to lock button (178), and on-off switch (180), respectively, described above. Some of the differences between pendant control (250) and pendant control (150) will be discussed below.

Alternative pendant (250) is shown as having a different configuration of first membrane switches (266). In particular, pendant (250) is shown as having four membrane switches (266) as opposed to three membrane switches (266). It will be appreciated that first membrane switches (266) may be used to navigate menus displayed on menu screen (264). For instance, "up" and "down" may be used to cycle through menu options. "Enter" may be used to select/confirm a menu option. "Cancel" may be used to cancel an option. As described above, it should be understood that any suitable controls may be used for first membrane switches (266) as would be apparent to one of ordinary skill in the art in view of the teachings herein.

On-off switch (280) is positioned on the side of pendant (250). On-off switch (280) is operable to turn pendant (250) on or off. It will be understood that while the exemplary version shows a switchable rocker for on-off switch (280), other suitable switches may be used as would be apparent to one of ordinary skill in the art in view of the teachings herein. In other versions, such as pendant (150), above, on-off switch (280) may be omitted entirely.

Housing (252) of pendant (250) has a different shape than housing (152) of pendant (150). In particular, housing (252) is shaped to be flatter with rounded and beveled corners. Furthermore, housing (252) is shaped such that the upper portion of housing (252) is wider than the bottom portion. It will be understood that any suitable shape for housing (252) may be used as would be apparent to one of ordinary skill in the art in view of the teachings herein. Menu screen (264) of pendant comprises a single LCD screen operable to display information to the user. As mentioned above, menu screen (264) may be constructed of a single display but may also be configured to be a multi-part display as seen in FIG. 2. Rib (282) of pendant (250) comprises a raised, rounded, rectangular perimeter operable to encircle rocker (276) and lower to lock button (278). Of course, rib (282) may have any other suitable configuration.

III. Actuator-Driven Angular Arm Rotation

As has been discussed, the pendant control (150) and vehicle profile management and selection process may be used with a variety of lift types and lift mechanisms. Lifts have conventionally been limited in the amount of adjustment of each portion of the lift due to the manual nature of conventional lift adjustment. The ability to automate lift adjustment by managing and selecting vehicle profiles via a device such as the pendant control (150) makes a variety of options in lift adjustment a convenience rather than an additional hassle.

Figure 11:
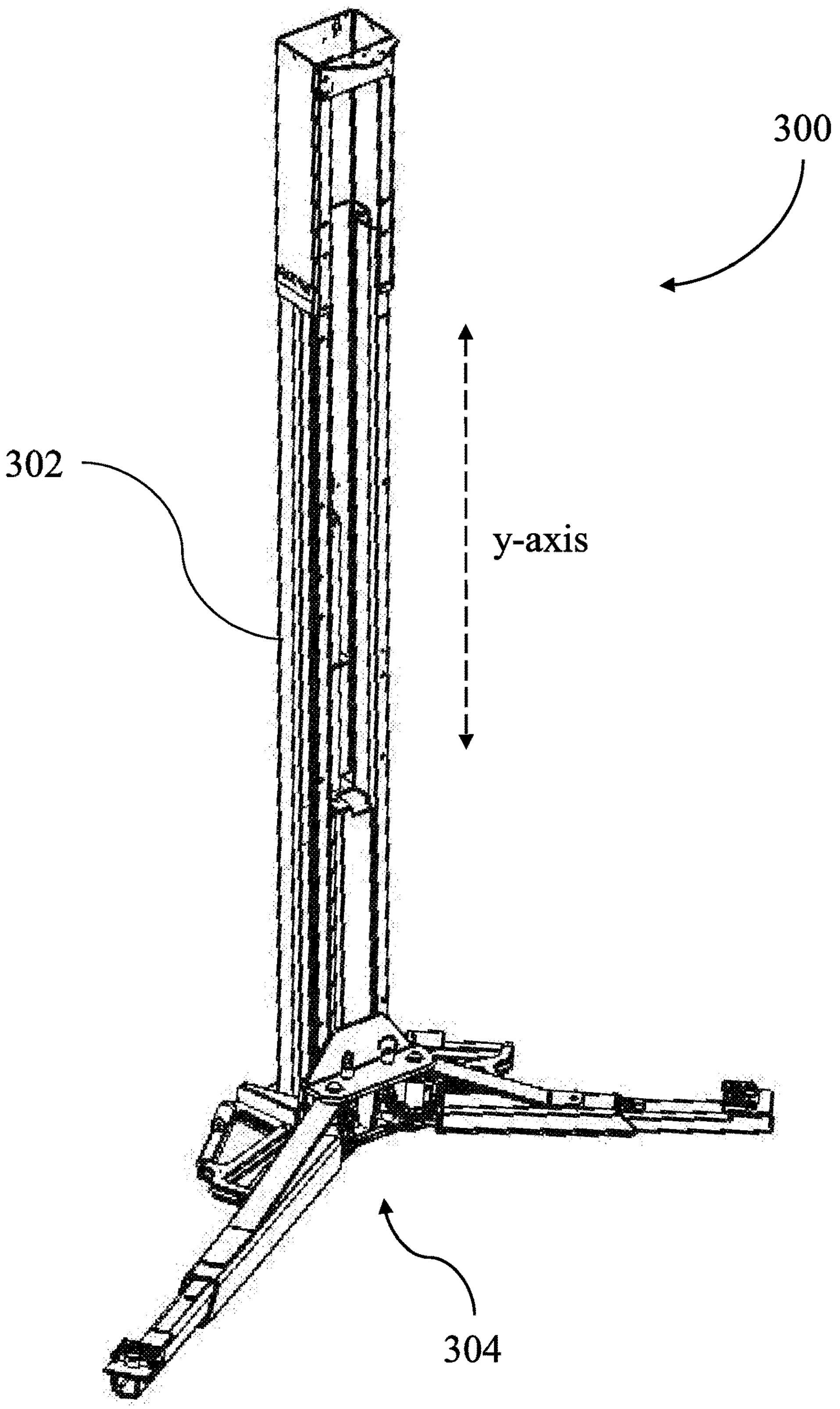
FIG. 11 depicts a front perspective view of a first exemplary lift.

FIG. 11 shows a lift (300), which may be used in pairs, having additional adjustment options that may be used with the pendant control (150) and vehicle profile management and selection process. The lift (300) comprises a lift tower (302) and a lift base (304). The lift base (304) may be moved in one dimension, horizontally along the shown y-axis, by a mechanism of the tower (302) either manually (e.g., by using specific adjustment inputs on a pendant control (150)) or automatically (e.g., as a result of a profile selection).

Figure 12:
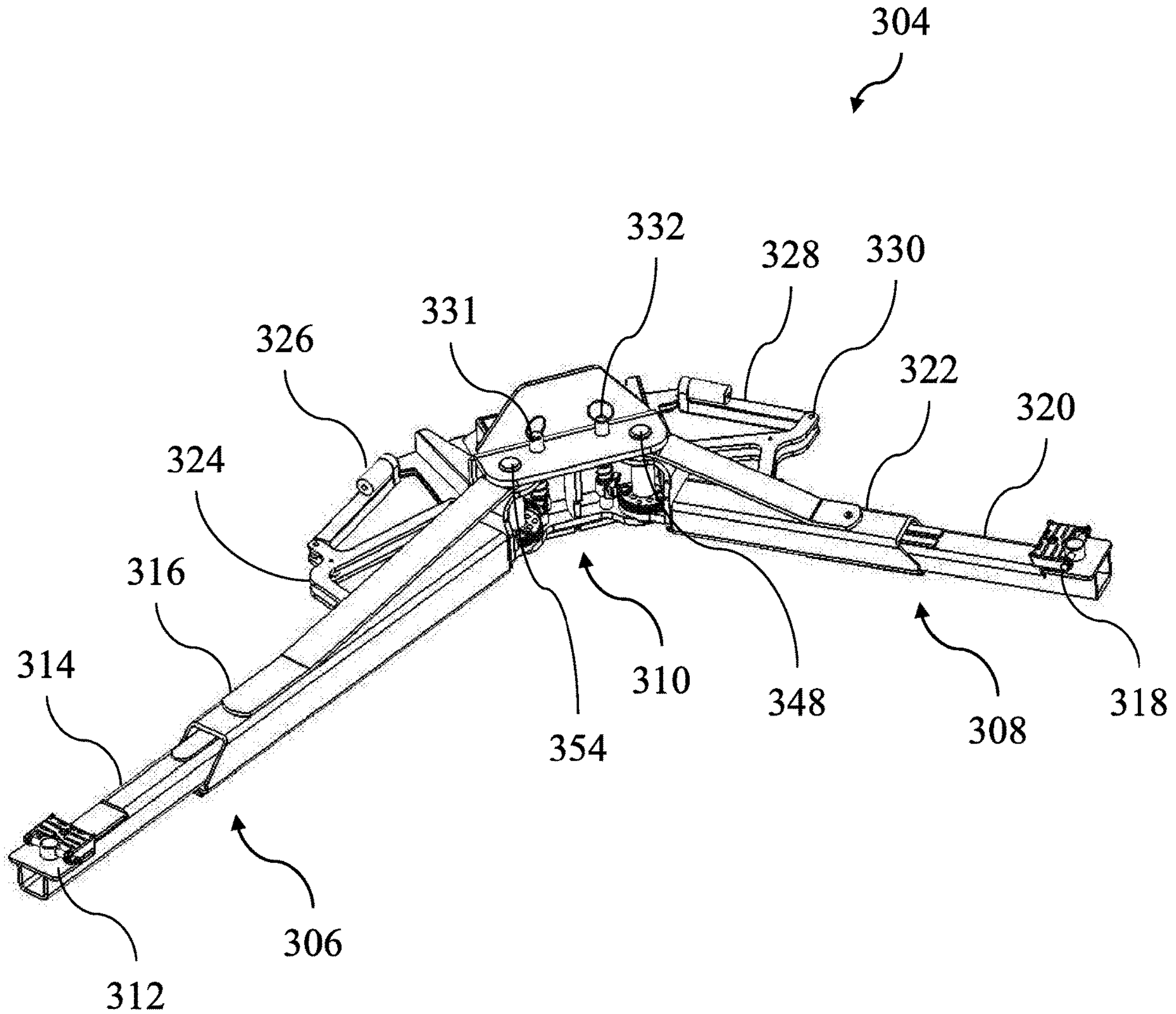
FIG. 12 depicts a front perspective view focusing on a lift base of the first exemplary lift.
Figure 13:
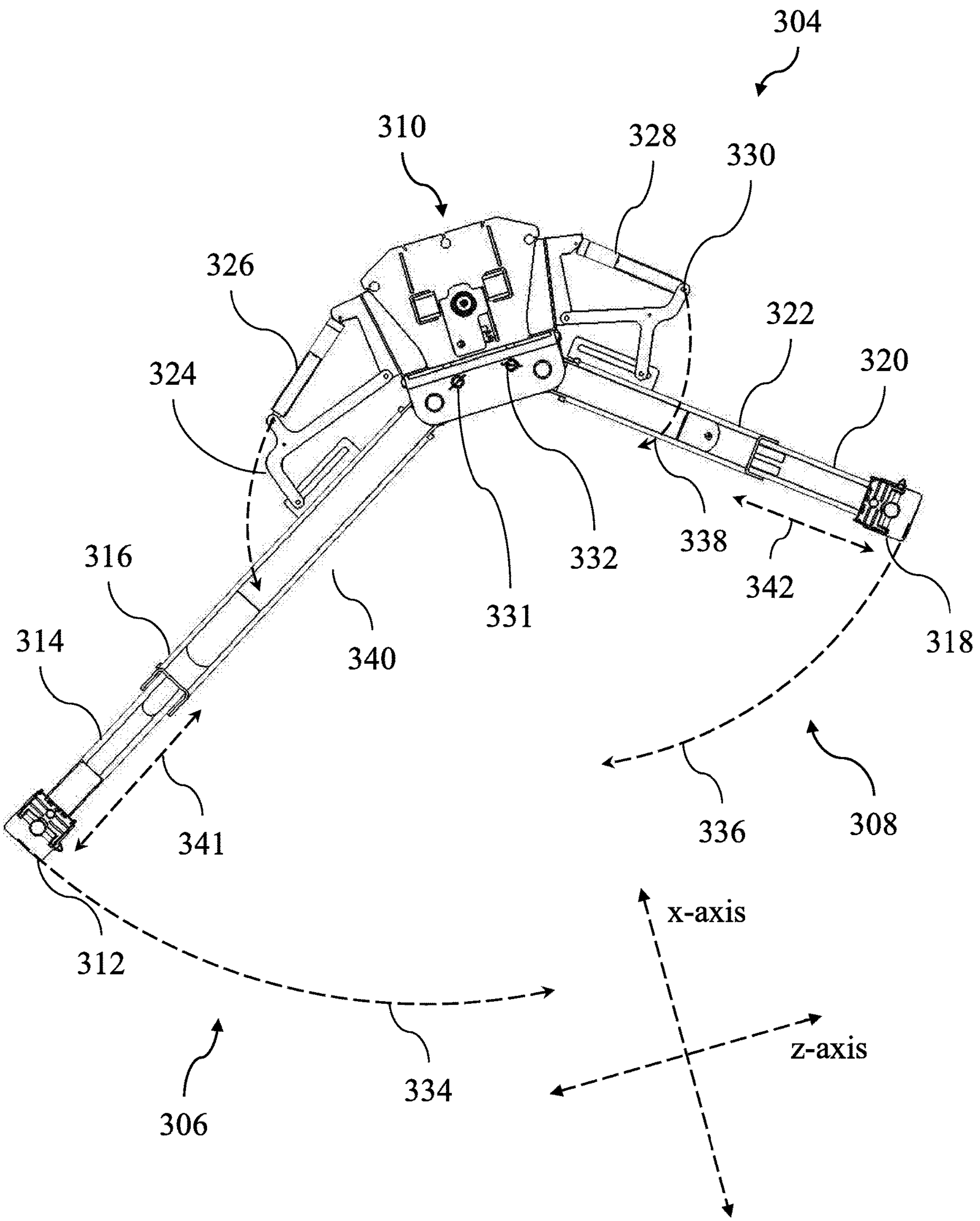
FIG. 13 depicts a top plan view of the lift base of the first exemplary lift.

Referring to FIGS. 12 and 13, the lift base (304) comprises a long arm (306), a short arm (308), and an arm housing (310). The long arm (306) comprises an adapter (312) which can be sized and shaped in various ways to match lift points on a variety of vehicles. The adapter (312) is positioned at the end of a moving section (314) of the long arm (306), and the moving section (314) extends from within static section (315) of the long arm (306). The static section (316) is rotatably fixed to the arm housing (310) and cannot itself extend. The moving section (314) is sized and shaped to nest within the static section (316), and it can extend from the static section (316) and recede into the static section (316) to achieve a desired position or length for the overall long arm (306). FIG. 13 shows an arm extension path (341) of the long arm (306) that approximates the direction traveled by the moving section (314) in this manner. The short arm (308) also comprises an adapter (318), a moving section (320), and a static section (322) having similar capabilities as described in relation to the long arm (306), and a similar arm extension path (342) during extension or retraction.

Figure 14:
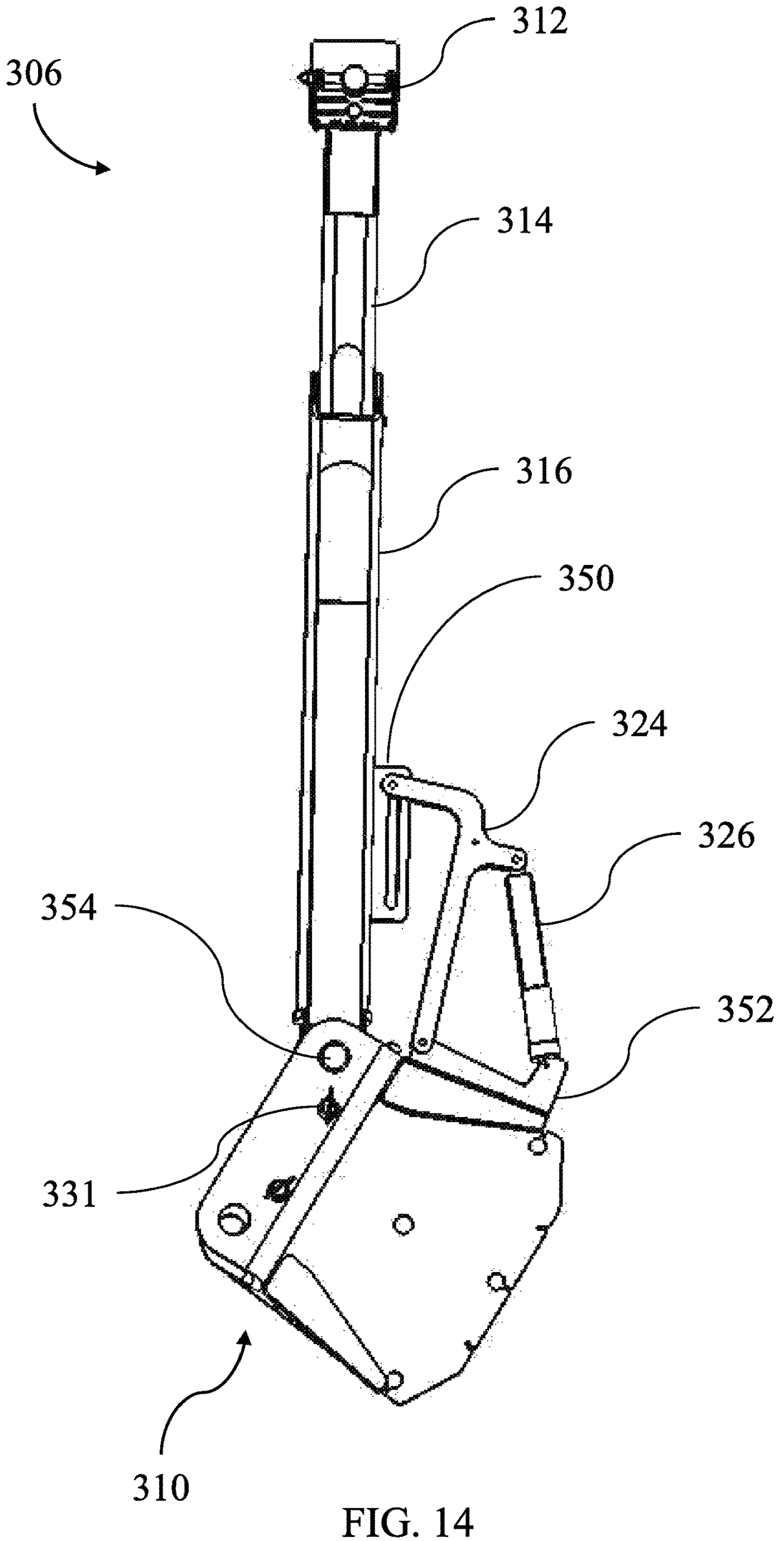
FIG. 14 depicts a top plan view of the lift base of the first exemplary lift focusing on a long arm.
Figure 16:
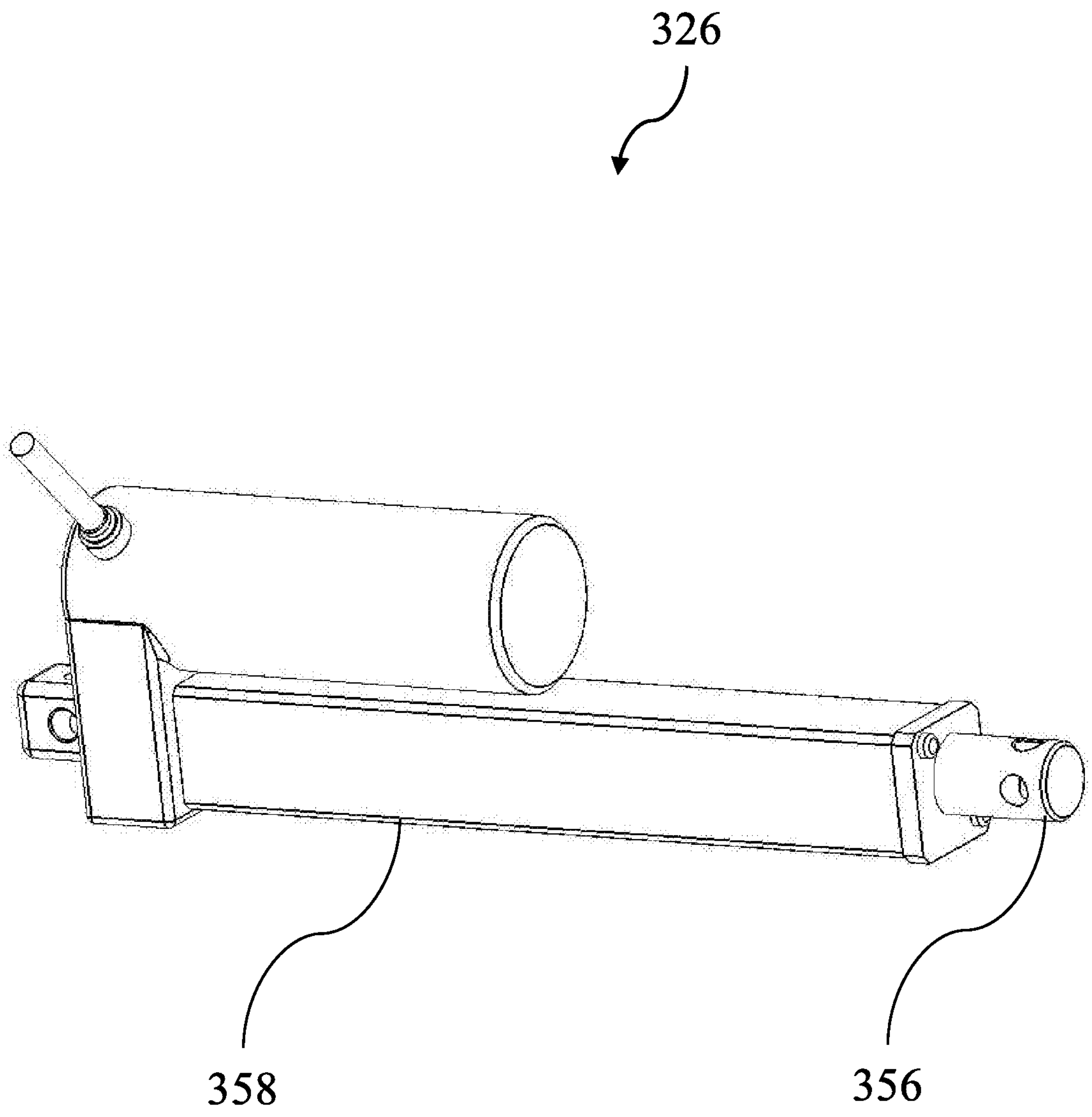
FIG. 16 depicts a front perspective view of a linear actuator of the first exemplary lift.

Referring to FIG. 14, which focuses on the long arm (306), the static section (316) of the long arm (306) is connected to the arm housing (310) by an arm pin (354) that passes through the arm housing (310) and the static section (316) and allows the long arm (306) to rotate about the arm pin (354). A linkage (324) is rotatably attached to an arm slide bracket (350) at the back of the long arm (306), so that the linkage (324) can both rotate around and slide along the arm slide bracket (350). The linkage (324) is also rotatably attached to both a housing bracket (352) of the arm housing (310) and to a linear actuator (326), which itself is attached to the housing bracket (352). As can be seen in FIG. 16, the linear actuator (326) is selectively operable to extend a push rod (356) from the actuator body (358) or retract the push rod (356) into the actuator body (358). Returning to FIG. 14, it can be seen that when the linear actuator (326) extends its push rod (356) (shown in FIG. 16), the linkage (324) will rotate as its connection point to the housing bracket and both rotate and slide along its connection point to the arm slide bracket (350), also causing the long arm (306) itself to rotate about the arm pin (354). Dashed lines in FIG. 13 approximately show an adapter rotation path (334) and a linkage rotation path (340) that result from movement of the linear actuator (326) during extension and retraction of the push rod (356).

Figure 15:
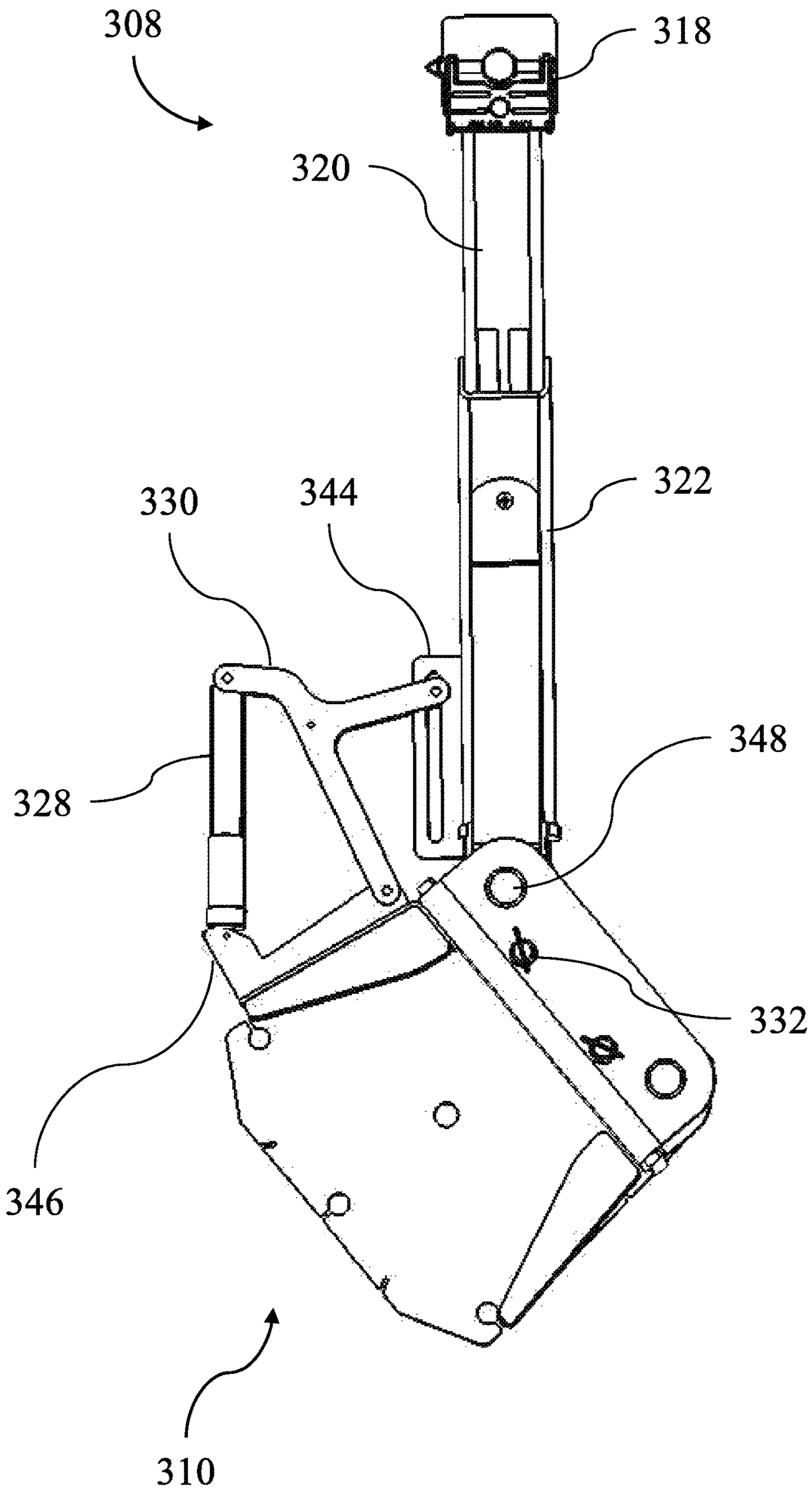
FIG. 15 depicts a top plan view of the lift base of the first exemplary lift focusing on a short arm.

FIG. 15 focuses on the short arm (308). As described in relation to the long arm (306), the short arm (308) is rotatably attached to the arm housing (310) at an arm pin (348). A linkage (330) is connected to an arm slide bracket (344) on the back side of the short arm (308) such that it can both rotate around and slide along the arm slide bracket (344). The linkage (330) is also rotatably connected to a housing bracket (346) of the arm housing (310), and to a linear actuator (328), which itself is rotatably connected to the housing bracket (346). The linear actuator (328) is similar to that shown in FIG. 16 and is similarly operable to extend and retract, causing the short arm (308) to rotate at the arm pin (348). Returning to FIG. 13, dotted lines approximately show a linkage rotation path (338) and an adapter rotation path (336) resulting from extension and retraction of the linear actuator (328) in this manner.

FIG. 13 also shows that, when combining both the potential for arm and adapter rotation and arm extension, the adapters (312, 318) can be moved in two dimensions, along the illustrated x-axis and the z-axis, to allow for a very high degree of flexibility in adapter placement. As a result, the lift (300) can be used with a larger variety of vehicles and a larger variety and location of safe lifting points without any modifications other than manual or automated control of the long arm (306) and the short arm (308).

Figure 17:
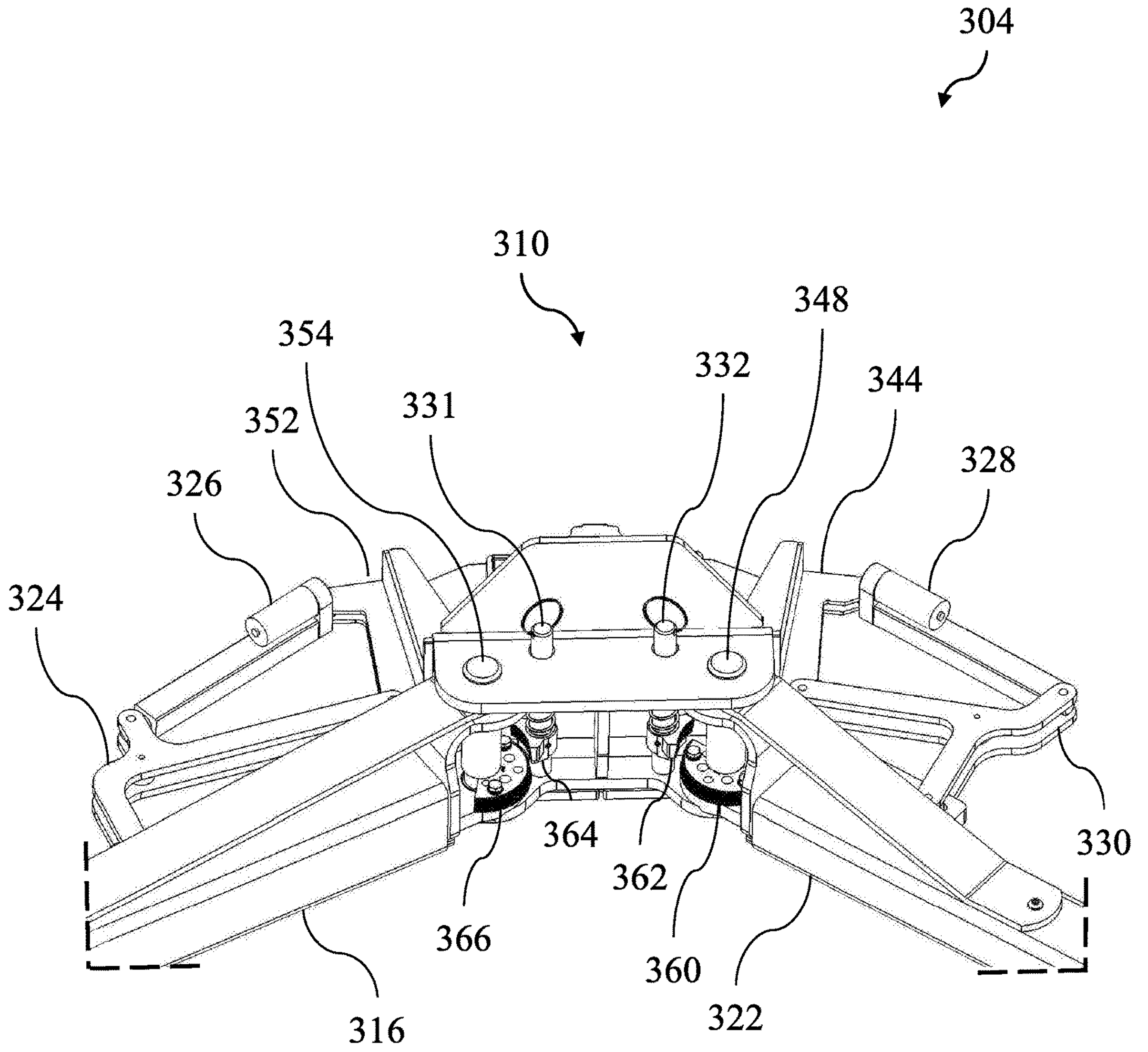
FIG. 17 depicts a front perspective view focusing on an arm housing of the first exemplary lift.
Figure 18:
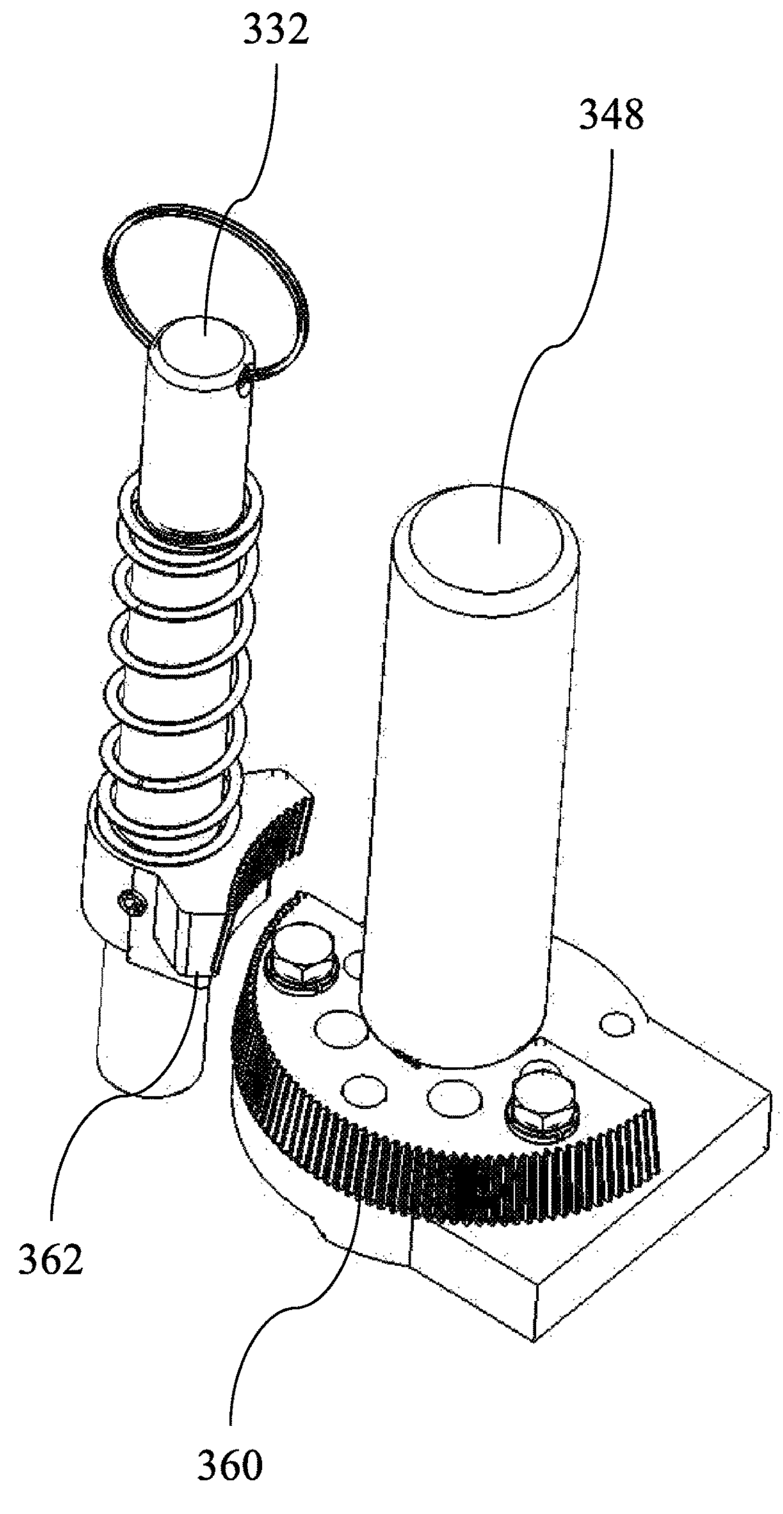
FIG. 18 depicts a front perspective isolated view of an arm locking mechanism of the first exemplary lift.

FIG. 17 shows a front perspective of the arm housing (310). The long arm (306) has a lock pin (331) that can be pushed or pulled to move a lock restraint gear (364) into place against an arm restraint gear (366) that is statically fixed to the arm pin (354) of the long arm (306). When the lock restraint gear (364) is in contact with the arm restraint gear (366), the long arm (306) will be completely immobilized since the arm pin (354) will not be able to rotate. Short arm (308) similarly has a lock pin (332) that may be used to move a lock restraint gear (362) into place against an arm restraint gear (360) to prevent rotation of the short arm (308) about the arm pin (348). FIG. 18 shows a focused front perspective view of this lock mechanism isolated from the rest of the arm housing (310). In particular, it can be seen that the arm restraint gear (360) is statically fixed to the arm pin (348) such that they rotate together. Lock pin (332) also may be spring-biased to force the lock pin (332) into its locked position when the arm housing (310) is raised from the floor. The matching teeth of the arm restraint gear (360) and the lock restraint gear (362) are also pictured.

Because the short arm (308) and the long arm (306) have the ability to be rotated and extended independently and simultaneously due to their independent linear actuators (326, 328), an automated positioning process may position the adapters of the lift (300) simultaneously, which may reduce the time required to prepare for a lifting operation compared to conventional systems.

IV. Worm Driven Angular Arm Rotation

Figure 19:
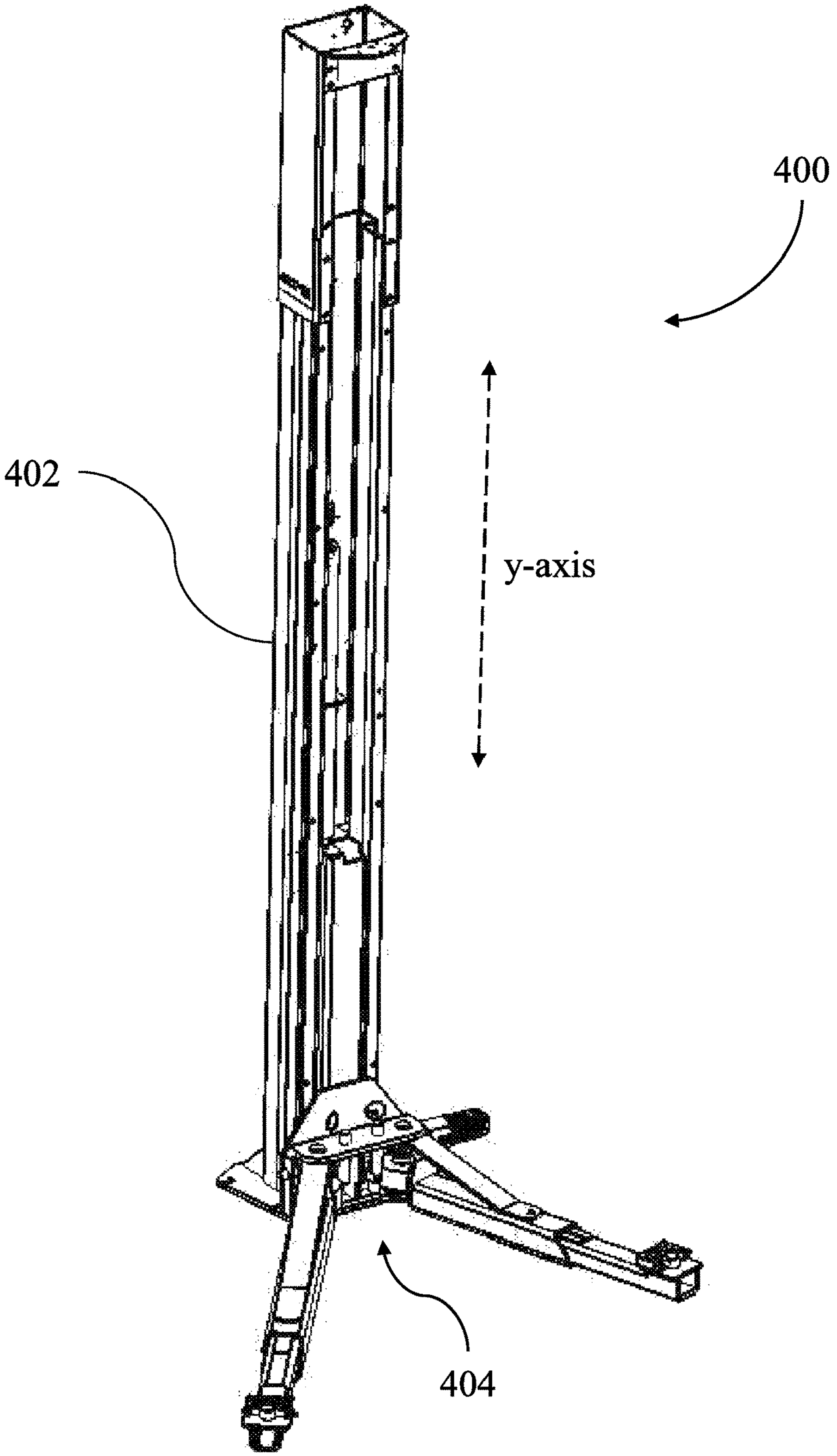
FIG. 19 depicts a front perspective view of a second exemplary lift.

FIG. 19 shows one tower of a lift (400) having similar capabilities as the lift (300) of FIG. 11. The lift (400) comprises a lift tower (402) and a lift base (404). The lift base (404) may be manually (e.g., with a control device such as the control pendant (150)) or automatically (e.g., as a result of a profile selection) moved in one dimension, horizontally along the shown y-axis, by a mechanism of the lift tower (402).

Figure 20:
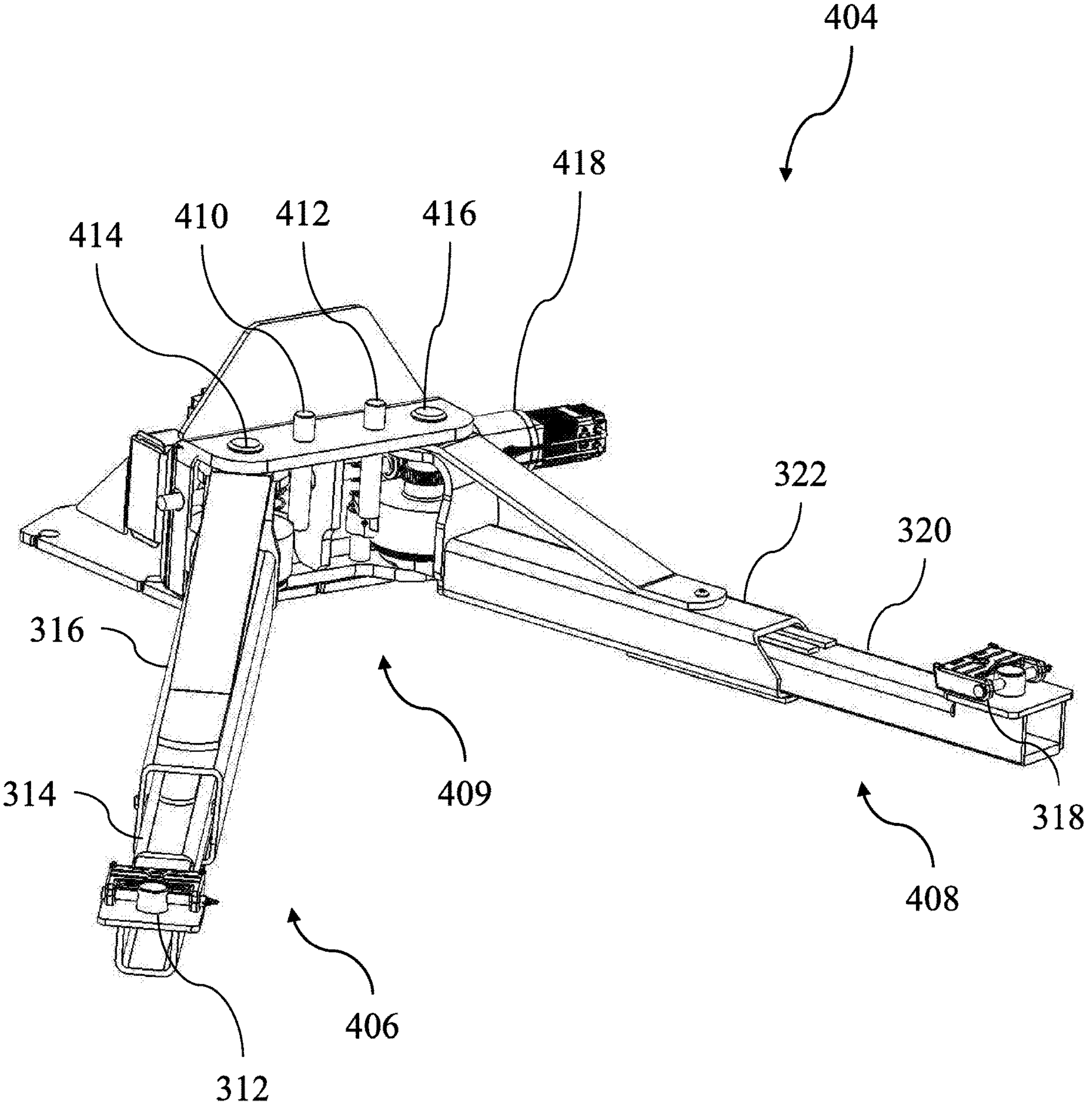
FIG. 20 depicts a front perspective view of a lift base of the second exemplary lift.
Figure 21:
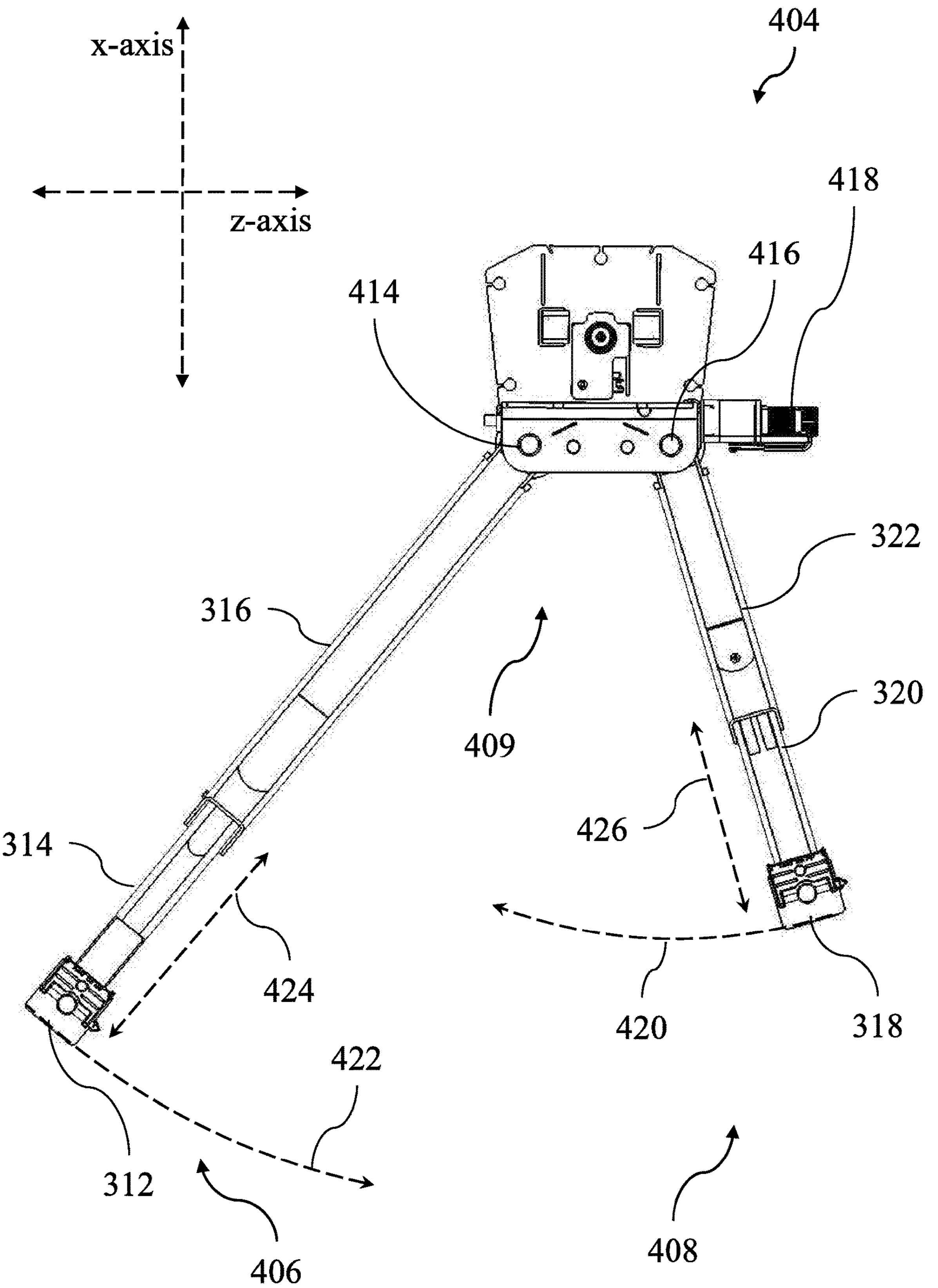
FIG. 21 depicts a top plan view of the lift base of the second exemplary lift.

Referring to FIGS. 20 and 21, the lift base (404) comprises a long arm (406) and a short arm (408) extending from an arm housing (409). The long arm (406) itself is similar to the long arm (306) previously discussed in the context of the lift (300), having components such as the adapter (312), the moving section (314), and the static section (316), while the short arm (408) similarly has components such as the adapter (318), the moving section (320) and the static section (322). The static section (316) of the long arm (406) is rotatably connected to the arm housing (409) by an arm pin (414), while the static section (322) of the short arm (408) is rotatably connected to the arm housing (409) by an arm pin (416). As can be seen in FIG. 21, the result is that long arm (406) has an adapter rotation path (422) and an arm extension path (424), and short arm (408) has an adapter rotation path (420) and an arm extension path (426), that allow the adapters (312, 318) to be moved in two dimensions along the shown x-axis and z-axis, and positioned so that a variety of vehicles and lift points may be supported without modifications other than manual or automatic positioning of the adapters (312, 318).

Figure 24:
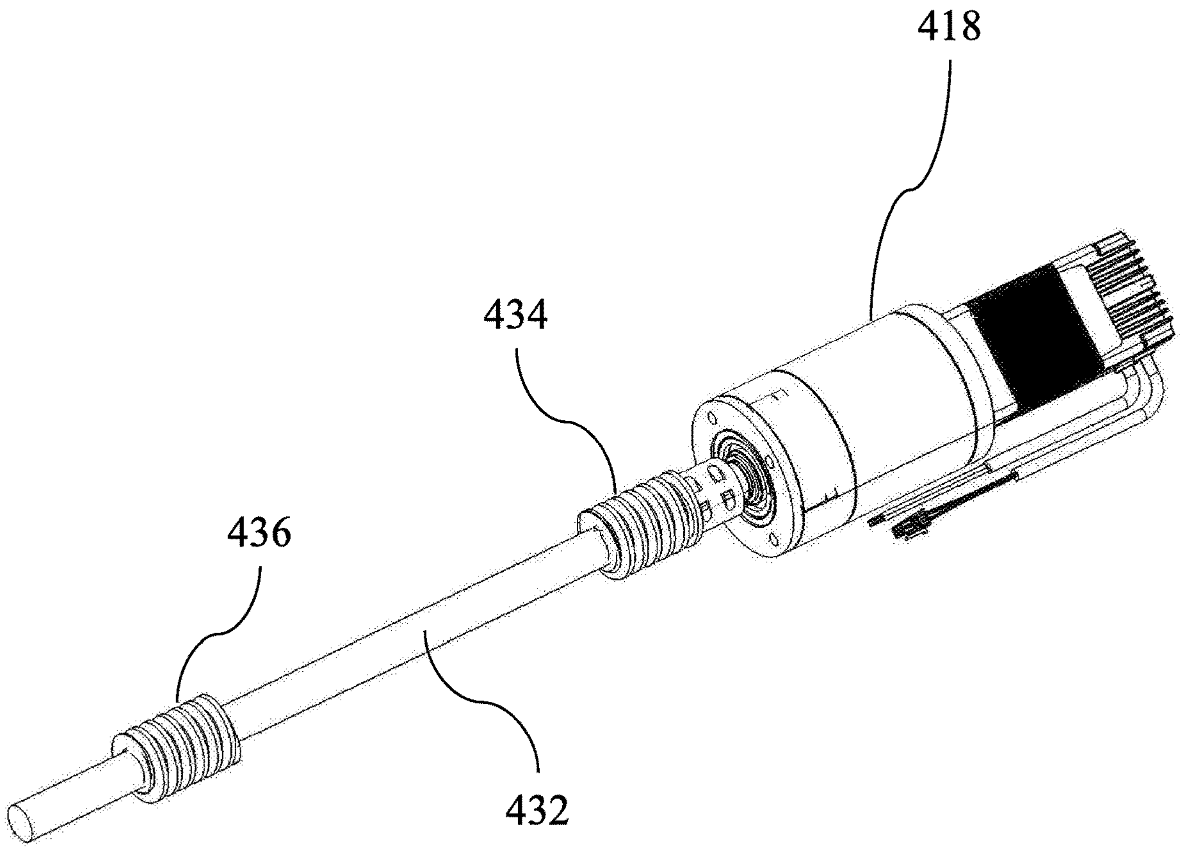
FIG. 24 depicts a front perspective isolated view of an electric motor and worm rod of the second exemplary lift.

Rotation of the long arm (406) and the short arm (408) is achieved with a worm motor (418) which can be seen extending from the right side of the arm housing (409). The worm motor (418) can be seen isolated from the arm housing (409) in FIG. 24. The worm motor (418) in this embodiment comprises a worm rod (432) that extends from the worm motor (418). The worm rod (432) has a worm (434) statically positioned proximately to the worm motor (418) and a worm (436) statically positioned distally from the worm motor (418). The worm motor (418) may be an electronic motor and is selectively operable to rotate the worm rod (432) in either direction, causing the worm (434) and the worm (436) to rotate as well.

Figure 22:
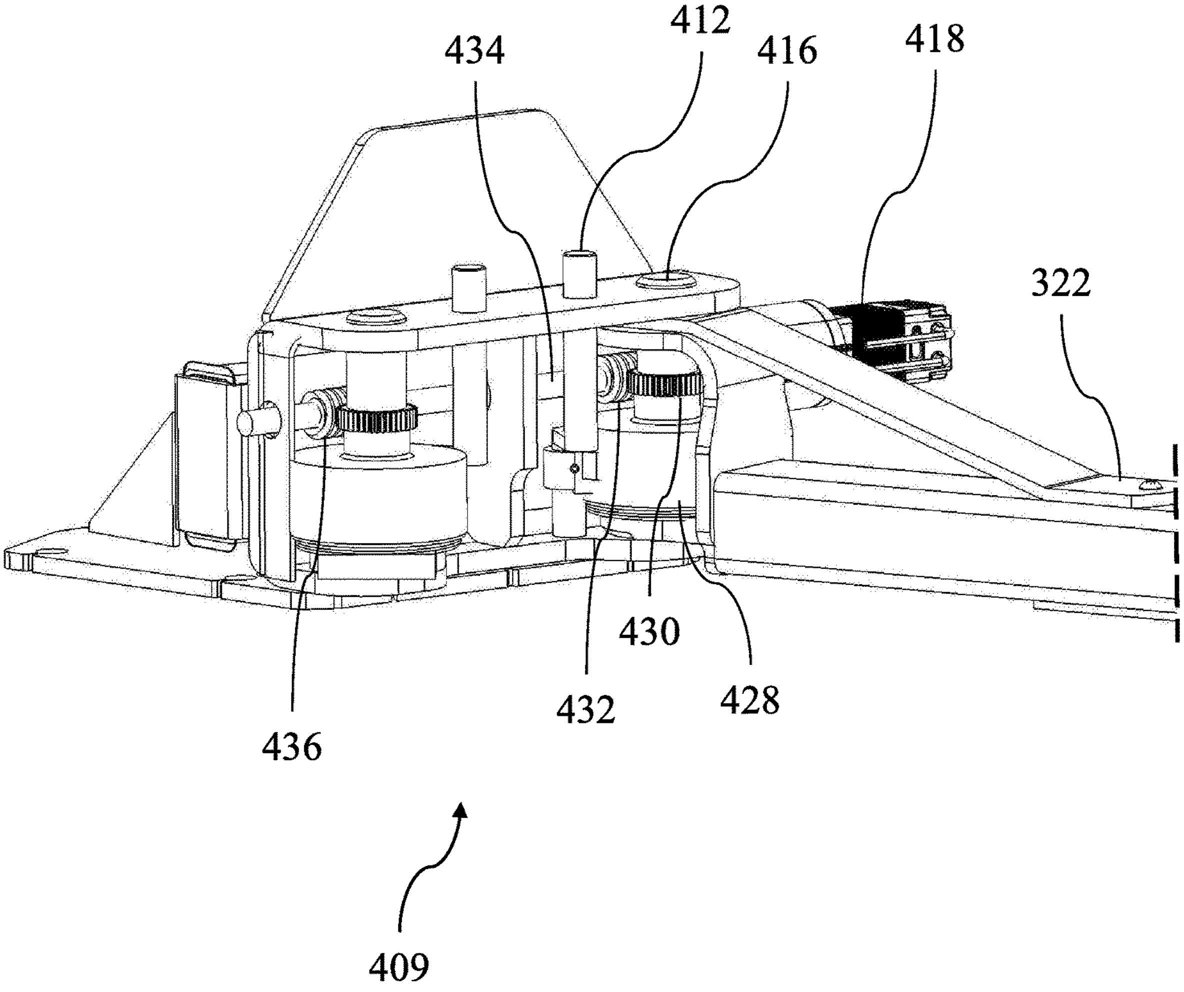
FIG. 22 depicts a front perspective view of an arm housing of the second exemplary lift with a long arm removed.

FIG. 22 shows a focused front perspective view of the arm housing (409) with the long arm (406) removed to allow for an unobstructed view. The worm motor (418) can be seen, along with the worm rod (434) extending through the arm housing (409) such that the worm (432) is in contact with a worm wheel (430), which is attached to the arm pin (416) by an electromechanical clutch ("EMC") (428). Rotation of the worm rod (434) will cause a corresponding rotation of the worm (432), which will cause a corresponding rotation of the worm wheel (430). As the worm wheel (430) rotates, the arm pin (416) will also rotate, causing the short arm (408) itself to rotate. In this manner, the short arm (408) can be rotated about the arm pin (416) in either direction by selectively operating the worm motor (418). The EMC (428) is selectively operable in order to engage or disengage an internal clutch that delivers rotational forces from the worm wheel (430) to the static section (322) of the short arm (408). In this manner, the EMC (428) may be operated to either allow the short arm (408) to rotate as the worm motor (418) rotates the worm rod (434) or allow it to remain still.

Figure 23:
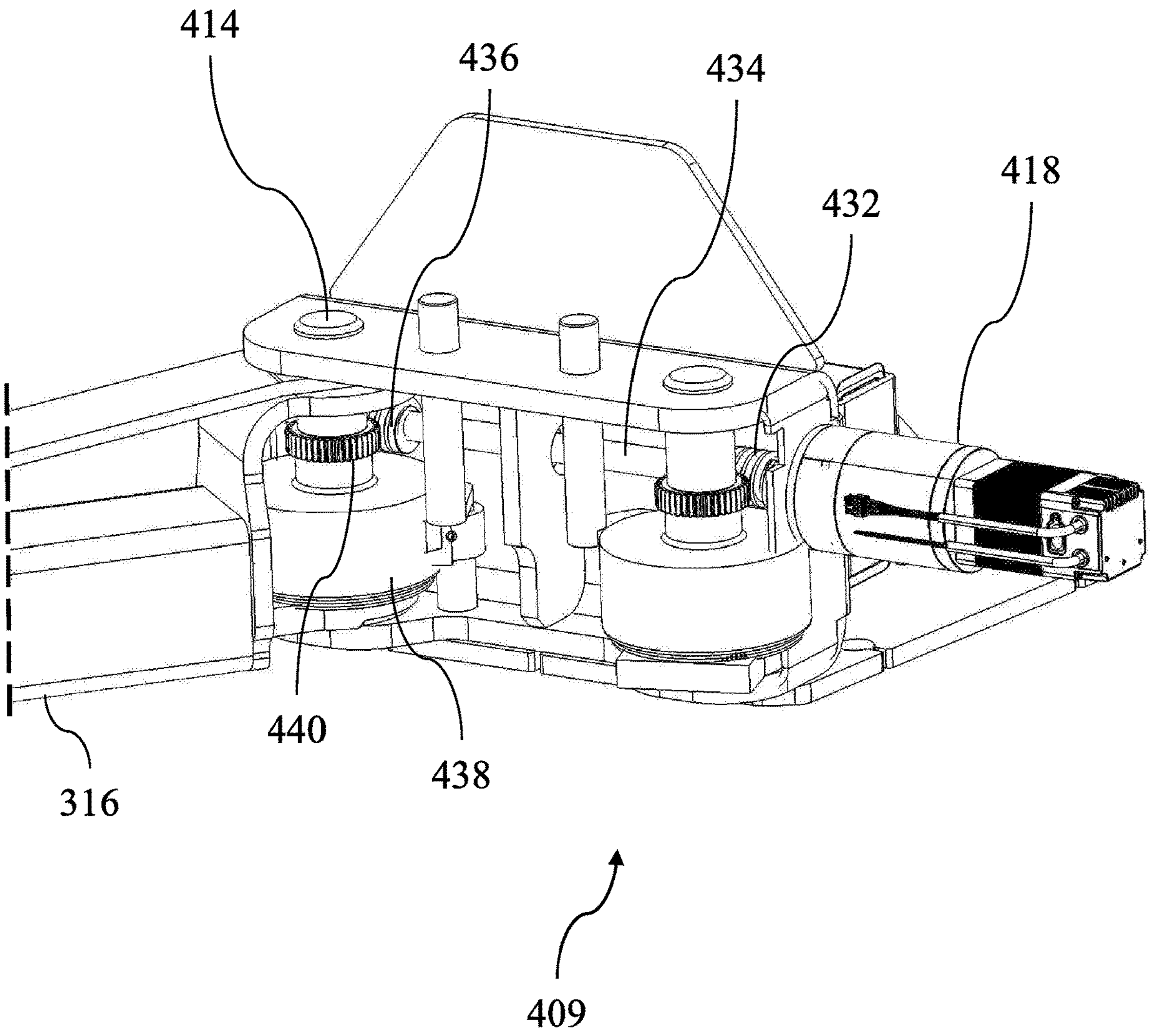
FIG. 23 depicts a front perspective view of the arm housing of the second exemplary lift with a short arm removed.

FIG. 23 shows a focused front perspective view of the arm housing (409) with the short arm (408) removed to allow for an unobstructed view. The worm (436) can be seen in contact with a worm wheel (440), which itself is attached to the arm pin (414). The arm pin is connected to the static section (322) of the short arm (408) by an EMC (438). In this manner, when the worm motor (418) is operated to rotate the worm rod (434), the worm (436) will rotate and cause the worm wheel to (440) to rotate. As the worm wheel (440) rotates, the arm pin (414) will also rotate and cause the long arm (406) to rotate about the arm pin (414). The EMC (438) may also be selectively operated to engage or disengage an internal clutch which delivers rotational forces from the worm wheel (440) to the arm pin (414). In this manner, the EMC (438) may be operated to either allow the long arm (406) rotate as the worm motor (418) rotates the worm rod (434) or allow it to remain still.

Based upon the descriptions above, it should be clear that the worm motor (418) may be operated to cause the long arm (406) and the short arm (408) to rotate simultaneously in the same direction, or, when the EMC (428) is disengaged, to cause the long arm (406) to rotate by itself, or, when the EMC (438) is disengaged, to cause the short arm (408) to rotate by itself. In some implementations, an electromechanical clutch may also have an internal clutch mechanism that can convert a rotational force in one direction to a rotational force in the opposite direction. In these implementations, it is also possible that the long arm (406) and the short arm (408) could rotate in opposite directions simultaneously during operation of the worm motor (418).

An advantage of the lift (400) described above is that the EMCs (428, 438) may be used to engage or disengage rotation, or even reverse rotation of an arm (406, 408) while the worm motor (418) continuously drives. This can allow for improved speed when positioning adapters (312, 318) compared to conventional methods, especially when automatically positioning adapters (312, 318) in response to a profile selection.

Arm rotation, whether in the lift (300) or the lift (400), may include additional features in some implementations. For example, the lift (300) or the lift (400) may determine and convert rotation in distance and degrees and may use feedback from one or more Hall effect sensors to determine motion and position and to enforce rotational limits through software. Physical switches may also be integrated into the arm housing (310, 409) to provide mechanical feedback when arm rotation has reached maximum safe limits. One exemplary calculation that may be used to determine the rotational travel of an arm (e.g., short arm (408) or long arm (406)) during activation of worm motor (418) is to use a worm-to-worm wheel ratio of 20:1 and a gear turn ratio of 1:47, where pulse count (360°)=360*47=16,920. In other words, for a 360° full rotation of the worm rod (434), 16,920 pulses will be generated by the worm motor (418). In this example, if pulse count feedback from the worm motor (418) is detected as 25,380, the worm rod (434) rotation can be determined as (25,380/16,920)=1.5 rotations, or 5400 of rotation. Rotation of an arm can then be determined as (540°/20)=270 of approximated rotation. Approximated rotation of an arm can then be used to limit arm movement, control the worm motor (418) output, disengage the EMC (428) or the EMC (438), or take other performance and safety actions.

V. Actuator Driven Linear Arm Movement

Figure 25:
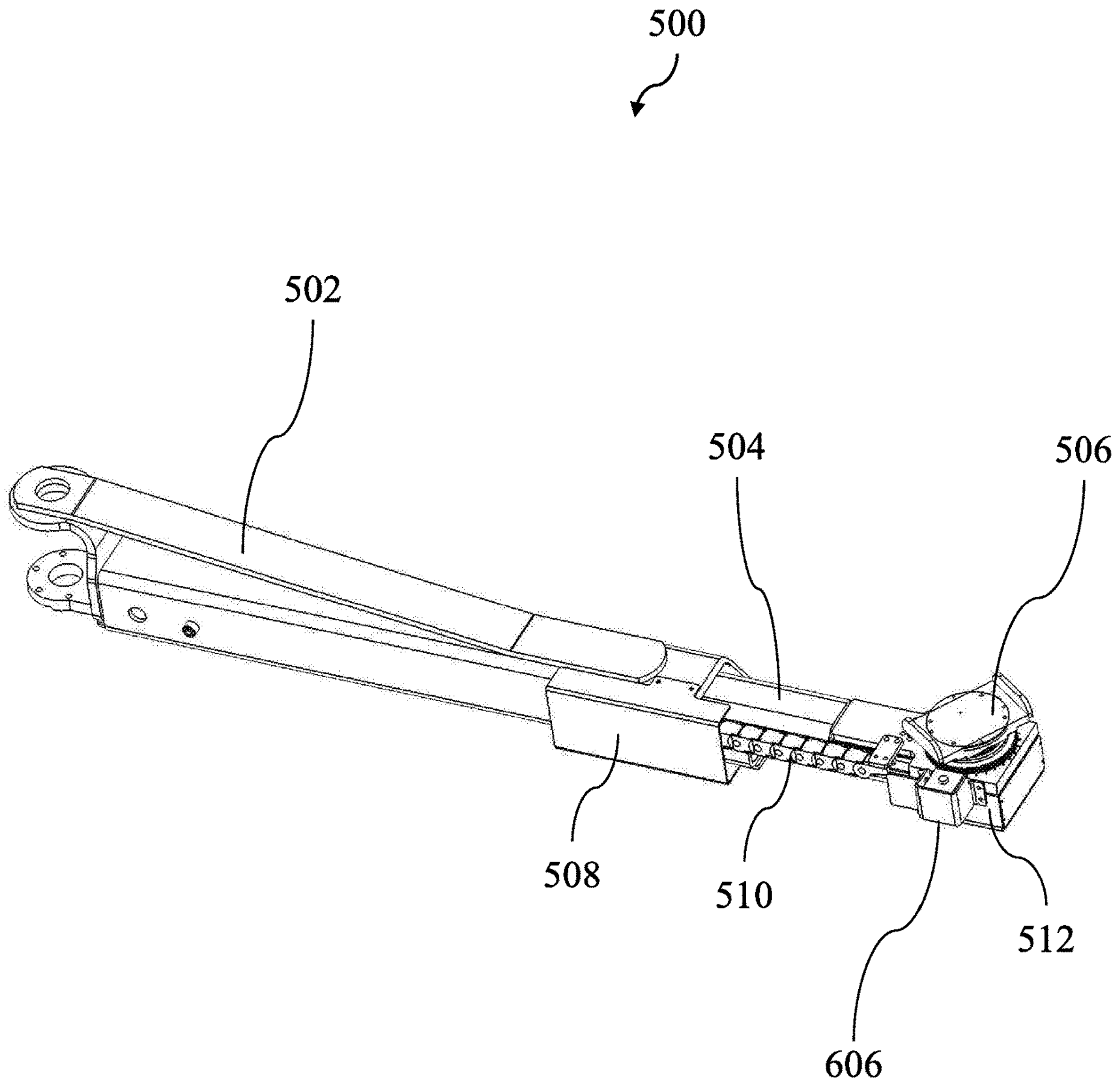
FIG. 25 depicts a front perspective view of an extension arm usable with a lift.

It has previously been discussed that lift arms, such as the long arm (306) of the lift (300) shown in FIG. 11, have a moving section (314) and a static section (316) that allow for the long arm (306) to be extended or retracted along an arm extension path (341). This allows for additional flexibility in placement of the adapter (312) and allows the lift (300) to support additional varieties of vehicles and lifting points without major modifications. FIG. 25 shows an exemplary extension arm (500) that may be used with a variety of lifts (e.g., the lift (300) the lift (400), and others) to allow for a moving section (504) to extend from or retract into a static section (502). Also shown are an adapter housing (512) on which an adapter (506) is mounted and an energy chain (510) extending from an energy chain housing (508). The energy chain (510) is mounted at one end to the energy chain housing (508), which itself is mounted to the static section (502). The energy chain (510) is mounted at its other end to the camera module. In this manner, as the moving section (504) extends from the static section (502), the energy chain (510) will feed out length until it reaches its full extension and provide electrical signals to the spotting camera (606). As the moving section (504) retracts into the static section (502), the energy chain (510) will coil within the limiter housing (508).

Figure 26:
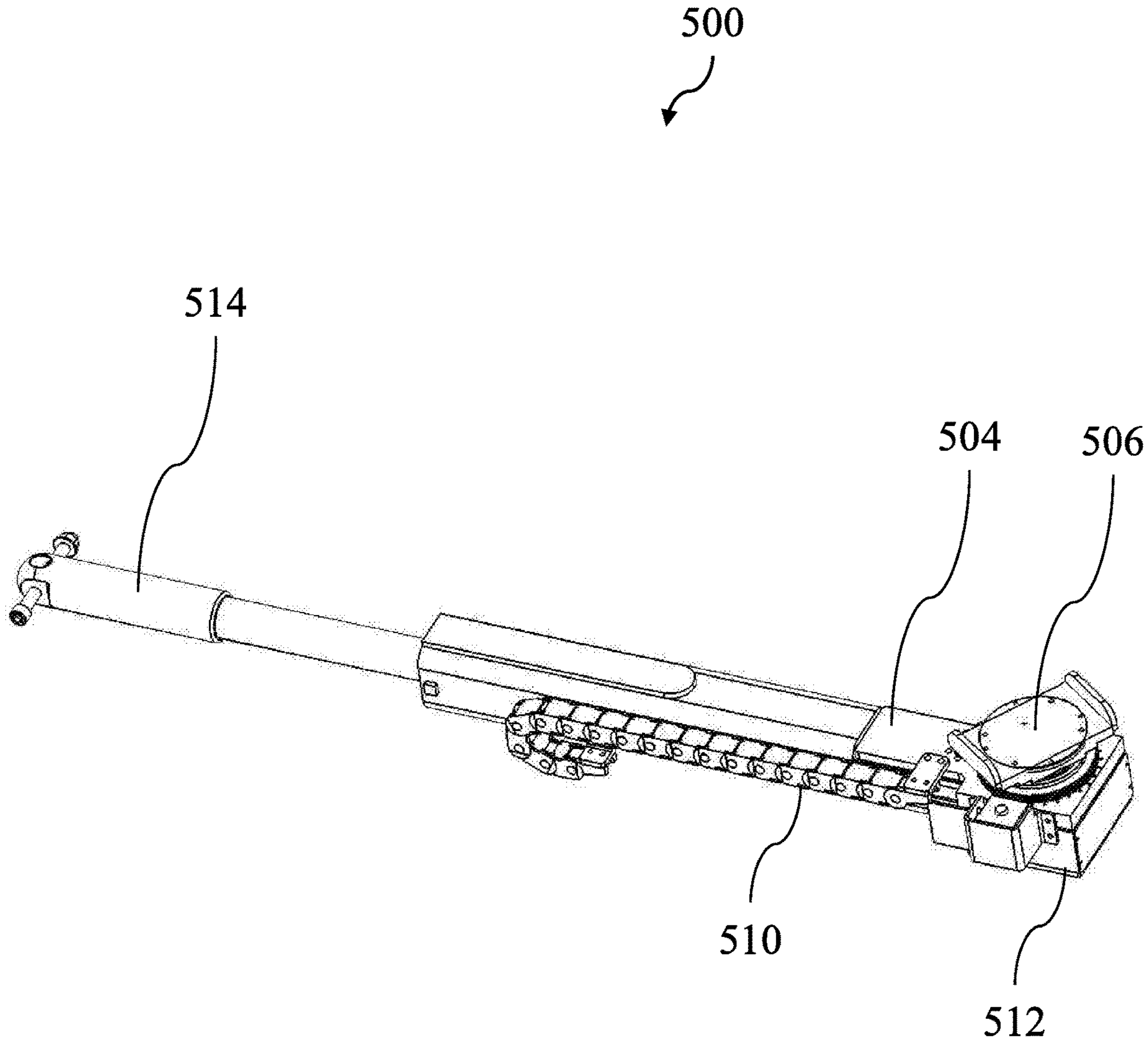
FIG. 26 depicts a front perspective view of the extension arm with a static section removed.
Figure 27:
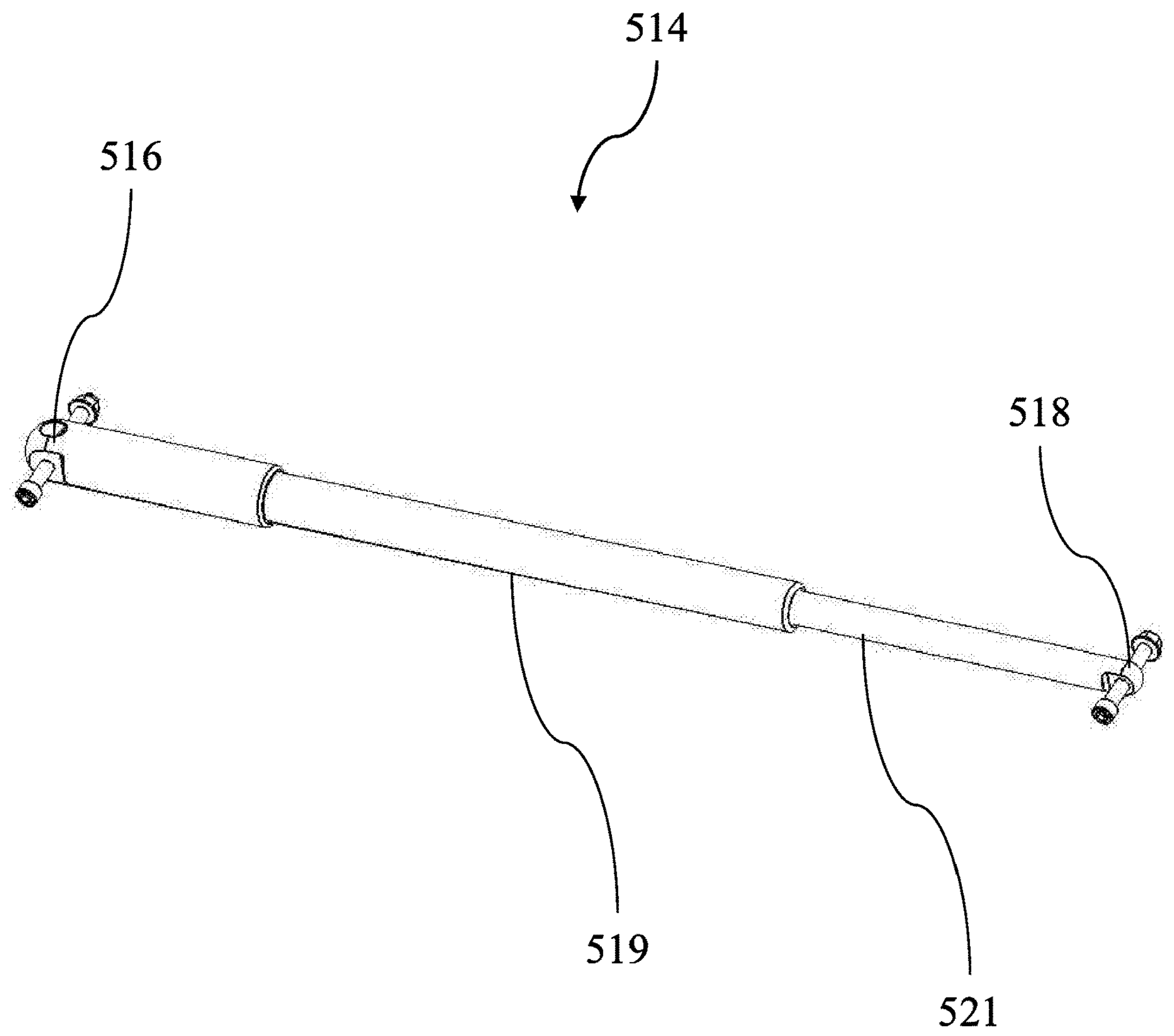
FIG. 27 depicts a front perspective view of a linear actuator of the extension arm.

FIG. 26 shows the extension arm (500) with the static section (502) and limiter housing (508) removed. An arm linear actuator (514) can be seen extending from where it would normally be contained within the static section (502) into the moving section (504). The energy chain (510) can also be seen partially coiled within the area normally shielded by the energy chain housing (508). FIG. 27 shows the arm linear actuator (514) isolated from the remainder of the extension arm (500). The linear actuator (514) comprises a telescoping section (519) and a telescoping section (521). An actuator proximal end (516) can be connected to the static section (502), while an actuator distal end (518) can be connected to the moving section (504). The arm linear actuator (514) is selectively operable to extend or retract one or more of the telescoping sections (519, 521). For example, the telescoping section (521) may extend from or retract into the telescoping section (519), which itself may extend from or retract into the actuator distal end (518). As the overall length of the arm linear actuator (514) changes, so too will the overall length of the extension arm (500), as it will cause the moving section (504) to correspondingly extend from or retract into the static section (502).

Extension and retraction of the extension arm (500) may be performed manually (e.g., using a control interface of control pendant (150)) or may be performed automatically (e.g., as a result of a vehicle profile selection), and may also be performed simultaneously with other lift adjustments (e.g., arm rotation) to improve the overall speed of adapter positioning.

Some implementations of the extension arm (500) may include additional features. For example, limiters may be installed to prevent both over-extension and over-retraction, either based upon electrical inputs to the arm linear actuator (514) or based upon mechanical feedback of a limiter striking a physical button or sensor installed within the extension arm (500) itself at the maximum extension and retraction points. Another example could include using a Hall effect sensor to correlate the number of rotations or cycles of the arm linear actuator (514) with the length of extension or retraction, and to determine safe limits based upon such feedback. One exemplary calculation that could be used to determine the distance traveled by an actuator (e.g., the linear actuator (326), the linear actuator (328), or the arm linear actuator (514)) based upon actuator feedback is to convert 1 pulse to 0.05 mm of distance traveled. For example, a feedback pulse count of 2000 would indicate an actuator travel distance of 100 mm.

VI. Pinion-Driven Linear Adapter Movement

While arm rotation and extension as has been described above allows for much flexibility and precision in positioning adapters for various vehicles and lift points, it may also be advantageous to be able to change the characteristics of the adapter itself once in position. Conventionally this is accomplished by attaching or removing various accessories, such as removing a cupped adapter that is suitable for one type of lift point and replacing it with a flat rubber adapter that may be suitable for a different type of lift point. This can also include adding an adapter extender so that vehicles whose lift points are not all at the same height relative to the ground can be lifted in such a way that the vehicle remains parallel to the ground. For example, some vehicles may have lift points at the front of the vehicle that are twelve inches above the ground, while the rear lift points may be fourteen inches above the ground. Lifting such a vehicle without adapter extenders may be unsafe or even entirely impossible.

Figure 28:
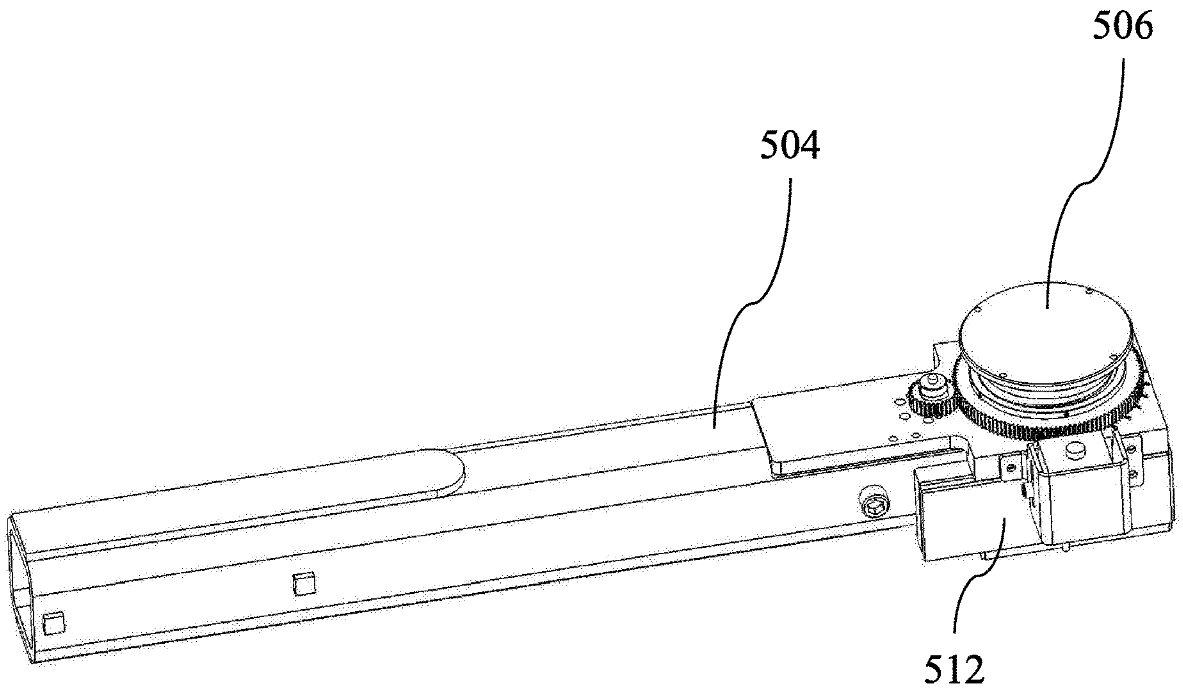
FIG. 28 depicts a front perspective view of a telescoping adapter in a fully retracted state.
Figure 29:
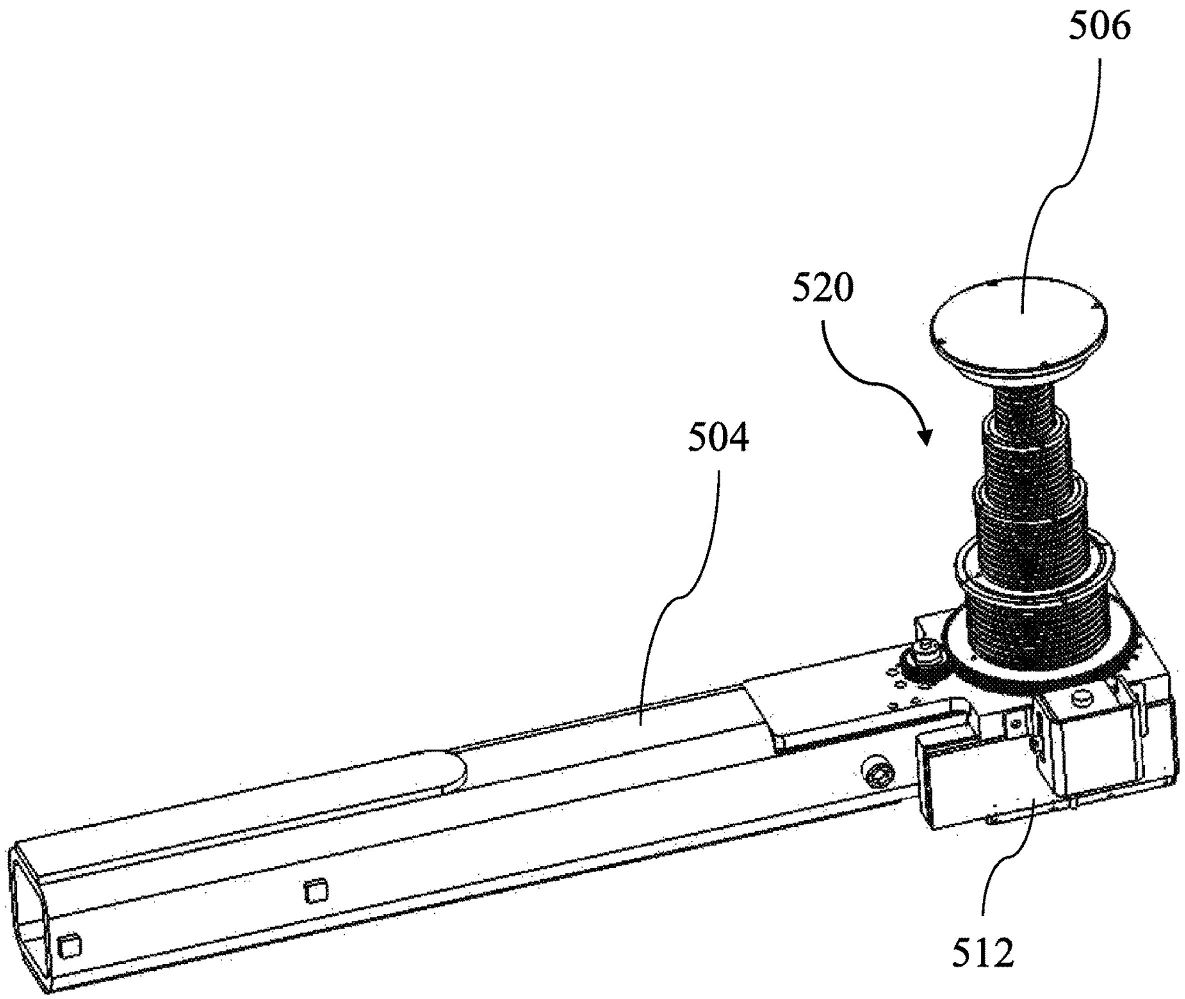
FIG. 29 depicts a front perspective view of the telescoping adapter in a fully extended state.

FIG. 28 shows the static section (504) of a lift arm that could be used with a variety of lifts (e.g., the lift (300), the lift (400), and others). The adapter (506) extends from the adapter housing (512) at a default height. The adapter housing (512) houses components that allow the adapter (506) to telescope upwards to a needed height, making extensions or other manual adapter modifications unnecessary. FIG. 29 shows the adapter (506) extending to its full height from the adapter housing (512). A telescoping base (520) is also visible that allows the adapter (506) to extend and retract to reach the desired height.

Figure 30:
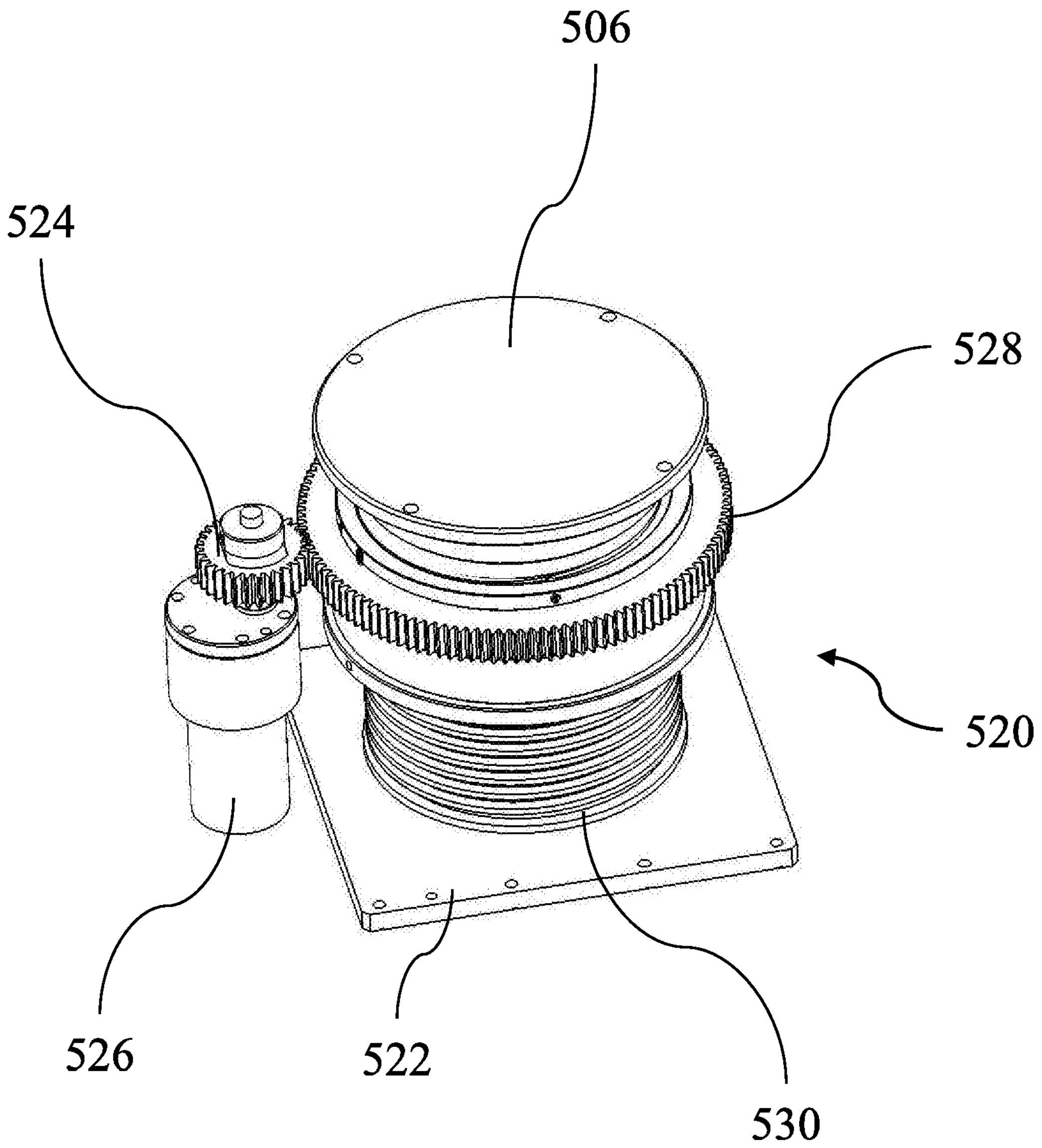
FIG. 30 depicts a front perspective view of a telescoping base of the telescoping adapter in a fully retracted state with an adapter housing removed.
Figure 35:
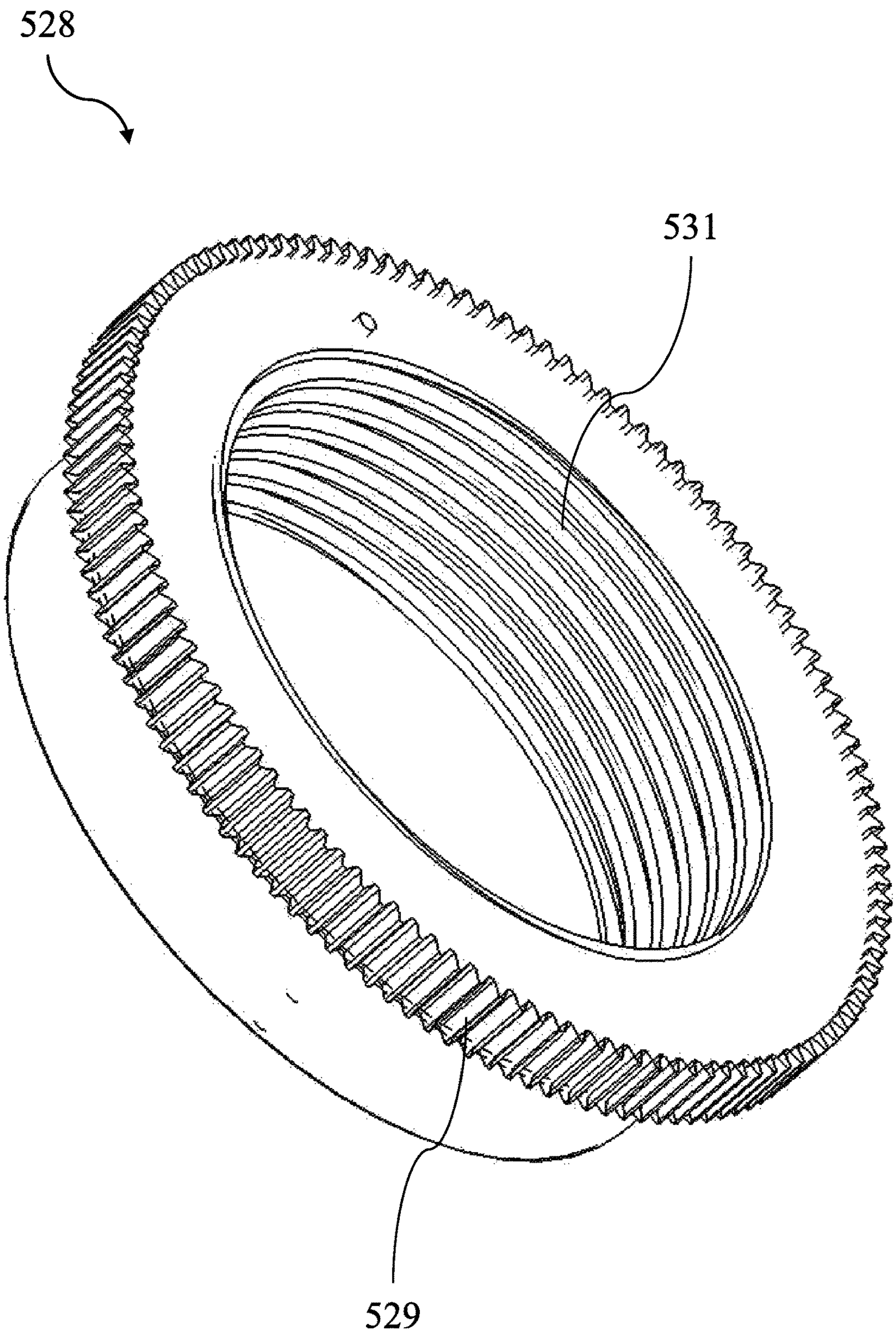
FIG. 35 depicts a top perspective view of a collar gear of the telescoping adapter.
Figure 36:
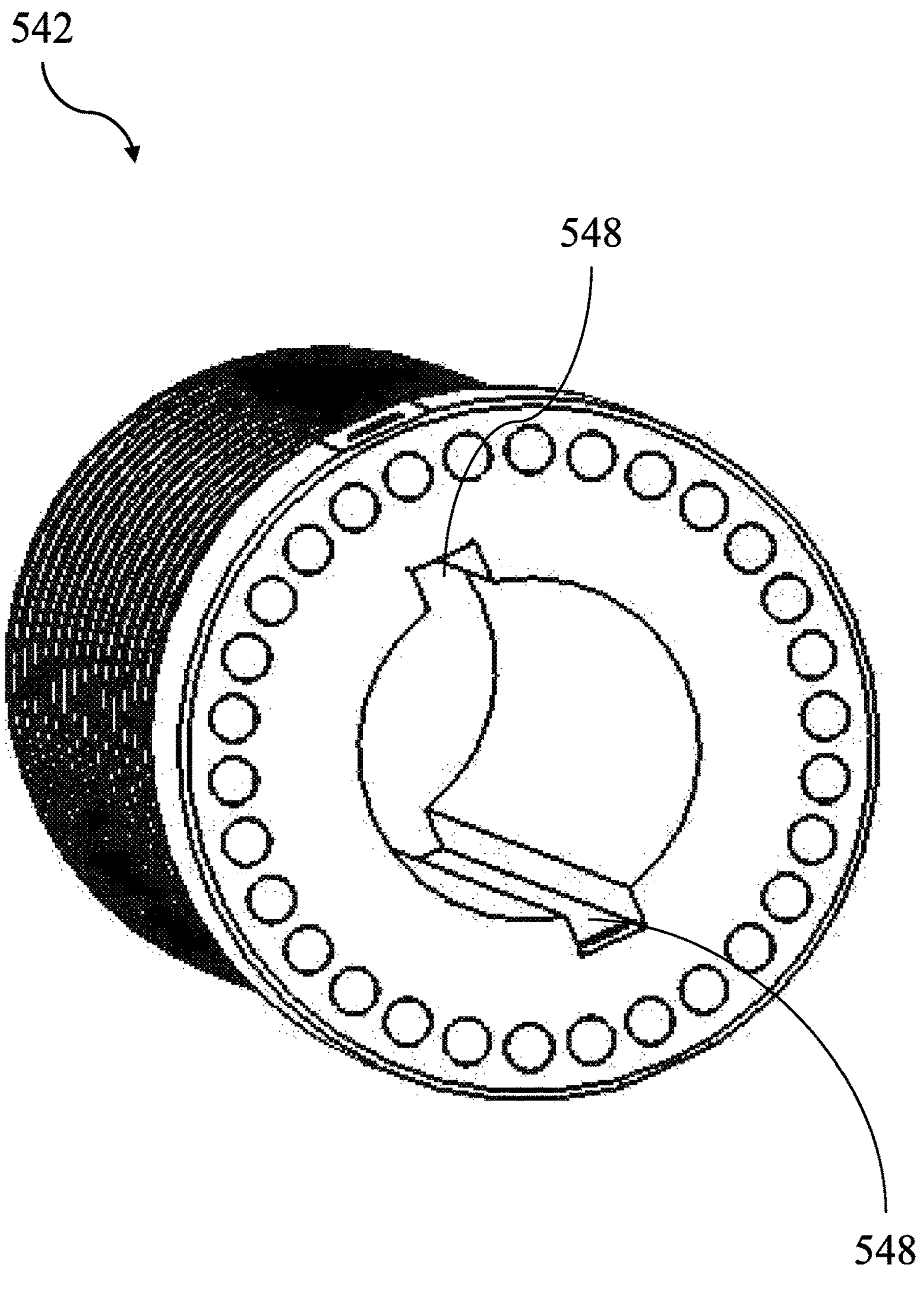
FIG. 36 depicts a top perspective view of the fourth section of the telescoping base.
Figure 37:
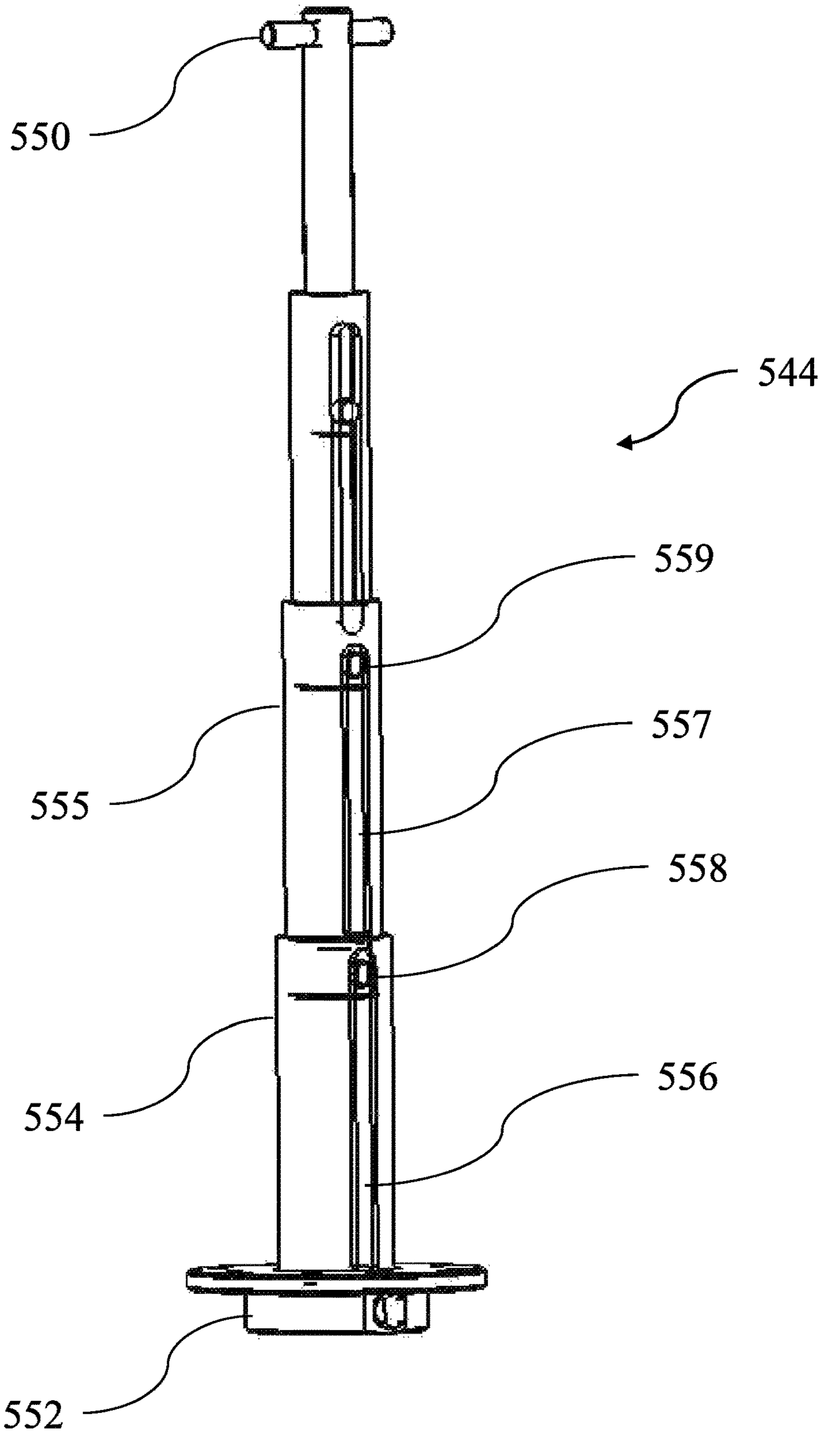
FIG. 37 depicts a front elevation view of a telescoping arrest rod of the telescoping base.

FIG. 30 shows the adapter (506) with the adapter housing (512) removed. The telescoping base (520) can be seen in a fully retracted state. A first section (530) of the telescoping base (520) can be seen positioned atop but not statically attached to a base plate (522). The first section (530) is threaded about its exterior. A pinion motor (526) can be selectively operated to rotate in either direction and cause a corresponding rotation of a pinion (524). A rotation of the pinion (524) will cause a corresponding rotation of a collar gear (528) that the pinion (524) is in contact with. As can be seen in FIG. 35, the collar gear (528) has collar gear teeth (529) about its exterior that contact the pinion (524). The collar gear (528) also has collar gear threading (531) on its interior that may be threaded onto the threading of the first section (530). When the pinion motor (526) is activated and causes the pinion (524) to rotate, the collar gear (528) will rotate around the first section (530).

Figure 31:
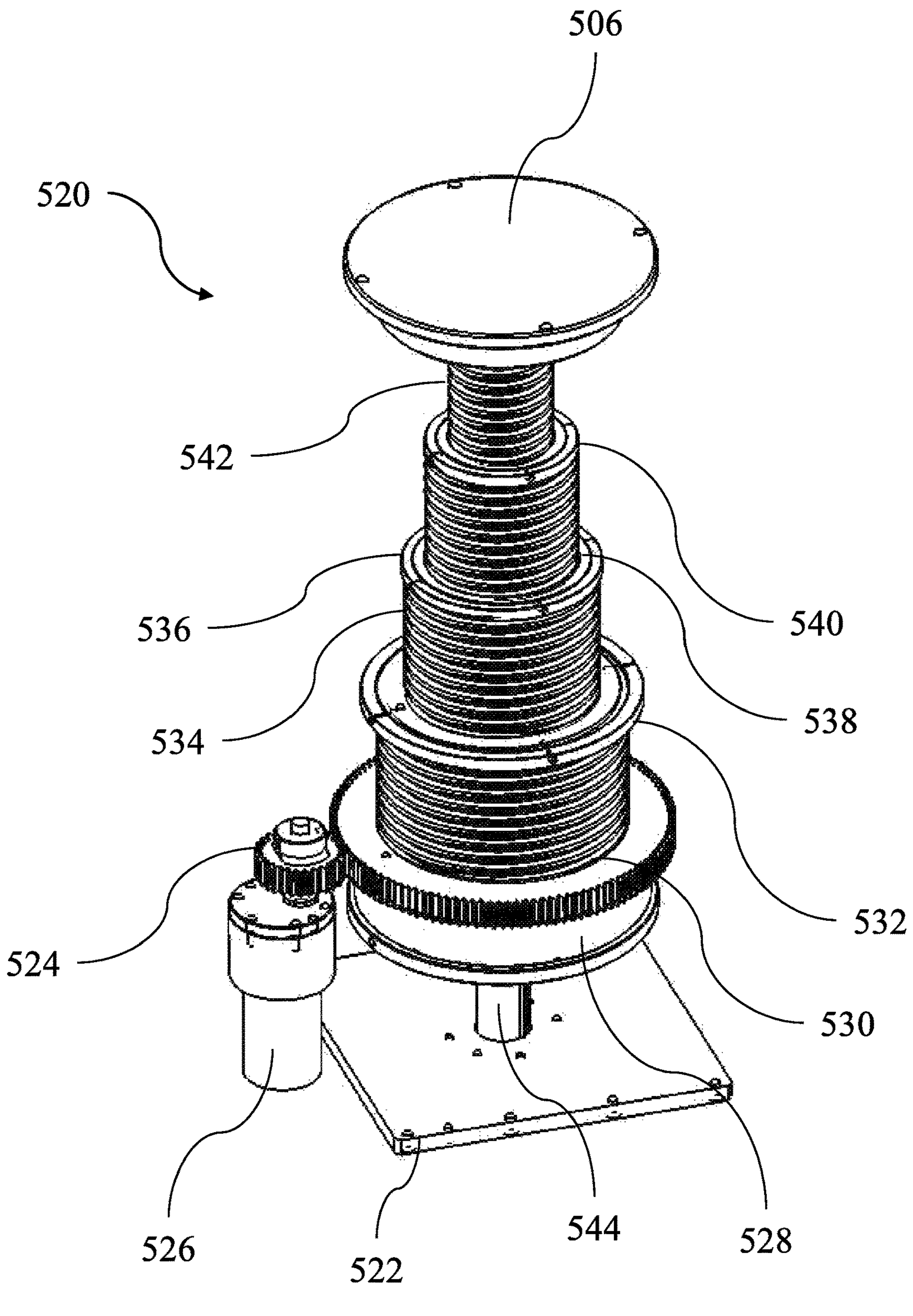
FIG. 31 depicts a front perspective view of the telescoping base of the telescoping adapter in a fully extended state with an adapter housing removed.
Figure 32:
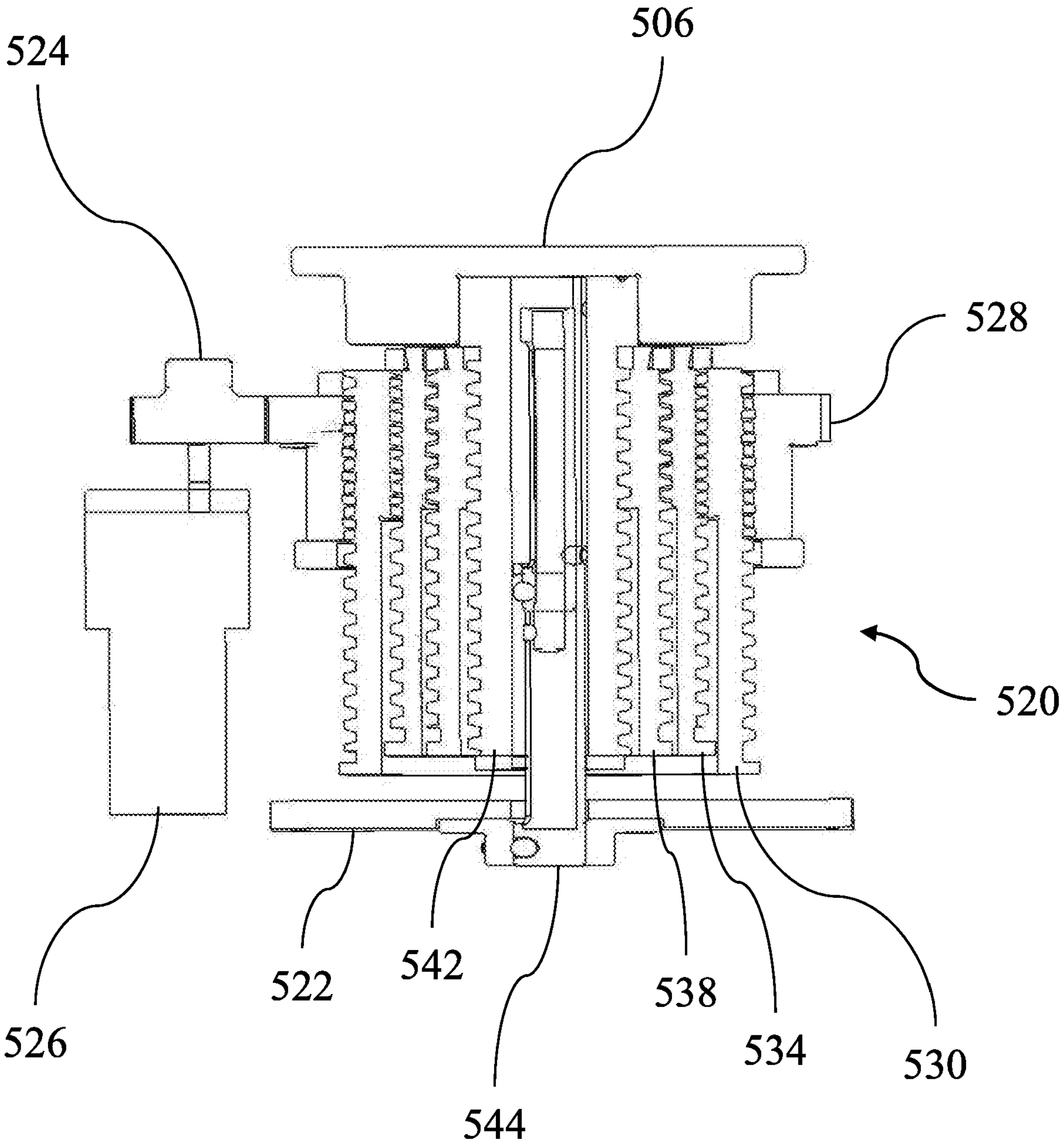
FIG. 32 depicts a front elevation cross-sectional view across the midpoint of the telescoping adapter in its fully retracted state.
Figure 33:
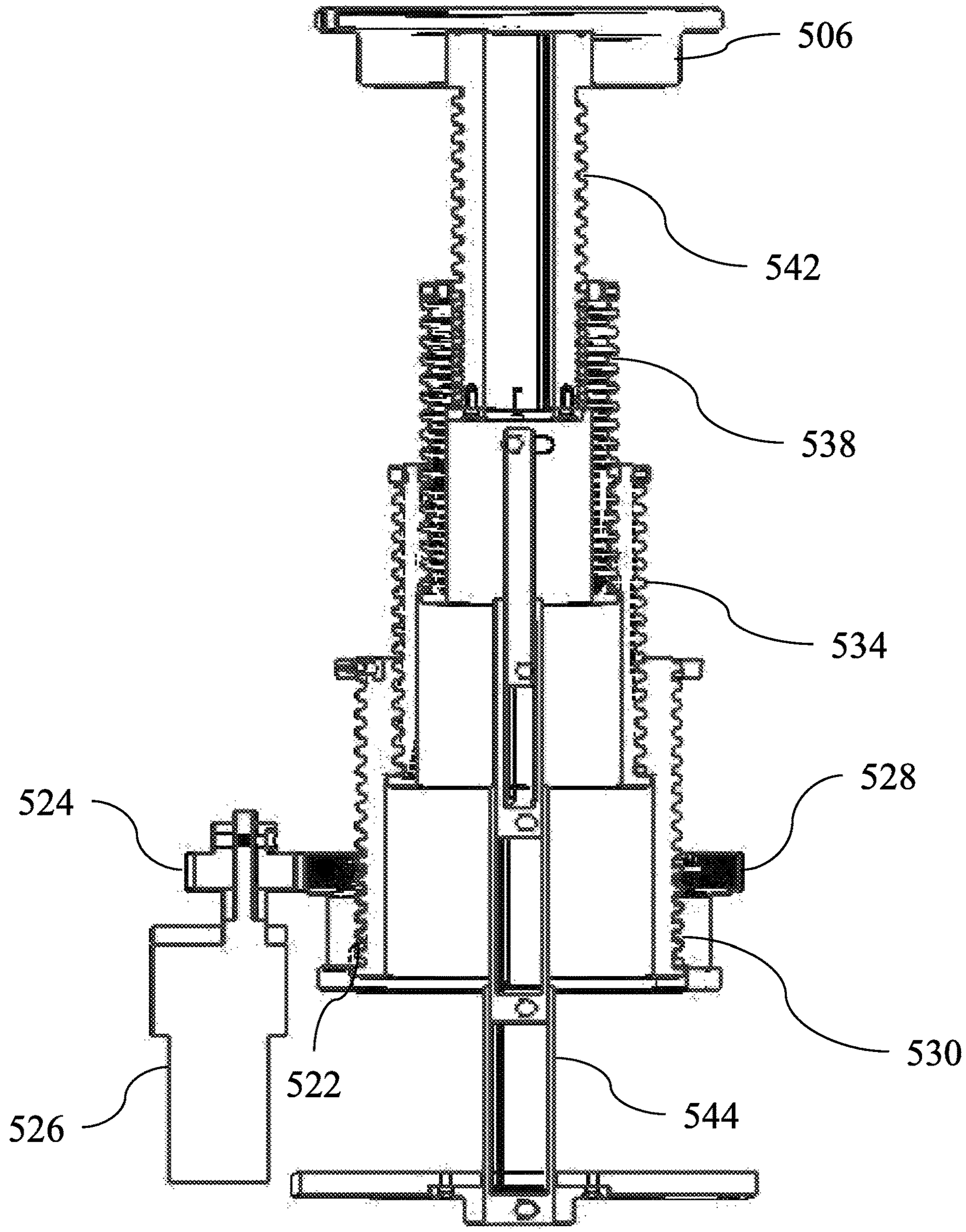
FIG. 33 depicts another front elevation cross-sectional view across the midpoint of the telescoping adapter in its fully extended state.

Typically, the frictional forces between the collar gear thread (531) and the first section (530) would cause the first section (530) to freely rotate with the collar gear (528). However, as can be seen in FIGS. 31-33, a telescoping arrest rod (544) placed within the telescoping base (520) can prevent rotation of the telescoping base sections due to friction as the collar gear (528) rotates. The telescoping arrest rod (544) statically attaches to the base plate (522) via a rod base (552). The telescoping arrest rod (544) has four nesting rod sections and can freely extend or retract its length. For example, at its shown extended length, a rod section (555) is fully extended from within a rod section (554). During such an extension, the rod section (555) will slide outwards from within the rod section (554) without rotating due to the rod slide (556) along the side of the rod (554) and the slide bolt (558) at the base of the rod (555). The rod (555) itself has a rod slide (557), which allows a rod bolt (559) of a subsequent rod to slide along during extension and retraction. In this manner, the telescoping arrest rod (544) can extend section by section without rotating in any way, such that the arrest pin (550) located at the top of the telescoping arrest rod (544) remains statically positioned other than its changing height within the telescoping base (520).

Figure 34:
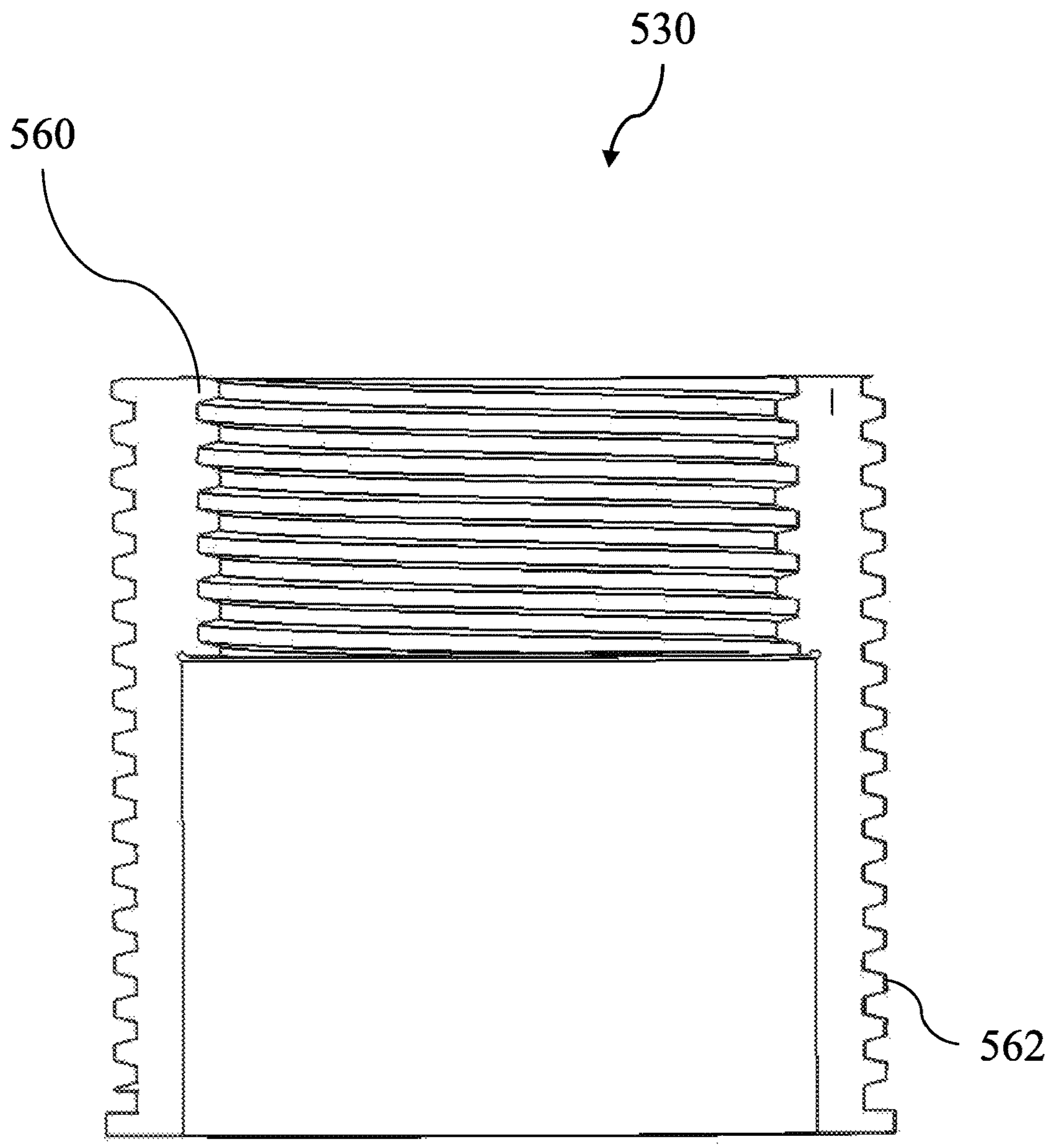
FIG. 34 depicts a front elevation cross-sectional view of a section of the telescoping base.

The arrest pin (550) is placed within an arrest pin slot (448) of a fourth section (542) of the telescoping base (520). Since the arrest pin (550) is prevented from rotating and is fixed within the arrest pin slot (548), it can be seen that the fourth section (542) will never rotate as a result of the collar gear (528) rotating. With the rotation of the fourth section (542) arrested by the telescoping arrest rod (544), as the collar gear (528) rotates, the telescoping base (520) will extend upwards to a maximum extension as can be seen in FIG. 31. This occurs because the interior of each section of the telescoping base (520) besides the fourth section (542) is partially threaded, as can be seen in the cross-sectional view of the first section (530) shown in FIG. 34, as well as the cross sectional views of the entire telescoping base (520) shown in FIGS. 32 and 33. Since each nested section is threaded both on its exterior and interior, any section that is unable to rotate with the rest under the force of the rotating collar gear (528) will be forced upwards as the other sections rotate around its threaded exterior.

Returning to FIG. 31, the telescoping arrest rod (544) is visible extending from the base plate (522) upwards into the telescoping base (520). Each section of the telescoping base (520) is also visible. In order to reach maximum extension as shown in FIG. 31 from the position illustrated in FIG. 30, as the collar gear (528) is rotated, the first section (530), a second section (534), and a third section (538) all freely rotate about the fourth section (542), whose rotational motion was prevented by the telescoping arrest rod (544). Since the fourth section (542) is threaded on its exterior, and the third section (538) is threaded on its interior, the fourth section (542) would have extended upwards to its maximum extension, at which point a third retainer (540) would have prevented any further de-threading of the fourth section (542) from the third section (538). At this point, the fourth section (542) and the third section (538) would be prevented from rotating by the telescoping arrest rod as the second section (534) and the first section (530) continued to rotate.

Continuing in this manner, it can be seen that the second section (534) would extend upwards and out of the threaded interior of the first section (530) until the second retainer (536) prevented any further de-threading, and the rotational motion of the fourth section (542), the third section (538), and the second section (534) would be prevented by the telescoping arrest rod (544), while the first section (530) continued to rotate. The second section (534) would then also begin to extend upwards as it de-threads from the first section (530), until a first retainer (532) prevents any further de-threading, and the rotation of the first section (530) would then be prevented. As the collar gear (528) continues to rotate, the first section (530) would extend upwards and begin de-threading from the collar gear (528) itself, with the lower portion of the telescoping arrest rod (544) becoming visible as seen in FIG. 31. A fourth retainer (not pictured) on the lower portion of the first section (530) would prevent the first section (530) from completely de-threading from the collar gear (528) at the maximum height telescoping base (520). Progressing back to the fully nested height seen in FIG. 30 would require the pinion motor (526) driving in the opposite rotational direction, causing each of the above steps to reverse, with the telescoping base shrinking in height as the sections sequentially thread back into the lower section.

As with other lift adjustments, height adjustment of the adapter (506) may be performed manually (e.g., under control of an interface of the control pendant (150)) or automatically (e.g., as a result of a profile selection), or simultaneously with one or more other lift adjustments (e.g., arm extension, arm rotation).

Some implementations of the adapter (506) may have additional features. For example, limit switches or load switches may allow the adapter (506) to automatically extend upwards until the pinion motor (526) is placed under a certain load or a pressure sensor is placed under a certain load indicating that a lift point has been contacted, at which point extension could cease. Software may also adjust (automatically or in response to manual configuration) to allow for varying rotational speeds and power output to account for differing sizes and weights of adapters, such that a lighter adapter with a small diameter could be controlled differently than a heavier adapter with a larger diameter, without risking overload. Software or hardware may also be used to link two or more adapters together in the same adapter group, so that they may be extended or retracted at the same speed as desired.

VII. Auto-Spotting System and Method

With the additional flexibility available in lift positioning disclosed herein, it may also be advantageous to provide additional improved lift control systems and methods beyond the pendant control (150). FIGS. 38-41 show one implementation of such and improved smart lift system (601) and methods.

Figure 38:
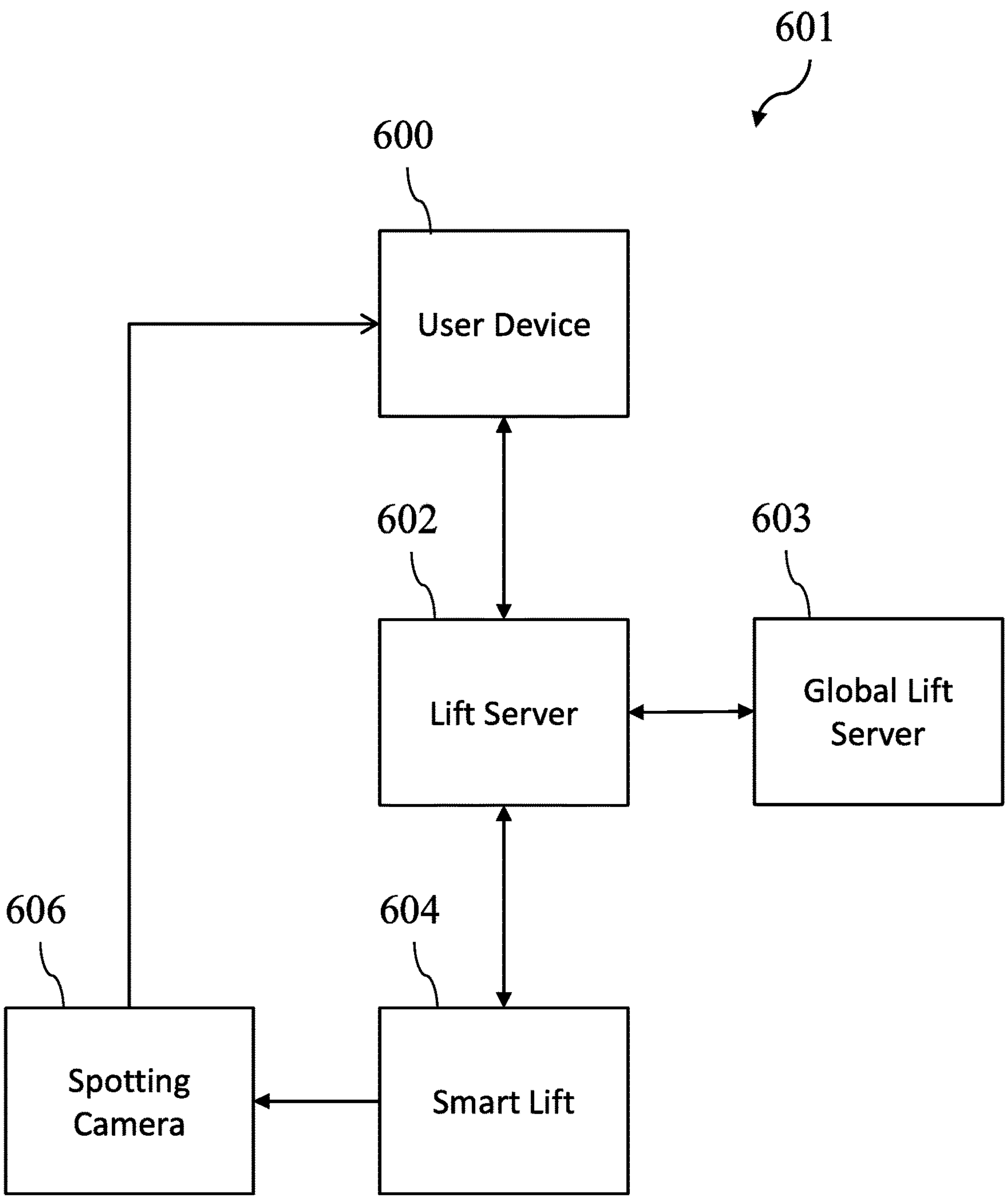
FIG. 38 depicts a system architecture of a smart lift system.

FIG. 38 shows an exemplary system architecture for a smart lift system. A user device (600) may be a mobile smart phone, tablet, laptop computer, desktop computer, kiosk, or other similar computing device having features and functionality such as a process and memory, a display, a user interface, and a network communication device. A lift server (602) may be a computing device such as a desktop computer, local server, remote server, virtual server, kiosk, or other proprietary computing device having features and functionality such as a processor and memory, data storage, and a network communication device. A smart lift (604) may be one or more of the lift (300), the lift (400), a lift having features such as the extension arm (500) or the adapter (506), or any other lift disclosed herein or conventionally used. The user device (600) serves as a human-machine interface for a user interacting with the smart lift (604), and communication between the user device (600) and the smart lift (604) occurs through the lift server (602) in the shown implementation, though other architectures exist and will be apparent to one of ordinary skill in the art in light of this disclosure. As one example, communication between the user device (600) and the smart lift (604) may occur via a local wireless connection such as a Wi-Fi connection or Bluetooth connection between the user device (600) and the smart lift (604). The user device (600) may provide software and interfaces that a user can interact with in order to manually adjust one or more features of the smart lift (604), such as extending the adapter (506) or the extension arm (500), rotating the short arm (308) or the long arm (406), and similar functions.

The user device (600) may also allow a user to select and view vehicle profiles and other pre-configured vehicle configurations that may be stored on the lift server (602) or stored remotely on a global lift server (603). The lift server (602) may store a variety of vehicle profiles and configurations locally, which can be accessed without an internet connection, while the global lift server (603) may serve as a global repository for vehicle profiles and configurations. The global lift server (603) may be accessed on demand by the lift server (602), or vehicle profiles may be regularly pushed or pulled to the lift server (602) in order to distribute, synchronize, and update the global data. In this manner, one instance of the lift server (602) might serve as the global lift server (603) for another instance of the lift server (602), sharing vehicle profile configurations between each other in a peer-to-peer manner. Interactions and data sharing by a network device such as the lift server (602) and the global lift server (603) could use other data sharing technologies such as blockchain and other distributed ledger technologies to provide robust distributed databases of vehicle profiles and vehicle data, which could offer improved accuracy and accessibility, and more reliable access to various vehicle profiles based upon their model, a VIN, a serial number, or other unique identifiers that may be assigned to a vehicle as it is customized beyond a manufacturer stock state.

The user device (600) may also be used to create or update vehicle profiles, which may then be stored on the lift server (602) and propagated to the global lift server (603) for future use. Vehicle profiles on the lift server (602) and the global lift server (603) may be used to cause the smart lift (604) to automatically configure one or more features (e.g., the adapter (506), the extension arm (500), the short arm (308), the long arm (406), etc.) to a pre-configured position for that vehicle profile. This could greatly reduce the amount of time and effort required to manually position such features either by hand or even with the control pendant (150), as multiple features may be able to move to their eventual position simultaneously and with automated precision.

A spotting camera (606) may include one or more image or video capturing devices positioned to view and receive image data from one or more viewable aspects of the smart lift (604), which could include views positioned below a vehicle on the smart lift (604), above a vehicle on the smart lift (604), and to any of the sides of a vehicle on the smart lift (604), with such visual images and data being viewable by the user device (600), which could aid a user of the user device (600) in creating and updating vehicle profiles, and in confirming proper positioning of various lift features after they are automatically positioned based upon a selected vehicle profile.

Figure 39:
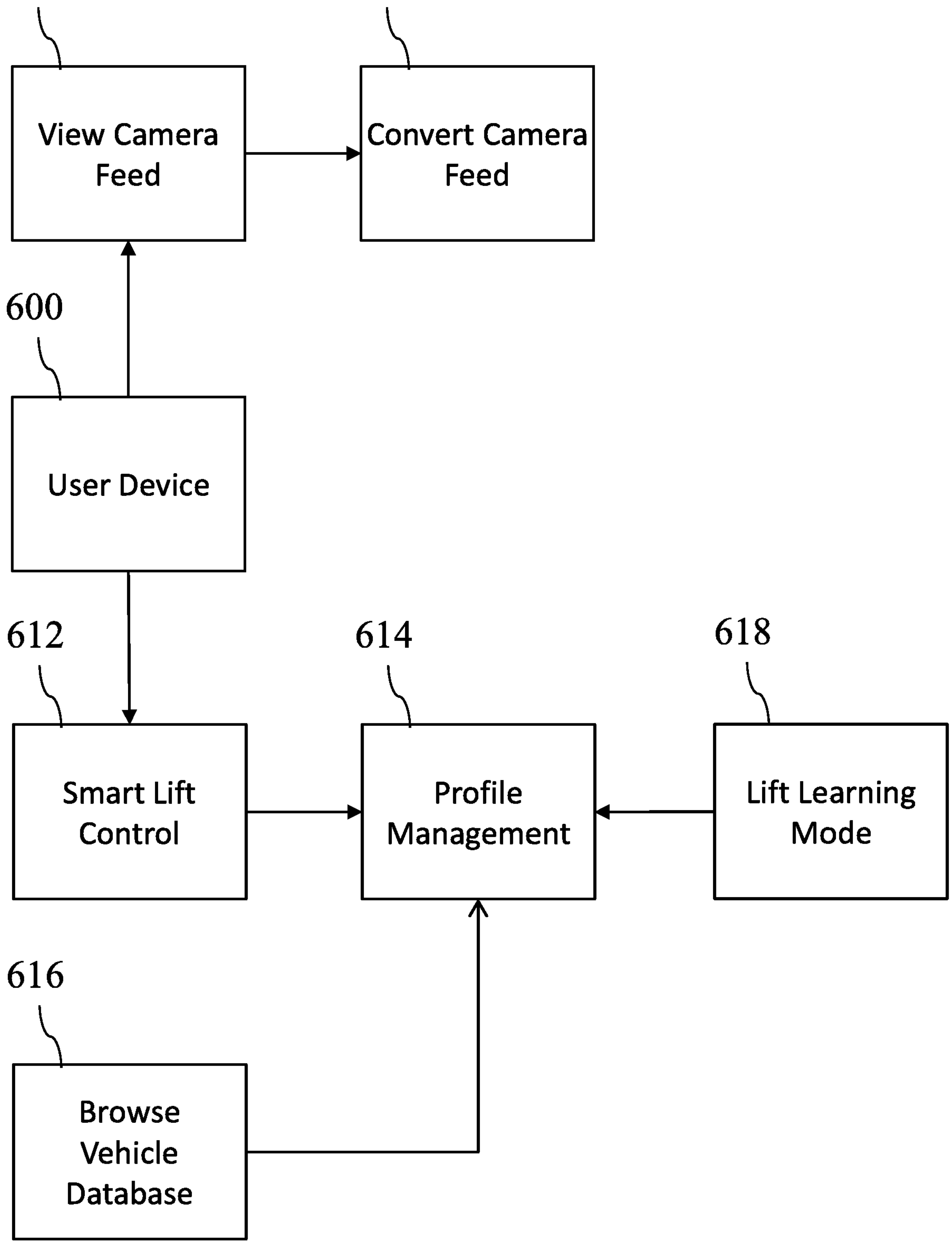
FIG. 39 depicts a set of features available via a user device of the smart lift system.

FIG. 39 shows a set of exemplary features and processes that may be available via the user device (600). Such features could include, for example, viewing (608) a camera feed of images, video, and other data from the spotting camera (606), and automatically converting (610) image and video data from the spotting camera (606) as desired. For example, some visual data provided by the spotting camera (606) may have special characteristics such as being a fish-eye view, an upside-down view, a zoomed view, or a low-light view of some aspect of a vehicle on the smart lift. Automatic conversion (610) of image data to address these characteristics could include smoothing or stretching an image to account for a fish-eye view, rotating a view, smoothing pixilation of a zoomed view, or adjusting brightness and contrast of a low-light view, and could also include cropping a view to remove extraneous images, or visibly highlighting areas within the view based upon either image recognition (e.g., identifying a lift point based upon a visual database of lift points) or visual identifiers (e.g., a recognizable QR code on the underside of an adapter).

Direct and manual smart lift control (612) may also be available via the user device (600), which could include interfaces similar to the pendant control (150) or could even be visually graphically skinned to match the pendant control (150) or other commonly used controls and could allow users to select and move various lift features in one or more dimensions. For example, a user could select a lift arm to rotate based upon touching a rotational arrow button graphic on a display of the user device (600) or could select a lift arm to extend based upon a straight arrow button graphic on a display of the device (600). During smart lift control (612) a user might personally view the smart lift (604) as it moves to the desired position or may view (608) a camera feed from the spotting camera (606) as the smart lift (604) moves to the desired position.

The user device (600) may also allow a user various profile management (614) controls, including creating new vehicle profiles, updating existing vehicle profiles, browsing and selecting (616) vehicle profiles from a vehicle database on the lift server (602), or checking the global lift server (603) for vehicle profiles. As an example, when a vehicle needs to be placed on the smart lift (604), the user may first browse (616) the vehicle database to determine whether a vehicle profile exists. If no profile exists, the user may then manually control (612) the smart lift to properly place the arms and adapters at lift points under the vehicle while also viewing (608) the camera feed to ensure proper placement. Once proper positioning of the lift features is achieved, the user may use profile management (614) features to save the lift configuration and positioning data to the vehicle database so that it may be selected in the future. Configurations saved to the vehicle database may be organized such that they can be viewed by more generic identifiers such as model number and year, by more specific identifiers such as VIN number, or by uniquely assigned identifiers or serial numbers to allow for configurations that address vehicles that have been modified beyond their stock manufacturer state. On a subsequent visit where the same vehicle needs to be placed on the smart lift (604), a user may browse (616) the vehicle database, identify the now-available vehicle profile, and select that vehicle profile to cause the smart lift (604) to automatically move its features to the previously identified proper configuration.

The user device (600) may also allow a user to place the smart lift into a lift learning mode (618). In lift learning mode (618), the smart lift (604) may use the spotting camera (606), which may include one or more statically positioned or automatically movable cameras, to view one or more sides of a vehicle and, based upon image recognition (e.g., capturing image data and programmatically comparing it to a database of image data for similarities) or visual identifiers (e.g., barcodes, QR codes, or other intentional visual markers), identify one or more safe lift points on the vehicle. Once safe lift points are identified, the smart lift (604) may then automatically position the lift features in a proper configuration for the identified lift points, again using one or more of image recognition or visual identifier recognition to determine that a set of lift adapters have been positioned properly. Having automatically achieved a proper configuration in learning mode (618), the user device may then be used via its profile management (614) features to save the new configuration to the vehicle profile database.

FIG. 39 shows a set of steps that the smart lift system (601) may perform in response to a user's use of the user device (600) or the control pendant (150). When the smart lift system (601) receives an indication from a user that they are teaching a new vehicle profile via the profile management (614) features, the lift server (602) may cause the smart lift (604) to automatically move (620) all of its movable features to a neutral or home position. The lift server (602) may then receive (622) a number of manual inputs to the movable features of the smart lift (604) via the user device (600). In response to the received (622) inputs, the smart lift (604) will move to the desired position and display (626) one or more images from the spotting camera (606) to aid a user in determining the position. When the lift server (602) receives (628) a confirmation from the user that the movable lift features are in the desired position, the lift server (602) will determine the desired position based upon one or more of the received (622) inputs, mechanical or electrical feedback from the movable features or sensors, visual data from the spotting cameras (606), or other information sources, and then save (630) the position to one or more databases or storage repositories of the lift server (602) or the global lift server (603).

Figure 40:
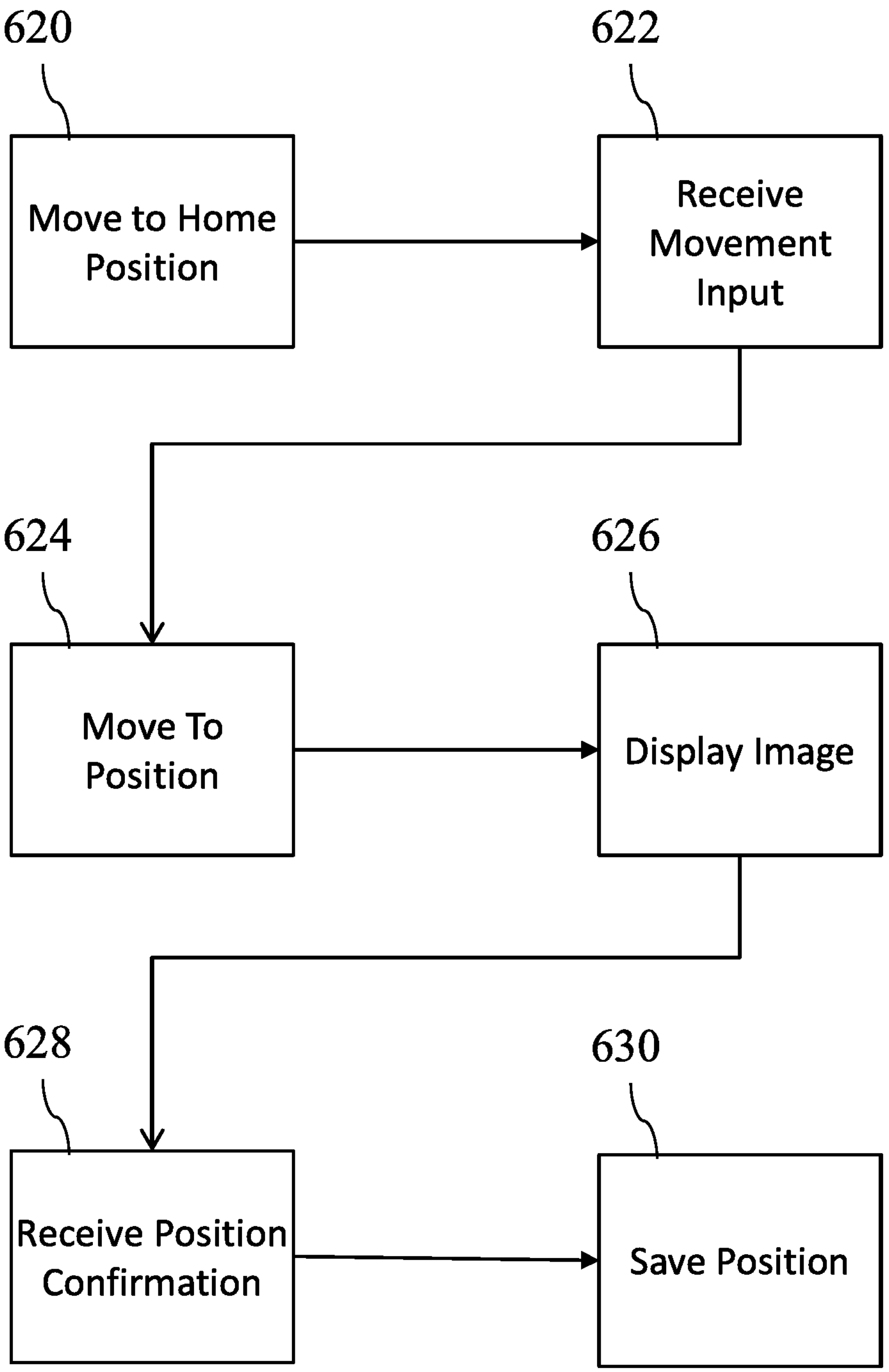
FIG. 40 depicts a set of steps that may be performed by the smart lift system to train the smart lift system for a new vehicle profile.
Figure 41:
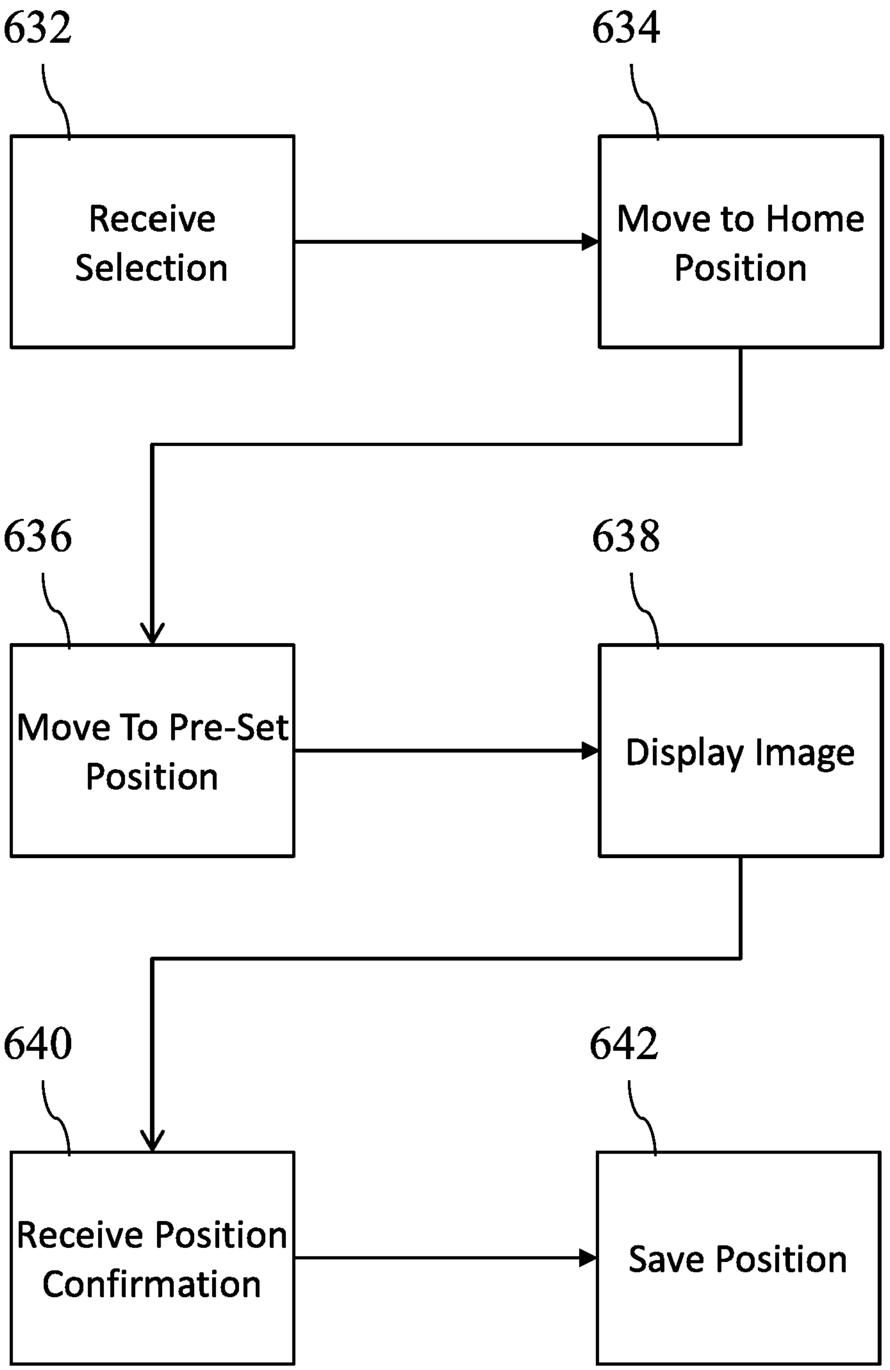
FIG. 41 depicts a set of steps that may be performed by the smart lift system to automatically position a lift using the new vehicle profile.

FIG. 40 shows a set of steps that the smart lift system (601) may perform in response to a user's use of the device (600) or the control pendant (150) to indicate that they have browsed (616) and selected a vehicle profile from the vehicle profile database. When the lift server (602) receives (632) a profile selection, the lift server (602) will cause the smart lift (604) to move (634) its movable features to a home or neutral position. From the neutral position, the lift server (602) will cause the smart lift (604) to move (636) its movable features to their pre-set position based upon the selected vehicle profile, and then display (638) one or more images or video from the spotting camera (606). When the lift server (602) receives (640) confirmation that the movable features are in the desired position, the lift server (602) may save (642) or update data relating to that vehicle profile to either confirm that the profile was accurate in its present use or to indicate that some manual adjustment was needed and that the profile may need to be updated or the particular vehicle may need a unique vehicle profile. Other features and methods of the disclosed smart lift system (601) will be apparent to one of ordinary skill in the art in light of the disclosure herein.

VIII. Miscellaneous

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A smart lift system, comprising:

(a) a plurality of movable lift features, each capable of moving in at least two dimensions, wherein a first movable lift feature of the plurality of movable lift features comprises:
   (i) a lift base comprising an arm housing,
   (ii) a first arm having a first adapter, and
   (iii) a second arm having a second adapter, wherein the first arm and the second arm are rotatably connected to the arm housing, and wherein the lift base is operable to independently rotate each of the first arm and the second arm, and to independently extend or retract each of the first adapter and the second adapter along a respective longitudinal axis, thereby moving each of the first adapter and the second adapter through two dimensions; and (b) a user device comprising a display and a user interface, wherein the user device is configured to receive inputs from a user via the user interface and, in response, cause movement through two dimensions of at least one of the first adapter and the second adapter, wherein the movement through two dimensions comprises both the independent rotation and the linear movement along the respective longitudinal axis.

2. The smart lift system of claim 1, wherein the user interface comprises a button graphic.

3. The smart lift system of claim 2, wherein the button graphic comprises a rotational arrow.

4. The smart lift system of claim 1, wherein the smart lift system further comprises a spotting camera positioned so that at least one of the plurality of movable lift features is within its field of view.

5. The smart lift system of claim 4, wherein the spotting camera is communicatively coupled with the user device such that image data captured by the spotting camera is shown on the display.

6. The smart lift system of claim 1, wherein the user interface is graphically skinned.

7. The smart lift system of claim 1, wherein the user device is configured to create a vehicle profile.

8. The smart lift system of claim 1, wherein the user device is configured to browse a plurality of vehicle profiles from a vehicle database.

9. A smart lift system, comprising:

(a) a plurality of movable lift features, each capable of moving in at least two dimensions, wherein a first movable lift feature of the plurality of movable lift features comprises:

(i) a lift base comprising an arm housing, (ii) a first arm pivotable relative to the arm housing, wherein the first arm comprises a first linear actuator, a static section rotatably connected to the arm housing, and a first movable arm section slidably coupled with the static section, wherein the first movable arm section has a longitudinal axis, and wherein the first linear actuator is operable to cause the first movable arm section to extend from or retract toward the static section along its longitudinal axis, and (iii) a second arm pivotable relative to the arm housing; and (b) a user device comprising a display and a user interface, wherein the user device is configured to receive input from a user via the user interface and, in response, cause the first linear actuator to cause the first movable arm to extend along its longitudinal axis relative to the static section.

10. The smart lift system of claim 9, wherein the user interface comprises a button graphic.

11. The smart lift system of claim 10, wherein the button graphic comprises a straight arrow.

12. The smart lift system of claim 9, wherein the smart lift system further comprises a spotting camera having a field of view, wherein the spotting camera is positioned so that at least one of the plurality of movable lift features is within its field of view.

13. The smart lift system of claim 12, wherein the spotting camera is communicatively coupled with the user device such that image data captured by the spotting camera is shown via the display.

14. The smart lift system of claim 12, wherein the second arm comprises a second linear actuator and a second movable arm section, wherein the second movable arm section has a longitudinal axis, and wherein the second linear actuator is operable to cause the second movable arm section to extend or retract along its longitudinal axis.

15. The smart lift system of claim 14, the user device is configured to receive inputs from a user via the user interface and, in response, cause the second linear actuator to cause the second movable arm to extend along its longitudinal axis.

16. The smart lift system of claim 12, wherein the first movable arm comprises a telescoping arm.

17. The smart lift system of claim 12, further comprising a column, wherein the first movable lift feature is configured to vertically actuate along a length of the column.

18. The smart lift system of claim 12, further comprising a lift server in communication with the user device.

19. The smart lift system of claim 18, further comprising a global lift server in communication with the lift server.

20. A method for operating a smart lift system, wherein the smart lift system comprises a user device, a column, and pair of moveable lift features configured to vertically actuate along a length of the column, wherein each moveable lift feature of the plurality of movable lift features is capable of moving in at least two dimensions, and wherein the user device comprises a plurality of graphics, the method comprising:

(a) selecting a moveable lift feature out of the pair of moveable lift features;

(b) touching a first graphic of the plurality of graphics to thereby cause the selected movable lift feature to rotate within a plane extending through the at least two dimensions; and (c) touching a second graphic of the plurality of graphics to thereby cause the selected movable lift feature to extend a length of the selected movable lift feature via a telescopic relationship of components of the selected movable lift feature.

* * * * *